United States Patent
Hartmann et al.

[15] 3,665,419

[45] May 23, 1972

[54] APPARATUS FOR DETERMINING SHAPE

[72] Inventors: Frederick Hartmann, Rolling Hills Estates; Billy J. Huffmann, Mission Viejo, both of Calif.

[73] Assignee: North American Rockwell Corporation

[22] Filed: Feb. 18, 1969

[21] Appl. No.: 800,222

[52] U.S. Cl. ............................340/172.5, 340/174, 340/166
[51] Int. Cl. ....................G11c 15/00, G11c 5/02, G06f 7/02
[58] Field of Search ...................340/172.5, 166, 146.3, 149, 340/174; 235/181

[56] References Cited

UNITED STATES PATENTS

| | | | |
|---|---|---|---|
| 3,104,369 | 9/1963 | Rabinow et al. | 340/146.3 |
| 3,104,372 | 9/1963 | Rabinow et al. | 340/146.3 |
| 3,164,810 | 1/1965 | Harding | 340/166 X |
| 3,376,555 | 4/1968 | Crane et al. | 340/172.5 |

*Primary Examiner*—Gareth D. Shaw
*Assistant Examiner*—Paul R. Woods
*Attorney*—William R. Lane, Allan Rothenberg and Richard D. Seibel

[57] ABSTRACT

A superposition algorithm is presented for reconstruction of a closed curve from length and width values. That is, the "thickness" of the curve as viewed from two intersecting directions. A special purpose digital computer is described for automatically reconstructing the shape of closed curves. The computer performs the algorithm steps, displays the results and permits easy correction of input data. A memory is employed in the computer with a plurality of memory planes each in the form of a matrix which is a spatial analogy of a matrix in which a closed curve lies. The computer operates by an element by element scan of these matrixes, reading memory content, counting elements, or entering results as determined by the operating state of the computer.

17 Claims, 80 Drawing Figures

INVENTORS.
FREDERICK HARTMANN
BILLY J. HUFFMAN
BY Richard D. Seibel
ATTORNEY

INVENTORS.
FREDERICK HARTMANN
BILLY J. HUFFMAN

BY Richard D. Seibel
ATTORNEY

INVENTORS.
FREDERICK HARTMANN
BILLY J. HUFFMAN
BY Richard D. Seibel
ATTORNEY

INVENTORS.
FREDERICK HARTMANN
BILLY J. HUFFMAN
BY Richard D. Seibel
ATTORNEY

INVENTORS.
FREDERICK HARTMANN
BILLY J. HUFFMAN
BY
Richard D. Seibel
ATTORNEY

INVENTORS.
FREDERICK HARTMANN
BILLY J. HUFFMAN
BY
Richard D. Seibel
ATTORNEY

INVENTORS.
FREDERICK HARTMANN
BILLY J. HUFFMAN
BY Richard D. Seibel
ATTORNEY

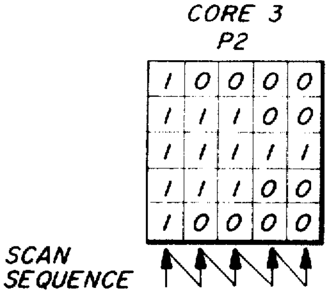
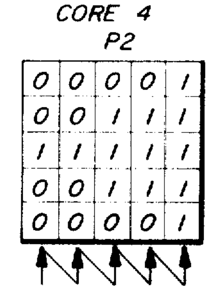
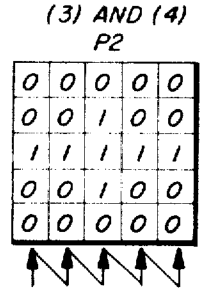
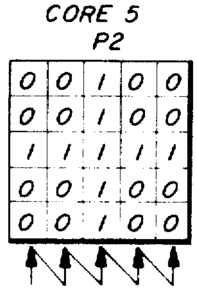
FIG. 10D FIG. 10E FIG. 10F FIG. 10G
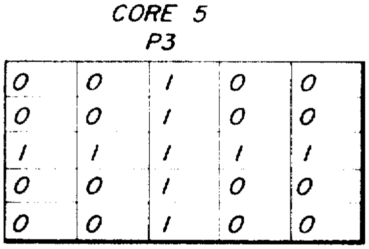
FIG. 11A
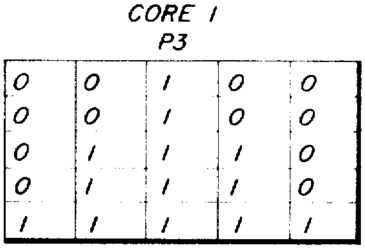
FIG. 11B
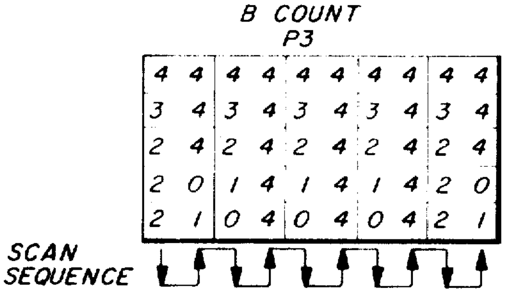
FIG. 11C
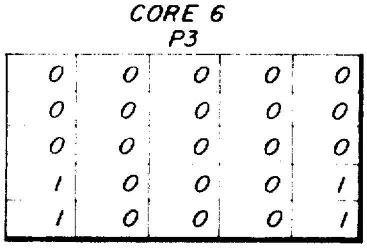
FIG. 11D
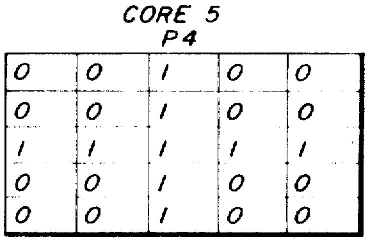
FIG. 12A
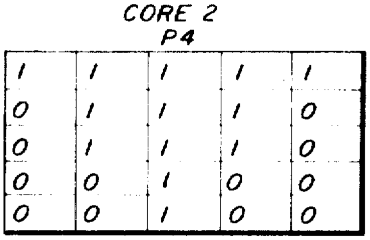
FIG. 12B
INVENTORS.
FREDERICK HARTMANN
BILLY J. HUFFMAN
BY Richard D. Seibel
ATTORNEY INVENTORS.
FREDERICK HARTMANN
BILLY J. HUFFMAN
BY Richard D. Seibel
ATTORNEY INVENTORS.
FREDERICK HARTMANN
BILLY J. HUFFMAN
BY Richard D. Seibel
ATTORNEY INVENTORS.
FREDERICK HARTMANN
BILLY J. HUFFMAN
BY Richard D. Seibel
ATTORNEY INVENTORS.
FREDERICK HARTMANN
BILLY J. HUFFMAN
BY Richard D. Seibel
ATTORNEY INVENTORS.
FREDERICK HARTMANN
BILLY J. HUFFMAN
BY Richard W. Seidel
ATTORNEY INVENTORS.
FREDERICK HARTMANN
BILLY J. HUFFMAN
BY
Richard D. Seibel
ATTORNEY

APPARATUS FOR DETERMINING SHAPE

BACKGROUND

In many situations it is desirable to know the geometry of a body that is hidden from direct examination and measurement. Thus, for example, the geometry of a bone hidden beneath the flesh may be of interest when direct measurements are not available in the absence of surgery. Similarly, in the medical field the location and geometry of various organs and tumors is often of interest. Similarly, in the field of non-destructive testing it is often important to know the size, shape and location of inclusions, voids, or the like in a structure such as a casting, a weld-bead or other object.

In order to find the shape of a three dimensional object a number of parallel cross-sections may be obtained and integrated to define the entire shape. Co-pending U. S. Pat. application Ser. No. 800,179, filed Feb. 18, 1969 entitled, MEASURING METHOD AND APPARATUS by Frederick Hartmann and assigned to North American Rockwell Corporation, assignee of this application, and which is hereby incorporated by reference with fullforce and effect as if set forth in full herein, described, illustrates, and claims a technique for finding the thickness or breadth of a cross-section in each of two directions common to a plane defining a cross-section of an object. In addition the aforementioned copending application presents an algorithm for determining the shape of the cross-section given only the width of that cross-section in two mutually angulated directions. As is pointed out therein this algorithm is readily implemented by a hand graphical method and by several types of programs for several general purpose computers for determining the shape of the cross section. The general purpose computer solution becomes increasingly difficult when input data errors for the height and width of the object are present due to film variations, density measurement uncertainties, digitization roundoff, and other similar factors. In many practical situations in order to accomodate inconsistencies in the input data, error correction requires human judgment based on partial solutions obtained. A general purpose computer solution is deemed unsatisfactory for some situations because it does not permit convenient and economical human interaction based on displayed results. It is therefore desirable to provide a special purpose computer which can determine the shape of a closed curve from height and width data alone, display the resulting shape at various stages during the computation and permit easy correction of input data if desired, during solution of a problem.

SUMMARY OF THE INVENTION

A digital apparatus is provided in practice of this invention comprising a memory matrix analogous to a matrix in which a curve lies, means for identifying a first sub-region of the memory matrix necessarily within a region bounded by elements having a direct spatial relation to the curve, means for identifying a second sub-region of the memory matrix necessarily without the region bounded by the curve, means for converging the first and second sub-region for defining the boundary of the curve in the matrix, and means for presenting the results in a display matrix.

DRAWINGS

Many of the attendent advantages of this invention will be readily appreciated as the same becomes better understood by reference to the following detailed description when considered in connection with the accompanying drawings wherein.

Figure 3:
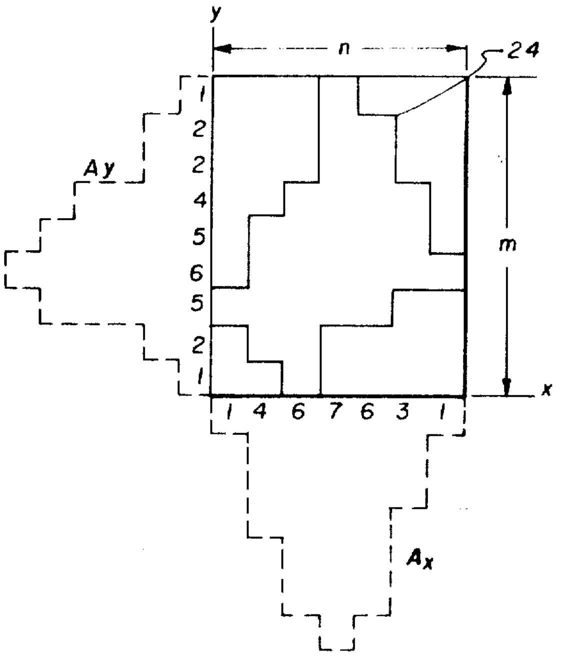
FIG. 3 illustrates the same cross-section as FIG. 2 except in quantized or digitized form.
Figure 4A:
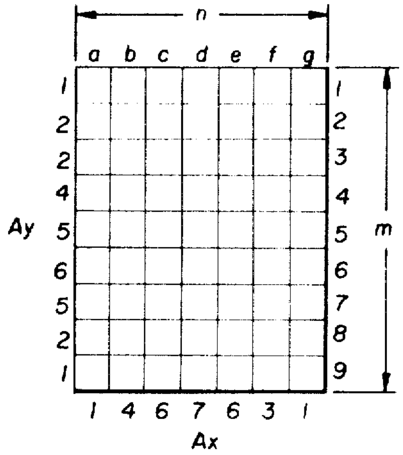
Figure 4D:
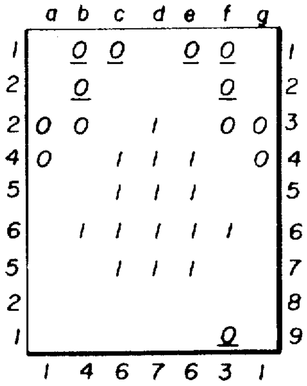
Figure 4B:
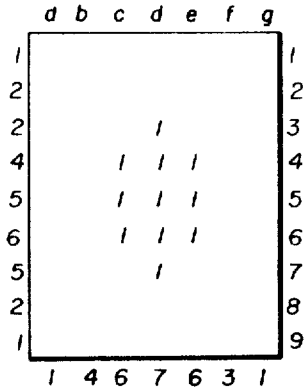
Figure 4C:
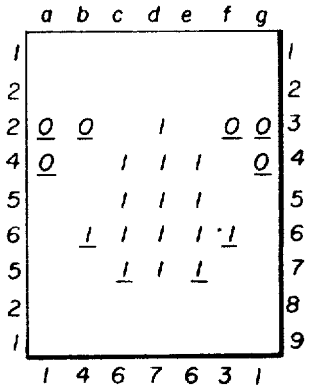
Figure 4G:
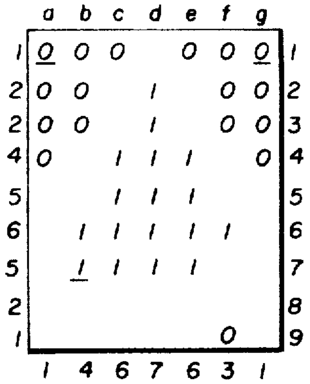
Figure 4E:
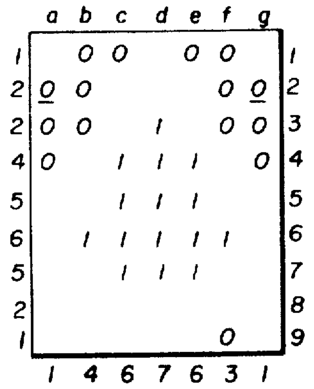
Figure 4F:
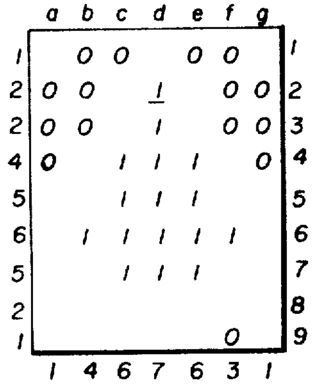
Figure 4H:
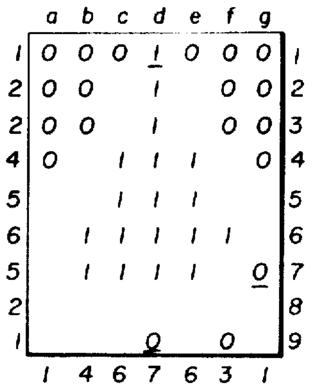
Figure 4I:
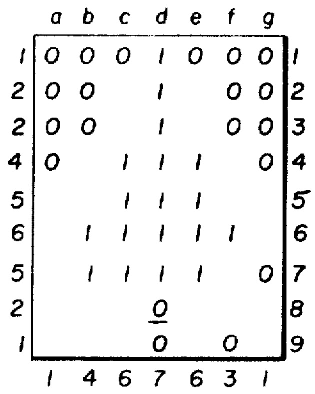
Figure 4J:
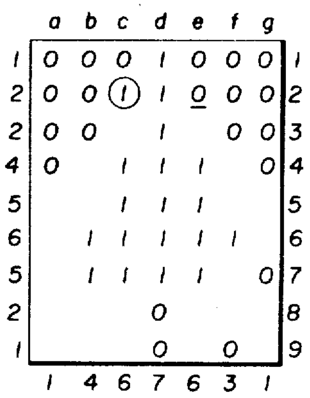
Figure 4K:
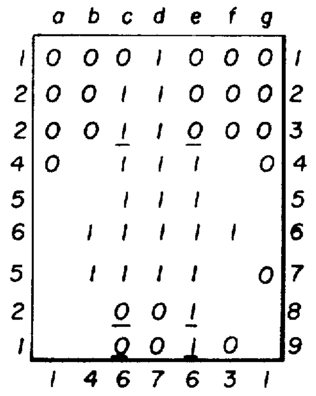
Figure 4L:
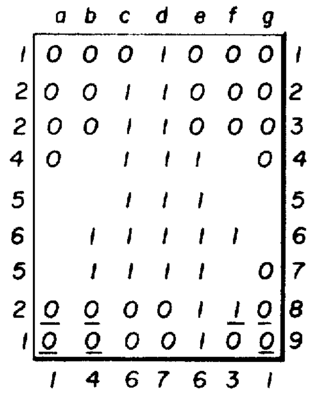
Figure 4M:
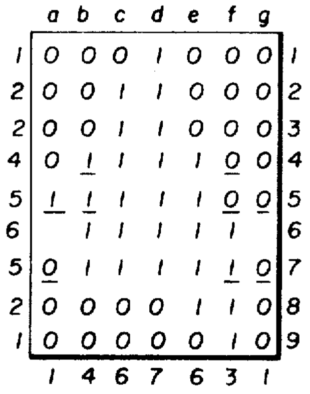
Figure 4N:
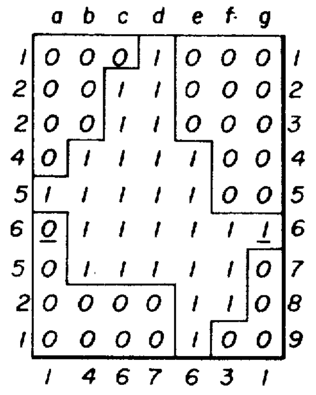
Figure 4O:
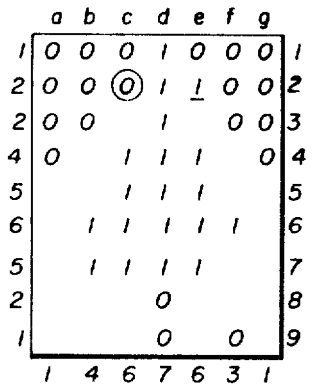
Figure 4P:
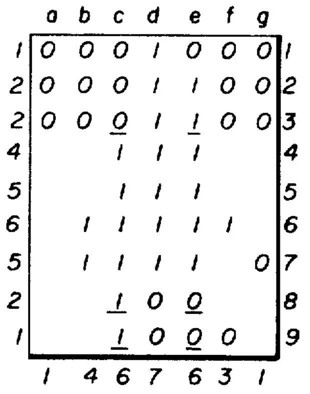
Figure 4Q:
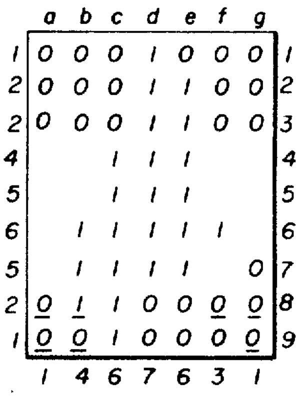
Figure 4R:
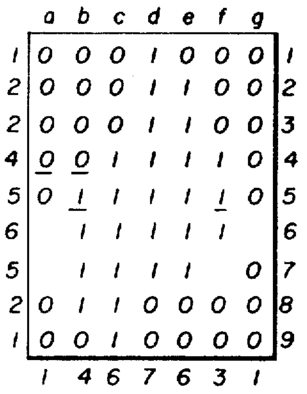
Figure 4S:
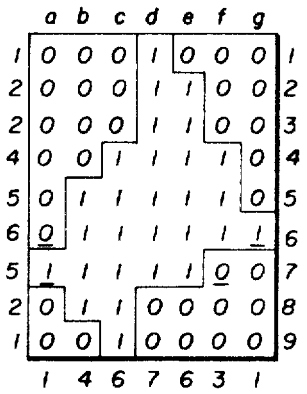
Figure 5:
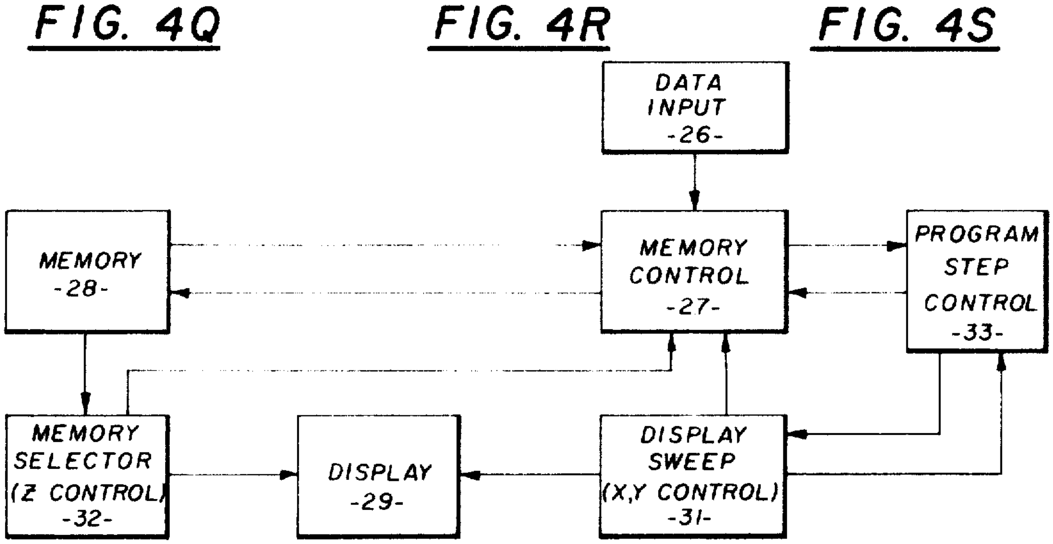
Figure 7:
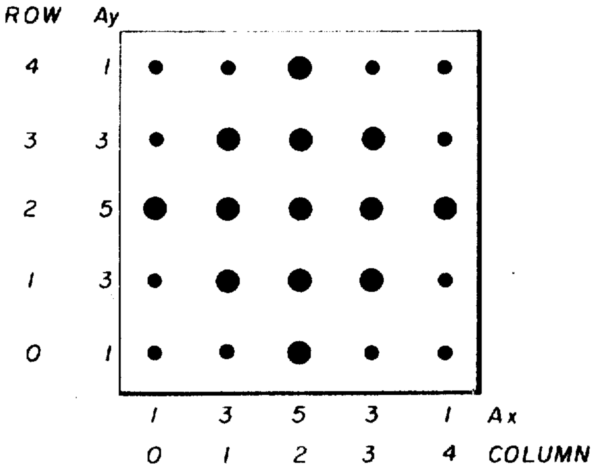
Figure 6A:
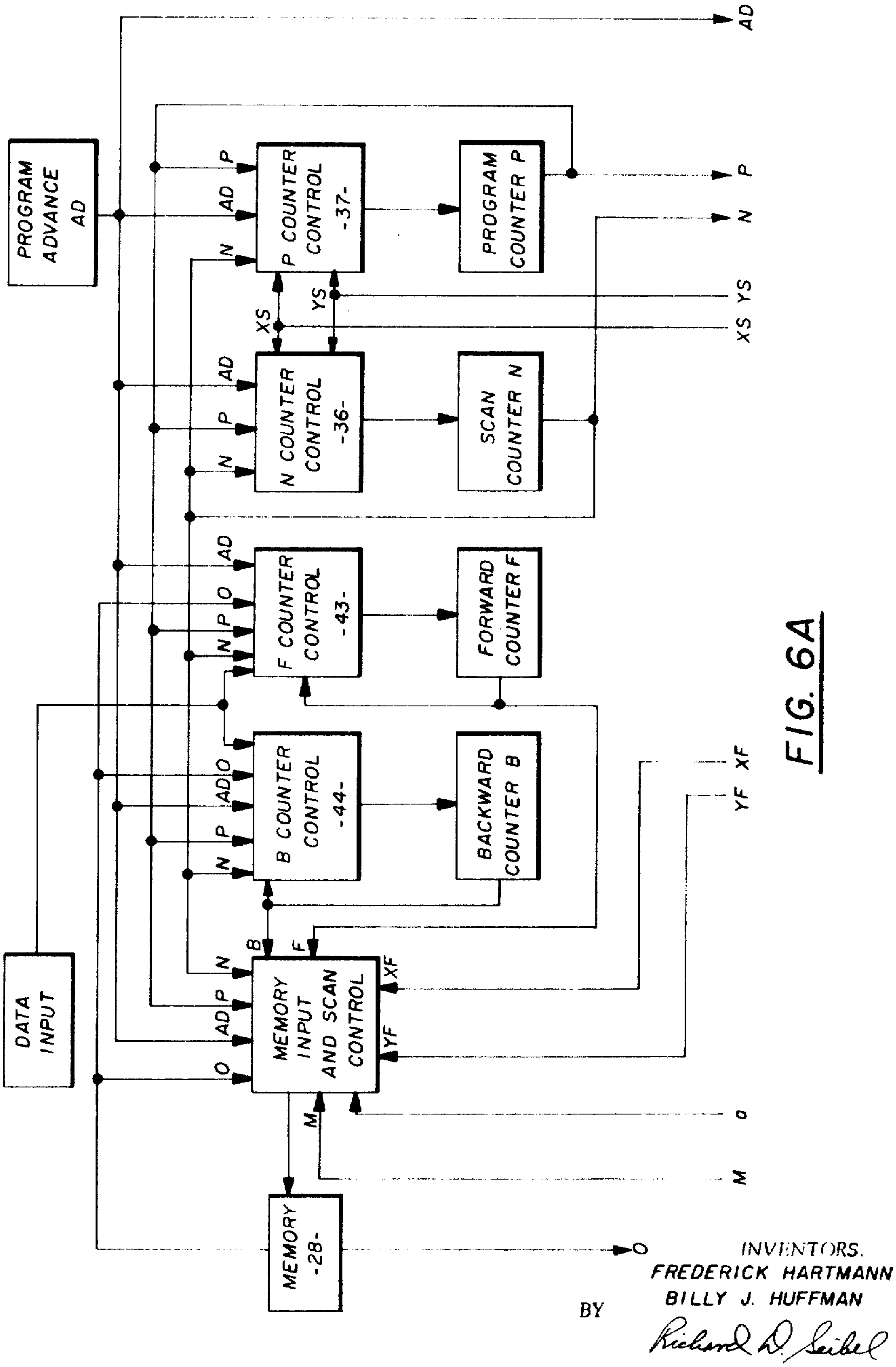
Figure 6B:
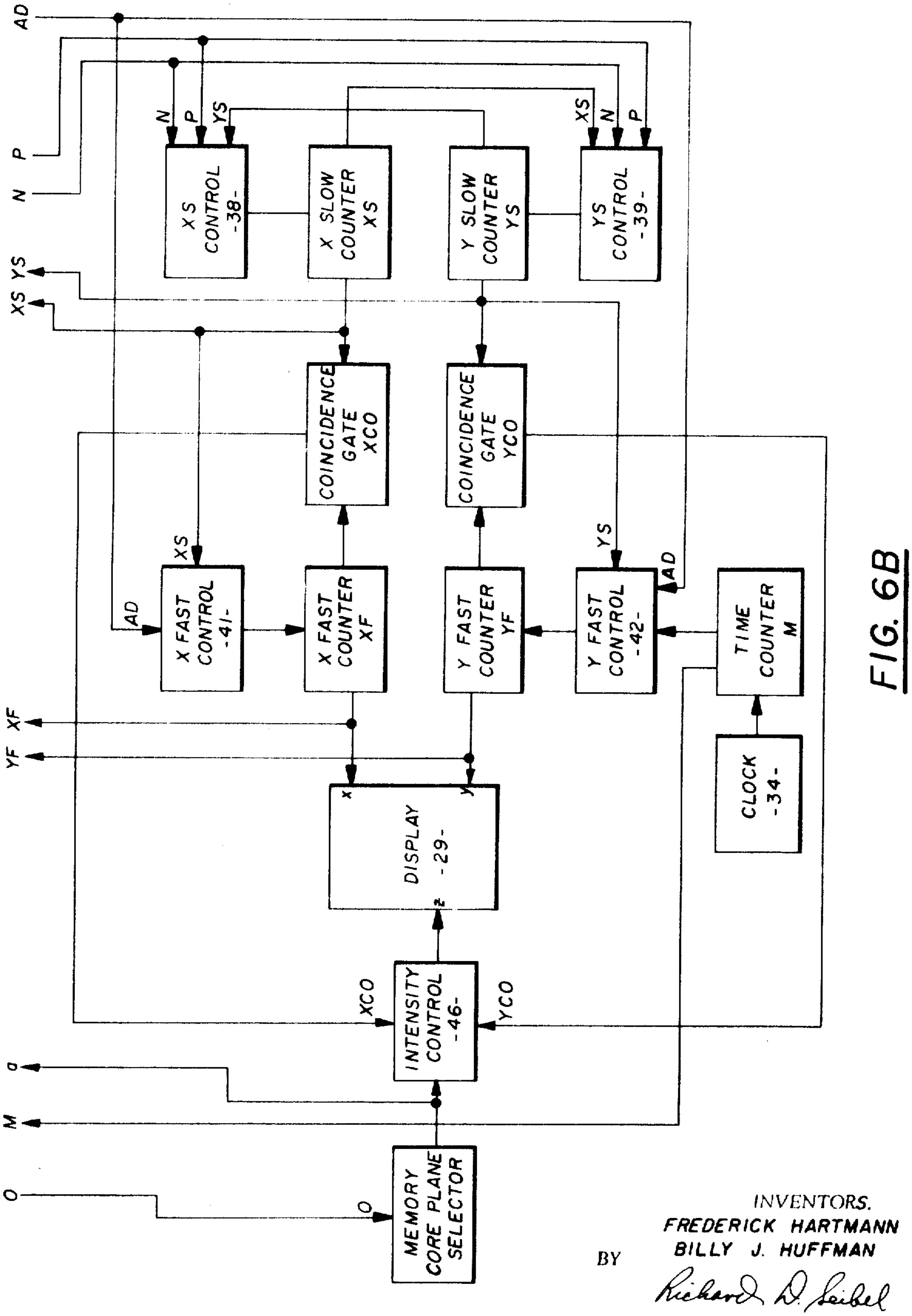
Figure 14A:
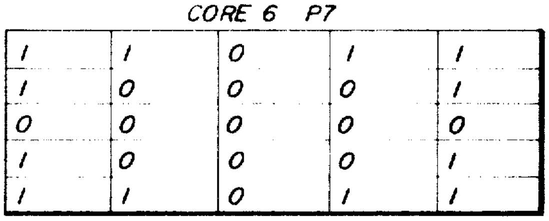
Figure 14B:
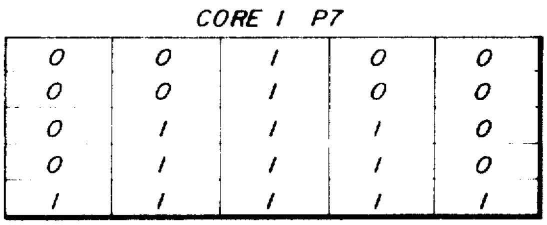
Figures 14C, 14D, 15A, 15B:
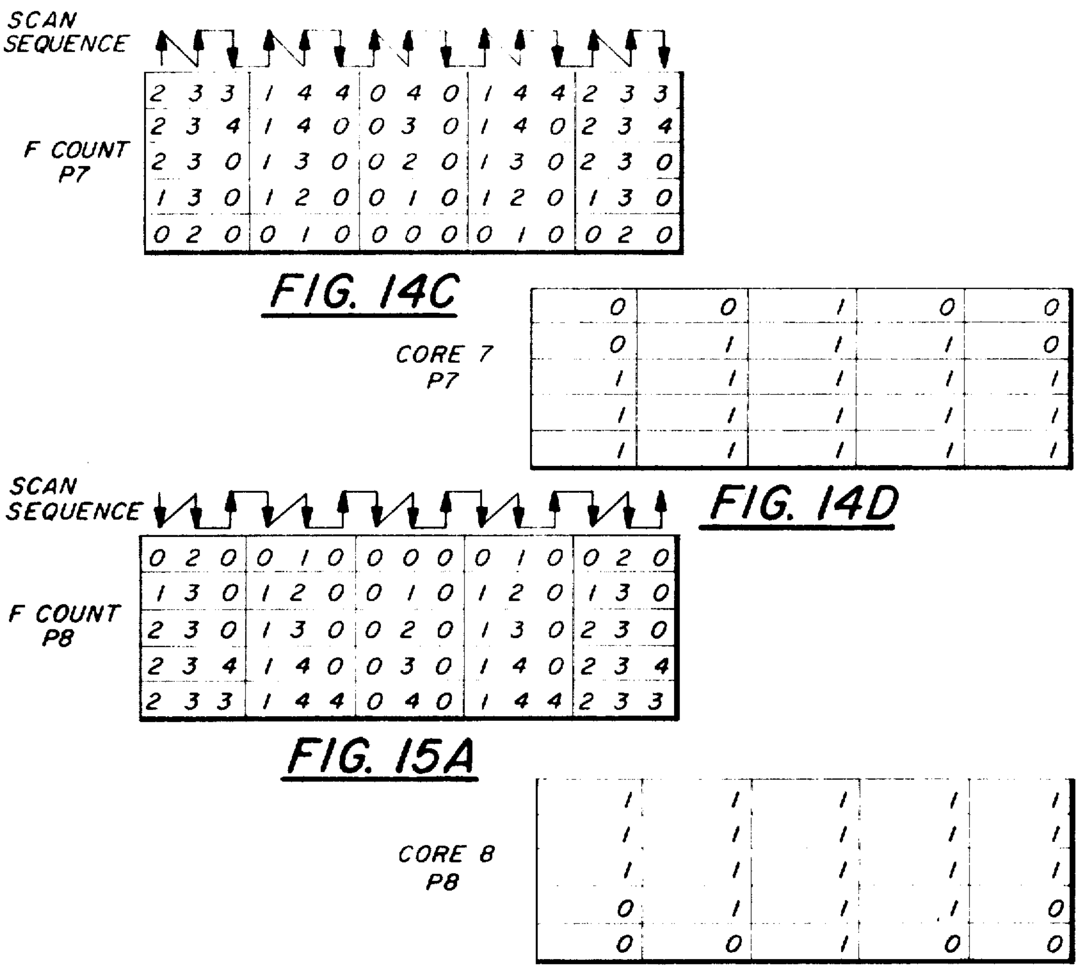
Figure 16A:
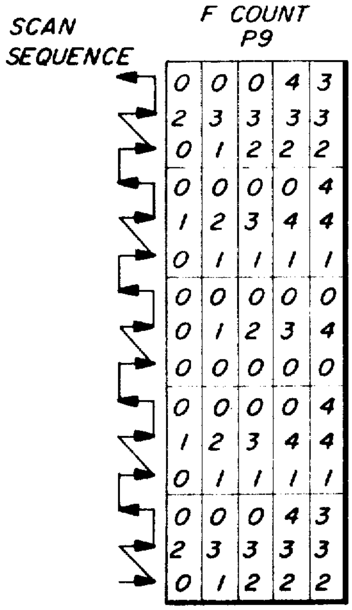
Figure 16B:
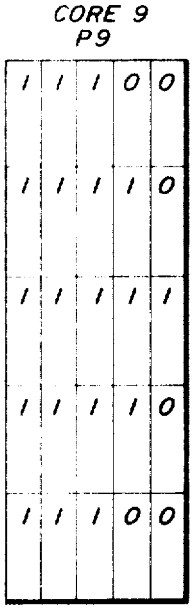
Figure 17A:
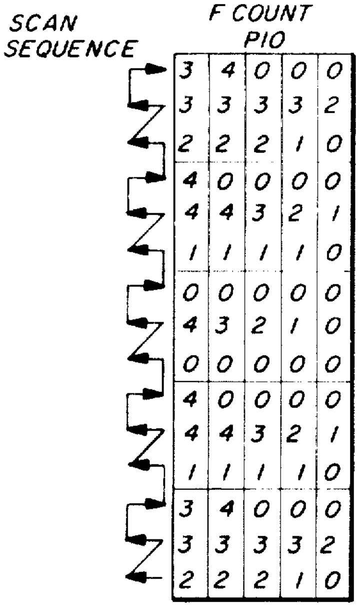
Figure 17B:
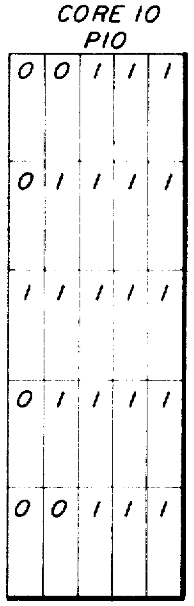
Figure 18A:
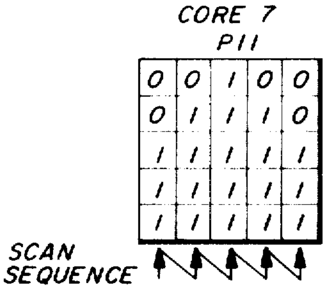
Figure 18B:
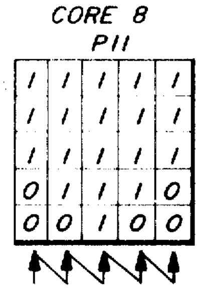
Figure 18C:
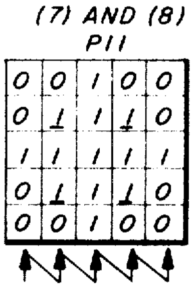
Figures 18D, 18E, 18F, 18G:
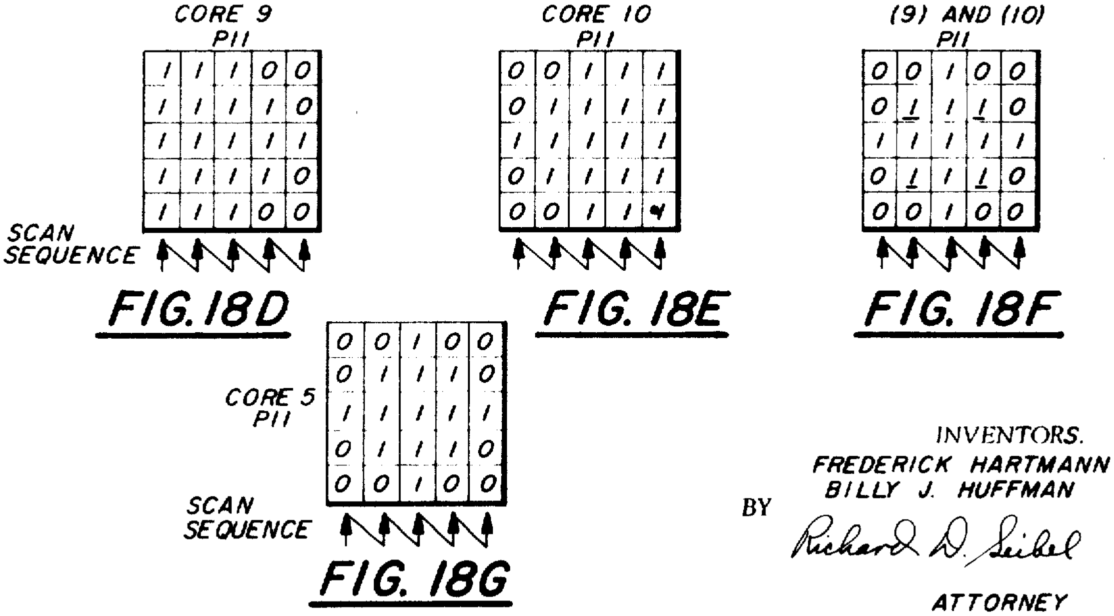
Figure 19:
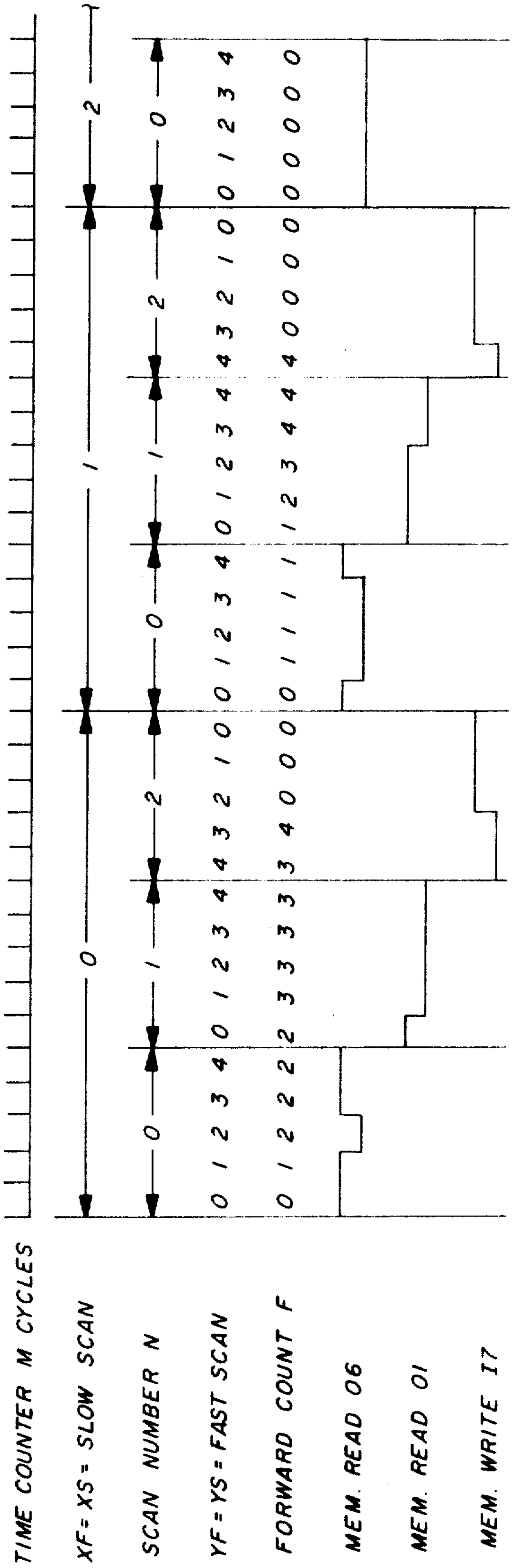
Figure 20:
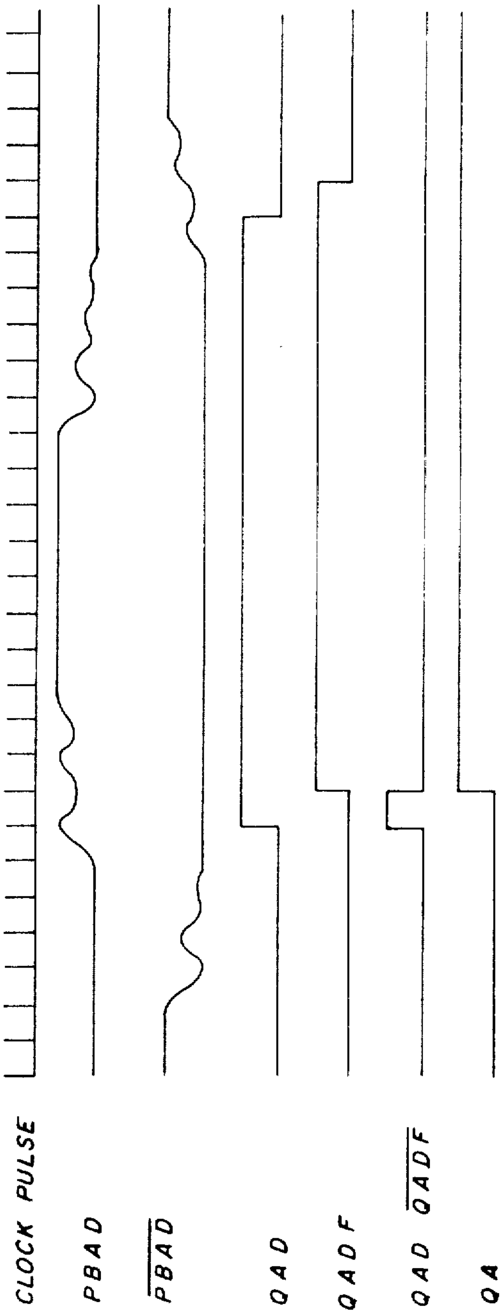
Figure 21:
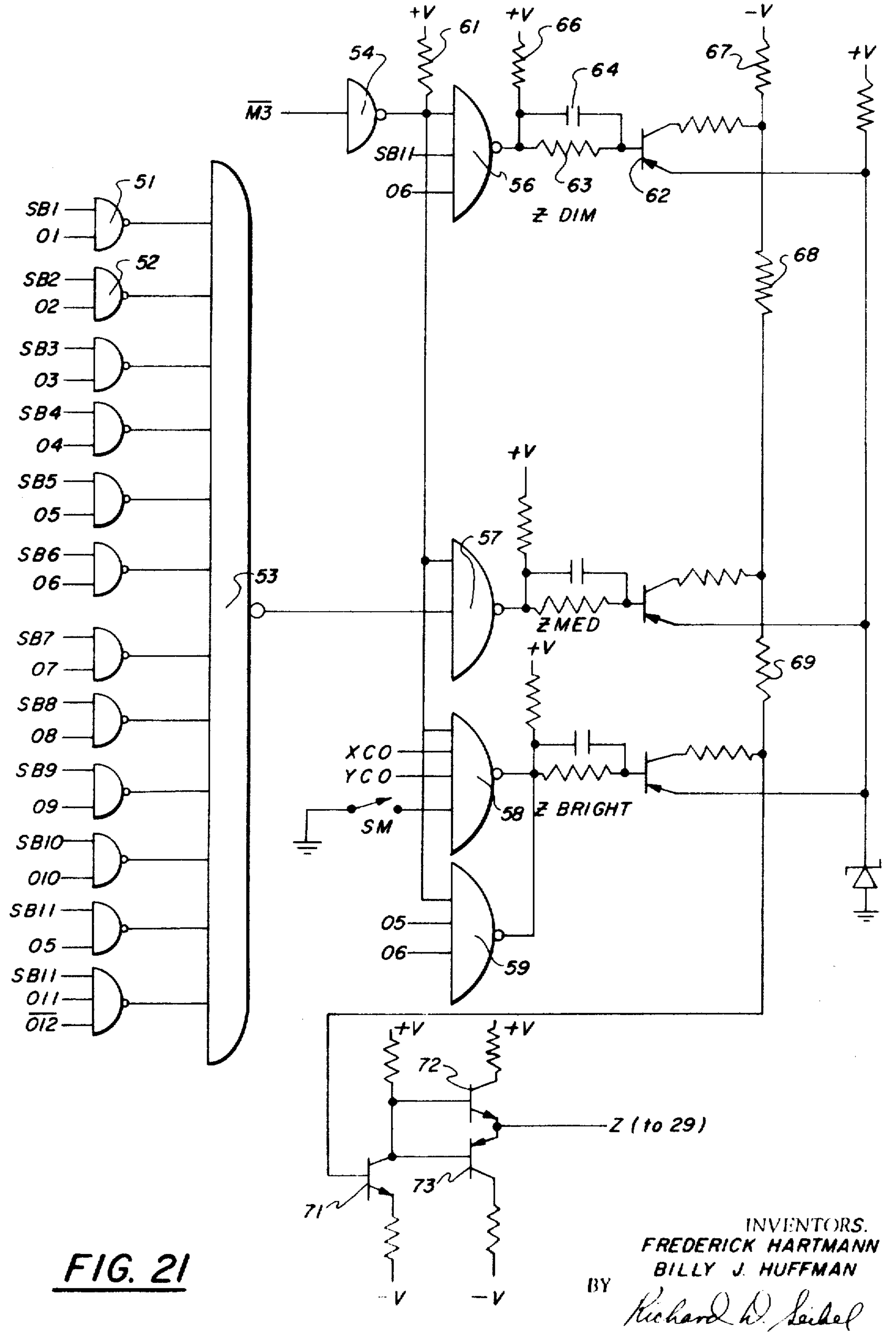
Figure 22:
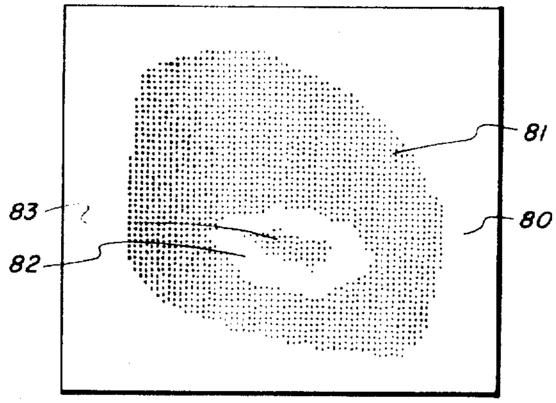

FIGS. 4A to 4S comprise a step-by-step reconstruction of the typical cross-section of FIG. 3;

FIG. 5 illustrates in block diagram form a digital computer for reconstructing the shape of an object;

FIGS. 6*a* and 6*b* illustrates additional detailed block diagram form of the digital computer of FIG. 5;

FIG. 7 illustrates a display screen array for a sample cross-section employed to describe operation of the digital computer;

FIGS. 8A to 8D illustrate operations in the digital computer in a first state P0 during data input;

FIGS. 9A to 9D illustrate operations in the digital computer in a second state P1 during data input;

FIGS. 10A to 10G illustrate operations of the digital computer in a third state P2 wherein points within a curve are found;

FIGS. 11A to 11D illustrate operations of the digital computer in a fourth state P3 wherein points without a curve are found;

FIGS. 12A to 12D illustrate operations of the digital computer memory in fifth state P4 wherein points without a curve are found;

FIGS. 13A to 13D illustrate operations of the digital computer in sixth and seventh state P5 and P6 wherein additional points without curves are found;

FIGS. 14A to 14D illustrate operations of the digital computer in an eighth state P7 wherein input data is added to memory contents stored in previous operations;

FIGS. 15A and 15B illustrate operations of the digital computer in a ninth state P8 wherein input data is added to memory contents stored in previous operations;

FIGS. 16A and 16B illustrate operations of the digital computer in a tenth state P9 wherein input data is added to memory contents stored in previous operations;

FIGS. 17A and 17B illustrate operations of the digital computer in an eleventh state P10 wherein input data is added to memory contents stored in previous operations;

FIGS. 18A to 18G illustrate operations of the digital computer in a twelfth state P11 wherein additional points within a curve are found;

FIG. 19 comprises a timing diagram of exemplary computer operations;

FIG. 20 comprises a timing diagram for start of computer operations;

FIG. 21 illustrates the display intensity control;

FIG. 22 shows a display of the cross-section of a finger; and

FIGS. 23*a* to 23*f* illustrate a step-by-step reconstruction from three viewing directions.

Throughout the drawings like reference numerals refer to like parts.

DESCRIPTION

The description of the apparatus hereinafter is detailed and believed to be in best sequence for optimum understanding. It may be desirable, however, to review the description in another order or to refer to other aspects of the description for details. Some of the detailed discussion may be of secondary interest to those extremely familiar with existing art and knowledge. The description is in the order set forth in Table I.

TABLE I

Figures 1, 2:
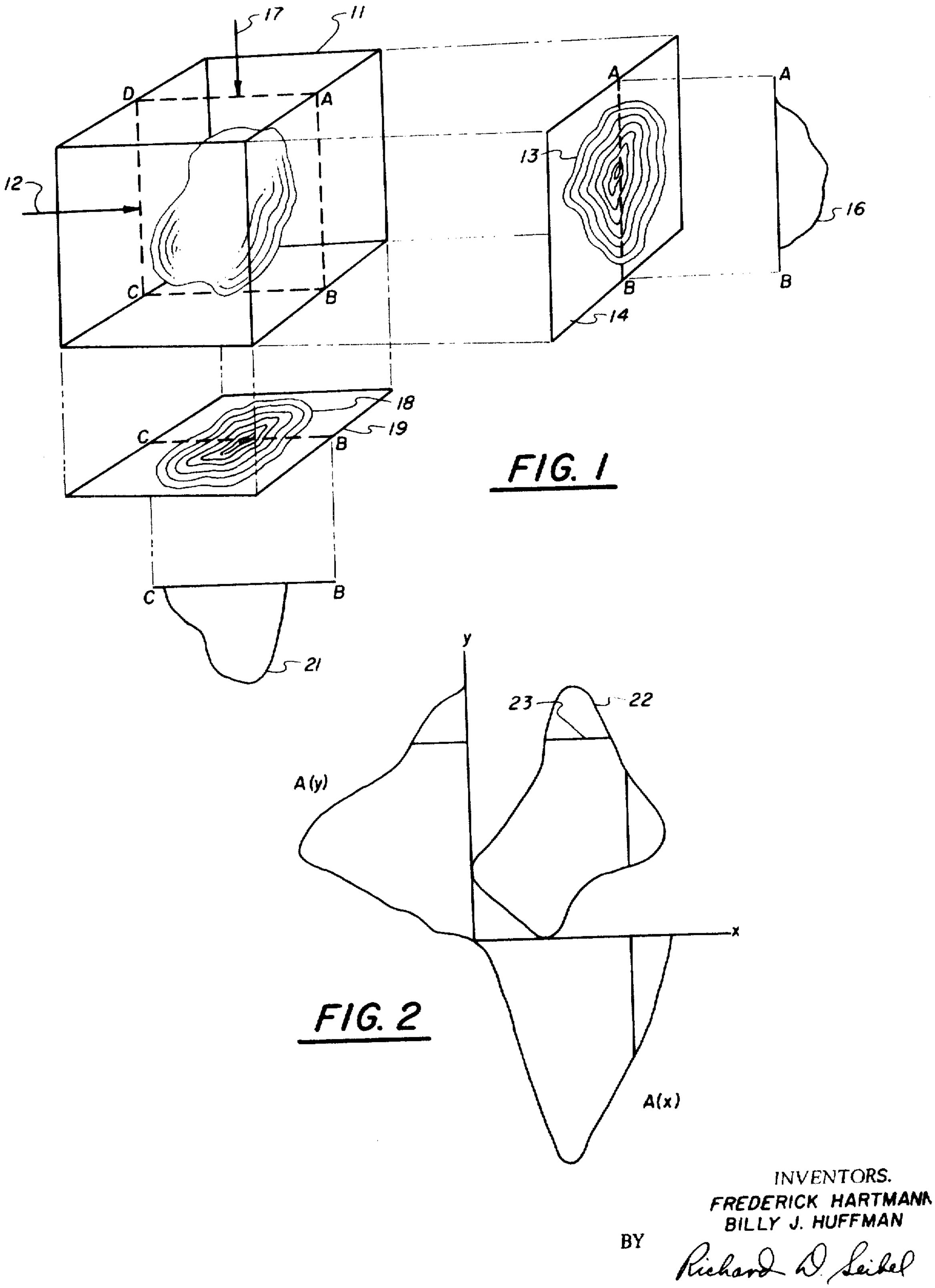
FIG. 1 illustrates a typical hidden object and thickness measurements made thereof.
FIG. 2 illustrates a typical cross-section of a hidden object.

| | |
|---|---|
| Cross-section reconstruction algorithm. | (pages 8 to 13; FIGS. 1 to 3.) |
| Algorithm and sample solution. | (Pages 14 to 33; FIGS. 4A to 4S.) |
| Special purpose computer description. | (Pages 33 to 41; FIGS. 5 and 6.) |
| Computer operating steps | (Pages 41 to 46.) |
| Nomenclature | (Pages 46 to 57) |
| Circuit design and components. | (Pages 58 to 80; FIGS. 6, 19 and 20.) |
| Program counter states | (Pages 80 to 86; FIG. 7.) |
| States P0 and P1 | (Pages 86 to 91; FIGS. 8 and 9.) |
| State P2 | (Pages 91 to 94; FIG. 10.) |
| States P3 through P6 | (Pages 94 to 103; FIGS. 11 to 13.) |
| States P7 through P10 | (Pages 103 to 117; FIGS. 14 to 17.) |
| State P11 | (Pages 117 to 120; FIG. 18.) |
| Display intensity control | (Pages 120 to 131; FIG. 21.) |
| Logical equations | (Pages 131 to 140.) |
| Multiple views | (Pages 140 to 149; FIGS. 22 and 23.) |

CROSS-SECTION RECONSTRUCTION ALGORITHM

FIG. 1 illustrates schematically a hidden object for which it is desired to obtain sufficient information to reconstruct the shape of the hidden object. As illustrated in this Figure a body 10 is hidden within an opaque surrounding material 11 which, for purposes of illustration, is shown as if transparent. The hidden body 10 has an irregular and unknown shape and the body 11 containing the hidden object is preferably of a regular shape or the shape must at least be known or determinable. In order to gain information concerning the hidden body 10 the article is illuminated with an X-ray beam 12 and an image 13 is obtained on a photographic film 14 with the image 13 having photographic density variations corresponding to absorption of the X-rays by the hidden body 10. For purposes of illustration, the image 13 is shown in the manner of a contour map with the contour lines following paths of equal photographic density. It will be apparent that the formation of an image depends on the body 10 having a different X-ray absorptivity from the surrounding material 11 as is the case in practical problems. The absorption of the hidden body may be higher, as in the case of bone flesh, or it may be lower, as in the case of a void in a casting, and the principle is equally applicable. It should also be apparent that in lieu of an X-ray beam 12 that a beam of ultrasonic energy, nuclear radiation, or the like can be employed.

The image 13 can also be a positive or negative image but for convenience of discussion will be considered to have an increasing density from an edge toward the center, corresponding to an increasing thickness of a hidden body 10 from an edge toward the center. It will be apparent that such a convexity will be present in regular hidden bodies, and that near the edge, the X-ray beam would pass through a relatively larger proportion of the surrounding material 11 and a relatively smaller portion of the hidden body 10 than near the center of the body where the X-ray beam would pass through a relatively smaller proportion of the surrounding material 11 and a relatively greater proportion of the hidden body 10.

It will be apparent that in order to reconstruct the entire shape of a hidden body it is only necessary to define the shape of a plurality of parallel cross-sections of that body and then reassemble these reconstructed cross-sections. For purposes of exposition herein the problem can then be considered as one of defining the shape of a closed curve in a single plane, always re-calling that the shape of a three-dimensional body is defined by a plurality of such closed curves.

In order to obtain data for solution of a closed curve in a plane, e.g., for determination of the shape of the cross-section of the body 10 in plane ABCD, measurement is made of the photographic density of the image 13 along a line AB across the image. Such a density scan of the image can readily be made with conventional densitometers or preferably, for most purposes, a microdensitometer which measures the photographic density in a very small area. A densitometer scan made across the image yields a curve 16 of density versus distance which is obviously a measure of the X-ray absorptivity or thickness of the hidden body 10 in a plane ABCD.

In a similar manner the hidden body is illuminated with an X-ray beam 17 in a direction angulated relative to the X-ray beam 12. For purpose of illustrations and simplicity the X-ray beams 12 and 17 are orthogonal, however, as will appear hereinafter any angular relationship therebetween can be employed without deviating from the principles of this invention. The X-ray beam 17 forms an image 18 of the hidden body 10 on a photographic film 19 placed on the opposite side thereof. In FIG. 1 the image 18 is drawn in the form of a contour map of the thickness of the hidden body in a direction along the X-ray beam 17. In the same manner as hereinabove described a microdensitometer scan is made along a line BC across the image 18 thereby yielding a density versus distance curve 21 representative of the thickness of the body 10 in the plane ABCD as viewed in the direction of the X-ray beam 17. Since the exposures may differ and the film density is not linearly related to thickness of the body, the curves must be transformed for film response as pointed out in the aforementioned copending application to find the thickness curve for the body.

The heights or thicknesses of the curves 16 and 21 need not be, and seldom are, equal since the hidden body is being viewed from two different directions. It will be apparent, however, that the area under the curve 16, after transformation to find thickness will equal the area under the curve 21 also transformed for thickness since both thickness curves represent the quantity of material in the body 10 located in the plane ABCD.

A typical closed curve problem is illustrated in slightly different form in FIG. 2. In this figure a closed curve 22 of the form $F(x,y)=0$, lies in an $xy$ plane, and for purposes of convenience, orthogonal $x$ and $y$ axes are selected to lie tangent to the closed curve 22. The horizontal width of the region enclosed by the curve 22 is plotted along the $y$ axis as the curve $A(y)$; that is, the length of a line 23 across the closed curve 22 is the same as the width of the curve $A(y)$ at the same y coordinate. In a similar manner the vertical length or height of the region enclosed by the curve 22 is plotted along the $x$ axis as the curve $A(x)$.

The basic problem to be solved is then: given only the curves $A(y)$ and $A(x)$, how can one reconstruct the original curve $F(x,y)=0$? That is, given only two thickness profiles, how does one determine the cross-section of the object in a plane common to the two thickness profiles?

A constraint on solution of the problem in the simple case set forth initially for purposes of exposition is that the closed curve has no more than two intersection points with any straight line in either the $x$ or $y$ direction. That is, the curve is not reentrant or concave in either the $x$ or $y$ direction alone. This property of the curve, which will be called hereinafter $x,y$-convexity, is less restrictive than general convexity. It will be apparent from an examination of the closed curve 22 that concavities do occur in the curve in the upper left and lower right positions, respectively, however, there is no concavity in either the $x$ or $y$ direction. In many practical problems in which a concavity does occur in a closed curve, rotation of the $x$ and $y$ axes or examination of the curve in non-orthogonal directions will satisfy the aforementioned constraint.

The curve 22 in FIG. 2 and the curves $A(y)$ and $A(x)$ are continuous or analog curves and in order to best solve the problem of reconstructing a curve it is preferable to express the problem in a digital form. For this reason a rectangular grid or matrix of any desired degree of fineness may be superimposed on the curve of FIG. 2 and the cure quantized according to the number of unit squares therein. Thus the region inside the curve 22 of FIG. 2 is changed as illustrated in FIG. 3 to a similar region 24 comprising unit squares, with gross boundaries of the curve 24 approximating the shape of the curve 22. It will be apparent that a finer grid than illustrated in FIG. 3 will more closely approximate an analog curve, however, for purposes of exposition, an approximation as presented in FIG. 3 is adequate. In a similar manner the analog curves $A(x)$ and $A(y)$ in FIG. 2 are converted to digital or quantized curves $A_x$ and $A_y$ as illustrated along the $x$ and $y$ axes respectively, in FIG. 3. The quantized curves $A_x$ and $A_y$ are also expressed as numerical values along the $x$ and $y$ axes, respectively, representing the total number of squares within the region 24 in the $x^{th}$ column and $y^{th}$ row, respectively.

Hereinafter, the squares inside of a closed curve will be designated as containing a 1 and those squares outside of the closed curve will be designated as containing a 0. This is not only a convenient means for distinguishing squares inside the curve from those outside and thereby defining the shape, but is a convenient nomenclature for the binary special purpose digital computer hereinafter described.

ALGORITHM AND SAMPLE SOLUTION

A very efficient algorithm has been developed for solution of the problem of determination of the shape of the closed curve or cross-section when only the thickness curves, $A_x$ and $A_y$ are known. The algorithm may be solved by hand, but is more readily applied to a digital computer for rapid solution of problems when a large number of units or quantized steps are in the $A_x$ and $A_y$ input curves. The algorithm involves the identification of elements (or squares in the matrix of FIG. 3) for which either a 1 or 0 is confirmed; that is, identification of those squares which must be either inside or outside of the closed curve. The algorithm is a superposition technique which comprises the application of several rules based mostly on the intersection properties of two sets. As pointed out hereinafter the quantized $A_x$ and $A_y$ values for each line can be considered as a contiguous set of 1's for a convenient nomenclature. The first two rules of the algorithm are:

1. Insert proven 1's in those spaces where the set of 1's in the respective column or row adjacent one margin overlaps the same set of 1's adjacent the opposite margin (at the center of all columns and rows in which more than half the length is occupied).
2. Insert wherever possible proven 0's at the ends of those columns and rows where proven 1's have been found before by Rule (1) and the set of 1's in the respective column or row cannot extend to the margin from the most remote proven 1.

These rules are explained, along with others hereinafter presented, by reference to a specific problem, namely, that of finding the shape of a closed curve such as illustrated in FIG. 3. The step-by-step solution of this problem is set forth in FIG. 4A to FIG. 4R. The basic problem to be solved is illustrated in FIG. 4A wherein the width of the curve $A_y$ in the $x$ direction is stated as a series of numerical values along the left margin of a rectangular 7×9 matrix of empty squares, i.e., the numerical values stated along the left side are those of the curve $A_y$ of FIG. 3. Similarly, along the bottom margin of FIG. 4A are numerical values representing the height of the closed curve $A_x$ of FIG. 3 in the $y$ direction, that is, the numerical values for the height of the curve $A_x$.

FIG. 4A also introduces some additional nomenclature of assistance in exposition of the above rules and others hereinafter set forth. The seven columns in the matrix of FIG. 4A are lettered from left to right, *a* through *g* along the top margin and the rows are numbered from top to bottom, 1 through 9 along the right margin so that any square in the matrix can be readily identified. Thus, for example, the lower right hand square in the matrix is identified as *g9*. The total width of the matrix along an $x$ direction is identified as $n$ for exposition of some of the rules hereinafter stated and the height of the matrix in the $y$ direction is stated as $m$ for similar reasons. It will be apparent that in the matrix of FIG. 4A the width $n$ equals 7 units and the height $m$ equals 9 units. In application of the rules, the columns and rows are treated similarly and "line" may be used hereinafter to refer to a column or row as may be applicable.

In FIG. 4B Rule (1) is applied to the columns. Beginning at the left side of the matrix column *c* is the first column in which the number of occupied squares (6) is greater than one-half of the length of the column 9. There is, therefore, a set of six 1's somewhere within the nine spaces in column *c*.

Since one of the constraints on the problems stated hereinabove is that there is no concavity in either the $x$ or $y$ direction, it is apparent that the 1's in each row and column must all be adjacent to each other. If this contiguous set of 1's is placed at the upper end of column *c* it will be seen that squares *c1* through *c6* are occupied by the set. Similarly, if the set of contiguous 1's is placed at the bottom of column *c* the 1's will occupy the squares *c4* through *c9*. This placement of the set in the uppermost and lowermost positions in the column shows an overlap or interaction of the two sets in spaces *c4*, *c5* and *c6*. That is, when the contiguous set of six is in the uppermost position in column *c*, squares *c4*, *c5*, and *c6* are occupied by 1's and also, when the set is in the lowermost position the squares *c4*, *c5*, and *c6* are occupied by 1's. Therefore, according to Rule (1) proven 1's are inserted in the centermost squares *c4*, *c5*, and *c6*, since the overlapping sets prove that this portion of the column must be within the closed curve. A moment's consideration will also confirm that any intermediate location (that is, away from the margins) of a contiguous set of six 1's in column *c* will have 1's in the spaces *c4*, *c5*, and *c6*.

Rule (1) is also applied to column *d* of FIG. 4B wherein a set of seven contiguous 1's is present and, by the same rationale, the two extreme sets overlap in spaces *d3*, *d4*, *d5*, *d6*, *d7*, and proven 1's are entered in those squares. In a similar manner, column *e*, which contains a set of six contiguous 1's, has proven 1's entered in spaces *e4*, *e5*, and *e6*.

Rule (1) is then applied to the rows of the matrix in a similar manner as illustrated in FIG. 4C. Row 4 of the matrix is the first in which the set of occupied spaces exceeds half the length of the row, however, the center squares of row 4 are already occupied and no additional unoccupied squares are within overlapping sets of 4. Although row 5 has one more occupied space than row 4, the application of this procedure makes the outcome of row 5 of FIG. 4C is similar to row 4. Row 6 has a contiguous set of six 1's within the seven squares of row 6 and the overlapping extreme left hand and extreme right hand sets establish that proven 1's can be entered in spaces *b6*, and *f6*, as well as in spaces *c6*, *d6*, and *e6* which were previously occupied by proven 1's. The new 1's added by application of Rule (1) to row 6 are underlined in drawings for purposes of illustration; and all 1's or 0's added in subsequent operations in FIG. 4 are designated by underlining while previously existing 1's or 0's in the matrix have no underlining. Row 7 of FIG. 4C has a contiguous set of five 1's and this set when shifted to the extreme left and right positions, respectively, overlaps in spaces *c7*, *d7*, and *e7*. New proven 1's are therefore entered in previously unoccupied squares *c7* and *e7* as indicated by underlining.

Rule (1) can also be stated algebraically that square or element $Axy$=1, (or is occuplied by a 1) if $(m-A_x+1) \leq y \leq A_x$ for the $x^{th}$ column and similarly, $A_{xy}=1$ if $(n-A_y+1) \leq x \leq A_y$ for the $y^{th}$ row.

Applying the algebraic expression to column *c* of FIG. 4B wherein $m=9$, and $A_x=6$, the expression then becomes $(9-6+1) \leq y \leq 6$(or $4 \leq y \leq 6$, and proven 1's can be entered in spaces *c4*, *c5* and *c6*). Application of Rule (1) to rows is, of course, similar.

Rule (2) can be stated in algebraic terms also. In a column the highest and lowest $y$ values of squares occupied by 1's after application of Rule (1) are designated as $y_{max}$ and $y_{min}$, respectively, (and similarly, $x_{max}$ and $x_{min}$ for a row). The condition where $A_{xy}=0$ in the $x^{th}$ column is stated by either $1 \leq y \leq (y_{max}-AX)$; or $(y_{min}+AX) \leq y \leq n$, similarly, the square $A_{xy}$ is occupied by a 0 in the $y^{th}$ row when $1 \leq x \leq (x_{max}-Ay)$; or $(x_{min}+Ay) \leq x \leq m$.

The algebraic expression of Rule (2) is applied to FIG. 4C beginning with row 3 which is the first row in which proven 1's are present. The equation $1 \leq x \leq (x_{max}-Ay)$ reduces to $1 \leq x \leq (4-2)$. Since this is true, for $x=1$, and $x=2$, proven zeros are entered in squares *a3* and *b3*, that is, the first and second squares in row 3. The equation $(x_{min}+Ay) \leq x \leq m$ reduces to $(4+2) \leq x \leq 7$ which is true for $x=6$ and $x=7$, and therefore, proven 0's are entered in spaces *f3*, and *g3*, that is, the sixth and seventh spaces on row 3.

This result can be visualized in a different manner when it is recalled that a constraint on the shape of the closed curve is that the 1's in a set are contiguous. In row 3, a 1 is already proven in space *d3* and therefore all possible sets of two occupied spaces in row 3 must overlap on square *d3*. The balance of the set of two 1's must therefore be in either square *c3* or *e3* and therefore cannot lie in any squares *a3*, *b3*, *f3*, or *g3* in which proven 0's can therefore be inserted.

Similar application of Rule (2) to row 4 of FIG. 4C causes insertion of proven 0's in spaces *a4* and *g4*.

When the rule is applied to row 5 the equation $1 \leq x \leq (x_{max}-Ay)$ reduces to $1 \leq x \leq (5-5)$ and $(x_{min}+Ay) \leq x \leq m$ reduces to $(3+5) \leq x \leq 7$, neither of which is true for any value of $x$ and therefore no proven 0's can be inserted in row 6 merely by application of this rule.

Application of Rule (2) to the columns of the matrix is illustrated in FIG. 4D with the principle of the application being substantially the same as for the rows. Upon application of this rule proven 0's are entered in squares *b1*, *b2*, *c1*, *e1*, *f1*, *f2*, and *f9* as indicated by underlining.

The first rule is used initially to find proven 1's and since it works on the full matrix size, it is not employed again. The second rule and seven additional rules complete the first part of the algorithm for entering proven 1's or proven 0's in the columns or rows of a matrix and these eight rules are repetitively applied to the problem to reach a solution. The next three additional rules are as follows:

3. Insert proven 1's in any unoccupied squares occurring in the same line (row or column) between two squares occupied by 1's.
4. Insert 0's into all unoccupied spaces that occur between the margin of the matrix and a space occupied by a 0, or between two 0's in the same line if the number of unoccupied spaces is insufficient to accomodate the required number of 1's occurring in that line (that is, the value of $A_x$ or $A_y$).
5. Insert proven 1's in all lines in which more than half of the "usable" length of the line must be occupied in the same general manner as in Rule (1).

The usable length of a line, $m'$ or $n'$ means the original length of the line $m$ or $n$ minus the total number of squares on the two ends of the line already occupied by 0's. Thus, for example, the usable length of row 3 in FIG. 4C is equal to 3 units, that is equal to the original length $n$, or 7 units less 4, which is the sum of the proven 0's already present in the two ends of row 3. The algebraic expressions set forth hereinabove for application of Rule (1) are applicable if $m$ and $n$ in these equations are replaced by $m'$ and $n'$, respectively.

Application of Rule (4) to the rows of the matrix is illustrated in FIG. 4E. In row 2 of FIG. 4E a single space exists at *a2* between a proven 0 and the margin, and the value of $a_y$ for row 2 is 2 units, that is, a set of two contiguous 1's must exist in row 2. This contiguous set cannot exist in the single space *a2*, and therefore, a 0 is inserted therein. Similarly, a 0 is inserted in space *g2* of FIG. 4E. The rule cannot be applied in row 1 of FIG. 4E since row 1 has but a single 1, or occupied space and spaces *a1* and *g1* are, therefore, not excluded merely by application of Rule (4).

The application of Rule (5) to the matrix is illustrated in FIG. 4F. Row 2 of FIG. 4F has a usable length of three units, that is, spaces *c2*, *d2*, and *e2* which are not already occupied by proven 0's. The required contiguous set ($Ay$) present in row 2 is two units or two 1's, and by application of Rule (5) employing the formulas of Rule (1) with the usable length $n'$ substituted therein, it is found that square *d2* is overlapped by the two extreme sets and a proven 1 is therefore inserted in square *d2*.

A corner rule can be stated which prevents decomposition of the enclosed areas within the curve into two separate curves. This is a consequence of the constraint that there be no $x$ or $y$ concavity in the closed curve. A corollary of the constraint is that there is only a single closed curve within the matrix of interest. The corner rule can be stated as follows:

6. Insert 0's in all corner squares if the corner is surrounded by 0's in both directions.

The application of this rule to the exemplary matrix is illustrated in FIG. 4G wherein the corner squares *a1* and *g1* are followed by 0's in both column and row and therefore a proven 0 is inserted in each of these spaces despite the fact that sufficient room exists in the corner to accomodate the set of one which is present in row 1.

Application of Rule (5) to columns is also illustrated in FIG. 4G and a proven 1 is entered in square *b7* which square is within the overlapping protion of the extreme positions of a contiguous set of four 1's in the 6 square usable length of column *a*. The application to columns is the same as application to rows described hereinabove.

An additional application of Rule (5) to row 2 is illustrated in FIG. 4F wherein will be noted that an additional proven 1 is added to column *d*. Therefore a repeated application of Rule (2) adds *a* proven 0 to square *d9* since the equation $(y_{min}+A_x) \leq y \leq n$; or $(2+7) \leq y \leq 9$, is true for $y=9$ (See FIG. 4H).

Three line completion rules complete the first part of the algorithm for solution of the problem of finding a closed curve.

7. Complete a line with 0's if the number of proven 1's equals the total required $A_x$ or $A_y$ value.
8. Complete a line by inserting 1's into all unoccupied spaces if the number of proven 0's equals $m-A_x$ or $n-A_y$, respectively.
9. Complete a line by adding the remaining 1's (up to the total $A_x$ or $A_y$) and 0's if a proven 1 occurs at a margin of the matrix or adjacent to a proven 0.

Application of Rule (8) is illustrated in FIG. 4H. Row 1 has a single unoccupied space at square *d1* and a single 1 ($A_y$) is present in row 1, therefore, a proven 1 is entered in space *d1* thereby completing this row. Rule (2) is also applied to row 7 in FIG. 4H to insert a proven 0 in space *g7*.

Application of rule 7 to the exemplary matrix is illustrated in FIG. 4I in column *d* wherein seven proven 1's are already present and a proven 0 is therefore inserted in *d8* to complete this column.

Examination of FIG. 4I shows that none of the abovementioned nine rules of the algorithm will permit or cause the insertion of any additional proven 1's or proven 0's in the matrix and therefore a complete solution cannot be obtained with only these rules. The second part of the algorithm is therefore applied. This involves an arbitrary assignment of first a 1 and later a 0 (or vice versa) to an unoccupied square in the matrix. It is found that an arbitrary selection nearest a corner of the matrix yields a solution rapidly and in order to minimize the number of such arbitrary assignments in a practical situation, the assignments are always made nearest one corner of the matrix.

It has been found convenient to first make an arbitrary assignment of a 1 for the unoccupied space that is highest and nearest the left side of the matrix. For convenience, this is designated as the Northwest Corner Rule. As will be apparent hereinafter, it is also preferable to arbitrarily assign a value of 0 for the same blank space after a solution is obtained (if possible) for the assignment of a 1 to the unoccupied space. This is done so that if multiple solutions are possible, all will be identified.

Thus, as illustrated in FIG. 4J, a value of 1 is arbitrarily assigned to square *c2* which is the Northwest-most square in the matrix that is unoccupied. The solution then returns to a sequential application of Rules (2) through (9) to the matrix in substantially the same manner as hereinabove described, applying the rules to columns and rows alternately until either a solution is achieved or it is clear that no solution is possible without an additional application of the Northwest Corner Rule. Thus, by application of Rule (7) to rows in FIG. 4J, a proven 0 is entered in space *e2* since the value of $A_y$ is two and the arbitrary assignment of a 1 to space *c2* completes the set of 1's in row 2. Referring to FIG. 4K, Rule (3) is applied and a proven 1 is inserted in square *c3*. Application of Rule (7) causes the insertion of proven 0's in spaces *c8* and *c9* thereby completing column *c*. Application of Rule (7) for rows causes insertion of a proven 0 in space *e3*, thereupon application of Rule (8) to columns causes insertion of proven 1's in spaces *e8* and *e9* thereby completing column *d*.

In FIG. 4L application of Rule (7) causes insertion of proven 0's in spaces *a9*, *b9*, and *g9*, thereby completing that row. Application of Rule (9) causes insertion of a proven 1 in space *f8* and a proven 0 in space *g8*. Reapplication of Rule (9) to FIG. 4L completes row 8 by insertion of proven 0's in spaces *a8* and *b8*.

Referring to FIG. 4M application of Rule (3) to columns inserts a proven 1 in space *f7* and application of Rule (7) completes column *f* by insertion of proven 0's in spaces *f4* and *f5*. Column b is completed by insertion of proven 1's in spaces $b4$ and $b5$ according to Rule (8). Application of Rule (9) to row 5 inserts a proven 1 in space $a5$ and a proven 0 in space $g5$ thereby completing that row. Application of Rule (7) to row 7 inserts proven 0's in spaces $a7$ and $g7$ thereby completing that row.

Application of Rule (7) in column a inserts a proven 0 in space $a6$ and application of Rule (8) completes column $g$ as illustrated in FIG. 4N thereby yielding a solution to the problem and defining a region bounded by a closed curve as indicated by the bold outline in FIG. 4N.

It will be recalled that this solution was obtained by application of the Northwest Corner Rule wherein an arbitrary 1 was assigned to space $c2$ in order to obtain a solution after repeated application of the nine rules of the first part of the algorithm failed to establish any additional proven 1's or proven 0's. Therefore, in order to complete the solution and find all possible closed curves fitting the input data $A_x$ and $A_y$ an arbitrary 0 is inserted in space $c2$ and solution for the closed curve is conducted in substantially the same manner as hereinabove described. Thus, as illustrated in FIG. 4–0, an arbitrary 0 is inserted in space $c2$ and row 2 is completed by insertion of a proven 1 in space $e2$ in accordance with Rule (8).

In FIG. 4P a proven 1 is inserted in space $e3$ in accord with Rule (3) and proven 0's are entered in spaces $e8$ and $e9$ in accordance with Rule (7) (or Rule (9)). Rule (7) is then applied to row 3 to insert a proven 0 at space $c3$ and column $c$ is completed with proven 1's in $c8$ and $c9$ in accord with Rule (8).

Rule (7) completes row 9 as illustrated in FIG. 4Q and Rule (9) is employed to complete row 8 in the same manner as hereinabove described.

Column $b$ is complete by application of Rule (9) as illustrated in FIG. 4R; and application of Rule (5) to column $f$ causes insertion of a proven 1 in space $f5$ in a manner substantially the same as hereinabove described. Row 4 is then completed by insertion of a proven 0 in space $a4$ in accord with Rule (4) followed by insertion of a proven 1 in space $f4$ and a proven 0 in space $g4$ in accord with Rule (9). Similarly, row 5 is completed in FIG. 4R by application of Rule (7).

The bounds of the closed curve are then defined by completing the matrix as illustrated in FIG. 4S. Application of Rule (8) inserts a proven 1 in space $g6$ and therefore a proven 0 is inserted in space $a6$ in accord with Rule (7). Rule (8) causes insertion of a proven 1 in space $a7$ and finally Rule (7) causes insertion of a 0 in space $f7$ to define the closed curve set forth in bold lines in FIG. 4S wherein all of the proven 1's are within the region bounded by the curve and the proven 0's are all outside of the region bounded by the curve. It will be noted that the closed curve of FIG. 4S found by use of a 0 in the Northwest Corner Rule is not a mirror solution of the closed curve of FIG. 4N found by application of a 1 in the Northwest Corner Rule. It will also be seen that the closed figure defined in FIG. 4S is identical to the closed curve from which the $A_x$ and $A_y$ curves where obtained, as illustrated in FIG. 3, thus showing that one of the two possible solutions of this particular problem is the correct solution. In this example, both additions made in accord with the Northwest Corner Rule yielded possible solutions. In some instances one of the additions of a 1 or a 0 yields a situation where no solution is possible, such as, for example, presence of both a "proven" 1 and a "proven" 0 in the same space. Such a "solution" is rejected.

The question of multiple solutions of problems is seldom of any practical significance since other factors normally indicate which of two or more "correct" solutions truly is representative of the cross-section measured. Thus the ambiguity raised by multiple solutions is readily resolved, for example, by solving the problem for the same closed curve viewed from a third direction different from the original two directions. It may also occur that one of the "correct" solutions may be summarily rejected based on other emperical evidence or experience. Further, as a very practical matter, multiple solutions having significant differences therebetween, are relatively rare when the size of the matrix is increased significantly. In the example set forth hereinabove the matrix is only 7 units by 9 units, and two solutions are obtained having appreciably different shapes. On a matrix 128×128 units, for example, it is found that ambiguous solutions of this nature are extremely rare and normally the multiple solutions which may occur are in one or two squares only, along the edge of the closed curve. The "error" introduced by the occasional ambiguous solutions is usually small and often well with the errors present in originally gathering the input data.

It will often occur in application of the Northwest Corner Rule that one of the arbitrarily assigned values leads to no valid solution and in that situation no ambiguity at all exists. It may also occur in application of the Northwest Corner Rule that application of the nine rules of the first part of the algorithm may lead to another "dead end" in which no additional proven 1's or proven 0's can be added to the matrix based on application of the nine rules alone. In that case the Northwest Corner Rule is again applied by successively adding a 1 and a 0 in another Northwest corner square as hereinabove described, and the nine rules of the algorithm are then applied with successive applications of the Northwest Corner Rule being employed as required until a solution is obtained. It will be recognized that it is possible at each application of the Northwest Corner Rule to double the number of possible solutions. It is found, however, that this does not ordinarily occur and may of the applications of the Northwest Corner Rule result in one of the arbitrary assignments yielding a situation where no solution is possible, such as, for example, a situation where an $x$ or $y$ concavity occurs or a line is filled with proven 0's and less than a sufficient number of proven 1's. These and other similar anomolous results are rejected.

The algorithm for finding the shape of a cross-section can be solved from $A_x$ and $A_y$ data in the manner pointed out hereinabove. It will also be apparent that the algorithm can be implemented with merely additions, subtractions, and comparisons and therefore a program is readily written for a general purpose computer so that the shape of the cross-section can be determined more rapidly for a large matrix than by a hand technique. The programming of a general purpose computer to determine the shape is quite effective for situations where the $A_x$ and $A_y$ data are consistent and the solution may proceed to completion with one or more shapes determined.

It may happen in practical situations, however, that inconsistent input data is involved so that a solution, whether worked out by a hand or by computer, indicates that both a proven 1 and a proven 0 occur in the same matrix location. This type of an inconsistency can very well arise in practical situations where measurement errors and rounding off to convert analog information to digital information are present. Thus, for example, due to the afore-mentioned errors it is often found that densitometer scans of two X-ray photographs of an object, for example, yield $A_x$ and $A_y$ digital thickness curves which do not have exactly identical areas thereunder.

Although general purpose computer programs capable of handling many types of inconsistent data can be written, it is usually preferable for optimum operation that adjustment of the inconsistent data be based on partial solutions and involve the type of judgement that a skilled operator can employ. A preferred mode of solution for finding the closed curve or cross-section from $A_x$ and $A_y$ data, therefore first computes the proven regions within and without the closed curve to the extent possible by application of the above-described rules, and then employs human judgment to select near optimum variation from the inconsistent data to form a closed curve in accord with other evidence and experience.

Although a solution can be obtained with a general purpose computer, it is an inefficient utilization of such apparatus to compute the shape of a closed curve from thickness data since the general purpose computer does not allow convenient human interaction with the computer during operation of the program. In order to permit rapid human interaction, display of the computed curve should be available at all times as the interation approaches the final curve shape and there should also be convenient input for manual instructions to the program. When the greater convenience of human interaction is desired a general purpose computer may be provided with a display, however, it is generally found that modifications of general purpose computers to permit continuous or substantially continuous display of results are excessively complex or expensive.

Therefore, in the solution of many practical problems it is highly desirable to employ a special purpose digital computer so that an economical display is continuously available and provision is made so that convenient human interaction with the computer is available at any stage during operation of the computer. Such a special purpose computer is quite economical compared with a display modified general purpose computer since only the elements necessary for solution of the problem are provided and many extraneous and unused portions of a general purpose computer are not required for solution of the particular problem.

SPECIAL PURPOSE COMPUTER DESCRIPTION

As indicated above, a special purpose digital computer provides an excellent way for performing the algorithm steps set forth hereinabove, displaying the resulting shape of the curve and permitting easy correction of input data to accomodate inconsistencies and the like. This special purpose computer implements the basic algorithm by high speed computation and selectively displays input data and computational results in various stages on a cathode ray tube. In addition, the apparatus shows data inconsistencies by interrupting the computation and identifying the location of inconsistency on the cathode ray tube. Further, means are provided for readily changing the input data to minimize or eliminate inconsistencies.

As pointed out hereinabove the curve to be found is considered to lie in a two dimensional matrix which can be displayed in graphical form by an array of 1's in the region within the curve and an array of 0's in the portion of the matrix outside of the curve. The special purpose computer employs a magnetic core memory arranged in a plurality of planes, each of which planes has a two dimensional array of memory elements in a direct spatial analogy to the matrix in which the curve lies. Each memory element thus has a direct relation to a corresponding element in the matrix in which the curve lies. Thus, for example, by storing data such as 1's in individual memory elements in a memory plane, the shape of the curve can be stored in the memory matrix.

The spatial analogy provided by the special purpose computer is continued in a display which features a matrix of intensified spots on a cathode ray tube, for example. The matrix of spots bears a direct relation to the matrix of the memory and also the matrix in which the curve lies. Thus, there is a triple analogy in the graphical matrix in which the curve lies, the plurality of matrixes in the memory core, and the display for the results of computation.

Such a special purpose digital computer for finding the shape of a closed curve from measurements of the width and height of the curve is illustrated in block diagram form in FIG. 5. The individual elements of the block diagram of FIG. 5 are further detailed in FIG. 6 and the detailed logic of the elements of the block diagram of FIG. 6 are further pointed out in detail hereinafter.

Referring specifically to FIG. 5 there is provided a data input system 26 which, in a preferred embodiment, is a conventional photoelectric punched tape reader, many styles of which are commercially available. It will be apparent that magnetic tape, punched card, or similar readers can be employed for entering data into the computer in the form of numerical values for the $A_x$ and $A_y$ curves hereinabove described. Alternatively, manual switches can be employed for data input and in a preferred embodiment it is found convenient to provide both an automatic input system and means for making manual data inputs to the computer for resolving data inconsistencies as may be noted in operation of the computer.

The input data, from whatever data input mode is selected, is applied to a memory control 27 which comprises a conventional logical network for applying the input data to appropriate locations in a memory 28.

In a preferred embodiment the memory 28 comprises a conventional magnetic core memory, which, for example, may comprise a 16,384-word, 24-bit core memory such as is readily commercially available. Such a memory has 24 planes of memory cores, with each core plane having 16,384 individual cores in 128 rows of 128 cores each. Thus each core plane can be considered to have 128 rows and 128 columns in a matrix analogous to the matrix in which the curve lies. The designation of an x and a $y$ value identifies a location in the rows and columns of all of the core planes and such a memory can store a 24-bit binary number at a given $x,y$ location. In the special purpose computer described herein, the individual cores are individually employed and read by selecting one (or more) core plane and a given $x,y$ location.

The 16,384-word memory provides a matrix in each core plane, 128 elements high and 128 elements wide as compared with the 7×9 element matrix employed in the sample problem hereinabove worked on a step-by-step basis. It will be apparent that larger or smaller matrixes and core memories can be employed if desired to provide any given fineness of grid in the matrix. There may also be provided manual or automatic means for reducing the effective size of the matrix from the maximum available 128×128 cores when the largest number of occupied elements in a row or column is substantially less then the full memory size.

The 24-bit core memory, having 24 core planes (or 24 "-parallel" matrixes of 16,384 cores), actually has excess capability for solution of a simple problem having a single convex closed curve since only 12 of the core planes are actually employed in the problem solution pointed out hereinafter. Additional core planes are, however, employed in the solution of problems having multiple closed curves in the same region or in solution of problems wherein the closed curve is viewed from more than two directions at the same time; that is, when in addition to $A_x$ and $A_y$ curves there is a third viewing direction yielding a curve $A_z$. Such a solution with multiple viewing directions reduces the number of inconsistencies requiring human judgment since objective means may be provided for resolving such inconsistencies.

A significant element in providing for interaction of human judgment with the special purpose computer involves a display device 29 for continuously displaying selected results or interim results of operation of the computer as well as the completed solution. The display device 29 in a preferred embodiment comprises a conventional oscilloscope or similar cathode ray tube display. An oscilloscope is a convenient display device since the power supplies, gain controls, and the like are contained in a single commercially available package. In addition the display device 29 may include digital to analog converters (not shown in FIG. 5) for converting the digital information processed in the computer to analog information for display on the cathode ray tube. It will also be apparent that the display device may include means for providing a permanent record of computer results such as conventional "-print-out" equipment which may store an output on punched tape, magnetic tape, or the like. It has been found convenient for many purposes to merely photograph the face of the cathode ray tube at the completion of the program in order to store the results.

The display on the face of the cathode ray tube, or similar display device 29, is preferably in the form of a matrix of dots with each of the dots corresponding to a space or square of the memory matrix and hence also to an element in the matrix in which the curve lies. Each dot represents a given $x,y$ location in the matrix and the intensity of the dot is employed for indicating the state of a memory core corresponding to the same $x,y$ location. The display dots or elements, therefore, correspond to memory words in the memory 28. In order to generate a display matrix or raster, $x$ and $y$ deflection control for the cathode ray tube is provided by output of display sweep control 31. As pointed out hereinafter, $x$ and $y$ counters are employed as a display sweep control for generating a raster scan for defining the matrix. The count on the $x$ counter operates through a digital-to-analog converter to generate an $x$ deflection voltage and the count on the $y$ counter operates through a second digital-to-analog converter to generate the $y$ deflection voltage for the cathode ray tube. Since the deflection voltages are in digital steps and $x$ and $y$ deflection voltages are in steps defining a matrix of dots rather than a continuum.

As pointed out hereinafter the computer is synchronously operated and the $x$ and $y$ sweep controls of the display sweep control 31 deflect the beam of the display CRT to successive spots in the matrix (or raster) at each clock pulse of the computer. In addition, the output of display sweep control 31 is coupled to the memory control 27 so that memory information is sampled in synchronization with the output of the display sweep. Thus at a given $x,y$ location the state of the cores in that $x,y$ location in the core memory are read (or written) at the same time as the corresponding spot on the face of the display device 29 is illuminated. Thus the display dots or elements correspond directly to memory elements in the memory 28.

The intensity of the dots on the display device indicates the content of one or more of the core planes in the memory. The beam intensity (or $z$ axis control) in the cathode ray tube is varied to provide different dot brightnesses to display the presence or absence of 1's and 0's in the memory as hereinafter described in greater detail. Normally, the dots are just barely illuminated so as to be distinguishable from the background on the cathode ray tube. Three different increased intensities above background are provided for displaying the results during and after operation of the computer. Normally, a dot of bright intensity represents a logical 1 in the memory core plane selected for display on the cathode ray tube. A lesser or medium intensity dim dot is also provided so that two separate core planes can be displayed simultaneously on the cathode ray tube. This provides the ability, for example, to display proven by bright dots at a selected stage in computation with medium intensity dots and display proven 0' s with lesser intensity dots. Thus the regions within and without the curve are identified and dots having only background illumination indicate the areas still to be solved. In addition, a bright dot is provided for "marking" a location in the matrix as desired, Intensity control is described in greater detail hereinafter.

Memory selector 32 samples selected core planes in the memory 28 corresponding to memory word bits and the presence or absence of a 1 or 0 in a selected word bit or core plane determines the brightness of an individual spot in the display matrix. If, for example, the memory selector 32 is set for core plane 1 in the memory the content of this core plane is displayed on the cathode ray tube. The memory selector 32 is also coupled to the memory control logic 27 so that data input can be made in any of the core planes of the memory.

COMPUTER OPERATING STEPS

In operation the computer proceeds in a plurality of individual steps each of which has selected logical sequences. These programmed steps are selected and operated by program step control 33 which is sequenced and controlled by information from the display sweep 31 and the memory control logic 27. The program step control 33, in turn, sequences certain aspects of the display sweep 31; for example, selection of a sweep direction and also affects operations of the memory control 27 for adding information to selected core planes in the memory. The program step control 33 and other elements of the block diagram of FIG. 5 are further described as structural elements hereinafter and also described in terms of the functions performed by the various elements. Each program step involves a single scan of the entire matrix, however, the individual rows (or columns) may be scanned 1, 2, or 3 times in the matrix scan depending on the step being performed. Likewise in a matrix scan, more than one core plane may be involved and more than one arithmetic operation may be occuring.

Broadly, the computer proceeds in two major stages each of which has several steps controlled by the state of a program counter P (FIG. 6A). The first stage comprises program counter states P0, P1, and P2, and this stage is performed once at the commencement of a problem solution and is not repeated. The second stage comprises program counter states P3 through P11 and this cycle of steps is repeated until a solution is obtained. The several program counter states, and operations of the computer during the program counter states are outlined in TABLE II, which will be further described in detail as this exposition proceeds.

In program counter state P0 the $A_x$ data is stored in core planes 1 and 2. In core plane 1 the $A_x$ data is stored adjacent the bottom margin of the matrix and in core plane 2 the data is stored adjacent the top margin of the matrix as pointed out hereinafter. In program counter state P1 the $A_y$ data is stored in a similar manner in core planes 3 and 4. In program counter state P2 the overlap of $A_x$ data in core planes 1 and 2 and the overlap of $A_y$ data in core planes 3 and 4 is found and 1's are entered in core plane 5 in the region where an overlap is present in either of these combinations. It will be apparent that this region of overlap is the first region of proven 1's within the closed curve and is an implementation of Rule (1) of the above stated algorithm.

TABLE II

| | Program counter state | Process performed | Stored in core plane | Counter | Fast scan direction N0 | Fast scan direction N1 | Fast scan direction N2 | Slow scan direction | Read-write scan N0 | Read-write scan N1 | Read-write scan N2 |
|---|---|---|---|---|---|---|---|---|---|---|---|
| First stage | P0 | Store $A_x$ bottom | 1 | B | Up | | | Right | W(1) | .......... | |
| | P0 | Store $A_x$ top | 2 | F | Up | | | do | W(2) | .......... | |
| | P1 | Store $A_y$ left | 3 | B | Right | | | Up | W(3) | .......... | |
| | P1 | Store $A_y$ right | 4 | F | do | | | Up | W(4) | .......... | |
| | P2 | (1) (2)+(3) (4) | 5 | .......... | Up | | | Right | W(5) | .......... | |
| Second stage | P3 | (5) y max+1−(1) | 6 | B | Down | Up | | do | R(5) (1) | W(6) | |
| | P4 | (5) y min−1−(2) | 6 | F | Up | Down | | do | R(5) (2) | W(6) | |
| | P5 | (5) x max+1−(3) | 6 | B | Left | Right | | Up | R(5) (3) | W(6) | |
| | P6 | (5) x min−1−(4) | 6 | F | Right | Left | | Up | R(5) (4) | W(6) | |
| | P7 | (6) y min+(1) | 7 | F | Up | Up | Down | Right | R(6) | R(1) | W(7) |
| | P8 | (6) y max+(2) | 8 | F | Down | Down | Up | do | R(6) | R(2) | W(8) |
| | P9 | (6) x min+(3) | 9 | F | Right | Right | Left | Up | R(6) | R(3) | W(9) |
| | P10 | (6) x max+(4) | 10 | F | Left | Left | Right | Up | R(6) | R(4) | W(10) |
| | P11 | (7) (8)+(9) (10) | 5 | .......... | Up | | | Right | W(5) | .......... | |

Program counter states P3 through P6 implement Rule (2) of the algorithm and proven 0's are entered in core plane 6 at the bottom, top, left, and right sides of the matrix, respectively. Program counter state P3 is typical of the operations of the computer in these four program states. In counter state P3 the $A_x$ value is subtracted from the y value of the top proven 1 in each column as recorded in core plane 5, and the result is stored as proven 0's in core plane 6.

During program counter states P7 through P11 Rules (3), (4), (5), (7), and (8) are executed. In general it is not found necessary to specifically implement Rules (6) and (9) for large matrixes since these special situations are accounted for in executing the other rules of the algorithm. Rule (8) is a special case of Rule (5) and is executed therewith and Rule (7) is executed upon iteration of Rule (2). In program counter states P7 through P10 the input data ($A_x$ or $A_y$) is added to the number of proven 0's adjacent each margin, respectively, and the resultant sums are stored in memory core planes 7 through 10, respectively. This operation is a preparatory step for execution of Rule (5) of the algorithm and also implements the fill-in Rules (3) and (4).

In program counter state P11 Rule (5) is completed by finding the overlap of the stored sums in core planes 7 and 8 or 9 and 10. This overlap establishes a new enlarged region of proven 1's and is employed to update the information in core plane 5 which records proven 1's. After program counter state P11 the computer returns to program counter state P3 and iteration through states P3 through P11 continues until no change in proven 1's or proven 0's is obtained.

In all of the program counter states the computer operates by counting, proceeding element by element along each row or column, counting the number of 1's stored in the pertinent memory core plane with the commencement, interruption, or ending of counting being triggered by bits in the respective memories as pointed out in detail hereinafter. Although the algebraic expressions for the operations occuring are in terms of additions and subtractions these functions are obtained in the special purpose computer by forward or backward counting. Thus counters and comparison logic are the principal elements of the simple special purpose computer.

NOMENCLATURE

Nomenclature employed herein is conventional Boolean symbology for AND and OR, thus adjacent terms in a logical equation are ANDed and a plus sign is used to indicate that the signals are ORed. A signal with a bar over the top is an inverse or false signal the signal itself, of course, being true in logical equations. When appropriate, *a*1 is employed to indicate a true signal, and *a*0 a false signal. Output signals from an element of the computer such as a counter are keyed to the identification of that element. Thus, for example, outputs indicating counts 0, 1, 2, etc., of the scan counter N (described hereinafter) are indicated as N0, N1, N2, or the like, respectively.

Conventional binary notation is employed for numerical values in the several counters of the computer. Thus, for example, the count 0 in the scan counter determines counter state N0 and is indicated when both flip-flops Q3 and Q4 forming the scan counter as set forth hereinafter are false ($N0 = \overline{Q3}\,\overline{Q4}$). The count 1 is indicated when the first flip-flop in a counter is true and the second and subsequent flip-flops are false. Thus in scan counter N the count is 1 which corresponds to counter state N1 when the flip-flop Q3 is true and the flip-flop Q4 is false ($N1 = Q3\,\overline{Q4}$). Likewise, the counts 2 and 3 in the scan counter are given by the logical equations $N2 = \overline{Q3}\,Q4$ and $N3 = Q3\,Q4$, respectively.

In order to provide a full and complete exposition of the computer the logical equations setting forth the interconnection between structural components are collected in a single location at the end of the description of this embodiment. In general, the logical terms are readily identified with the particular counter, flip-flop, or other element by consistent use of the same letter designations. Input (I) and reset (R) symbols precede the identified element; thus, for example, IN is the input to the scan counter N, IP is the input to program counter P, and I6 is the input to memory core plane 6, etc. Output states follow the element identification; thus N1 indicates counter state 1 for the scan counter N, P3 indicates the counter state 3 for the program counter P, etc.

As will be apparent hereinafter a number of counters are employed in the computer and these are all conventional synchronous, parallel carry, binary types, using J-K flip-flops. The J-K flip-flops are commercially available bi stable devices with set (*j*) and reset (*k*) inputs for setting the flip-flop to the true or 1 state and resetting the flip-flop to the false or 0 state. Parallel carry gating is preferred over serial carry gating for increased speed.

As developed in implementation of logic hereinafter set forth it was also found convenient to employ conventional diode-transistor logic (DTL) with the several flip-flops so that NAND gating is used in substantially all places. Commercially available integrated circuit NAND gates were used throughout the logic. The NAND gate is, in effect, an AND gate plus an inverter so that a true signal from the AND gate comes false and vice versa. By suitably arranging the NAND gates in conventional manner, the canonical forms of AND, OR, and the like, are readily obtained. The flip-flops are interconnected by way of the logical gates to form the necessary counters, decoders, and other logic circuitry for the computer. The several counters in the computer have conventional input controls to enable forward or backward counting and resetting or presetting of counts as identified hereinafter. As a matter of practice the counting-enable inputs to the computer are generally inhibited during reset or preset to avoid unintentional insertion of an incorrect count signal.

The several counters in the computer are of conventional arrangement with a plurality of flip-flops serially connected for counting. The individual flip-flops forming the counters are identified by the letter "Q" and a numeral which also identifies the output signal from the individual flip-flop. In addition to the flip-flops in the counters several control flip-flops are employed in various operations as set forth hereinafter. These flip-flops are also identified by the letter Q followed by one or more additional letters identifying the particular flip-flop. TABLE III identifies the principal flip-flops employed in the logic of the computer and identifies which of the several counters identified hereinafter it forms a part of. TABLE III also identifies the least significant bit (LSB) and most significant bit (MSB) for each of the counters of the data processor. TABLE III also identifies several switches and pushbuttons employed on the panel of the special purpose computer for purposes set forth briefly in the table and explained in greater detail hereinafter. Generally, an S indicates a switch which is further identified by a letter and/or numeral and a pushbuttom is identified by a PB and a letter designation.

TABLE III

| | |
|---|---|
| Time Counter M | Q1 - LSB<br>Q2 - MSB |
| Scan Counter N | Q3 - LSB<br>Q4 - MSB |
| X Fast Counter XF | Q5 - LSB<br>Q6<br>Q7<br>Q8<br>Q9<br>Q10<br>Q11 - MSB |
| X Slow Counter XS | Q12 - LSB<br>Q13<br>Q14<br>Q15<br>Q16<br>Q17<br>Q18 - MSB |
| Y Fast Counter YF | Q19 - LSB<br>Q20<br>Q21<br>Q22<br>Q23<br>Q24<br>Q25 - MSB |
| Y Slow Counter YS | Q26 - LSB<br>Q27<br>Q28<br>Q29 |

TABLE III (Continued)

| | |
|---|---|
| | Q30 |
| | Q31 |
| | Q32 - MSB |
| Program Counter P | QP1 - LSB |
| | QP2 |
| | QP3 |
| | QP4 |
| | QP5 - MSB |
| Forward Counter F | Q37 - LSB |
| | Q38 |
| | Q39 |
| | Q40 |
| | Q41 |
| | Q42 |
| | Q43 - MSB |
| Backward Counter B | Q44 - LSB |
| | Q45 |
| | Q46 |
| | Q47 |
| | Q48 |
| | Q49 |
| | Q50 - MSB |
| Advance Push-Button Follower | QAD |
| Advance Push-Button Flip-Flop (QAD) Follower | QADF |
| Program Advance | QA |
| Detector | QD |
| Proven 1 Detector | QE |
| Proven 0 Detector | QF |
| Forward Counter Maximum Detector | QH |
| No Data Detector | QI |
| New Proven 1 Detector | QM |
| New Proven 0 Detector | QN |
| No Change Detector | QNC |
| Tape Reader Feed | QTF |
| X - Matrix Size Switches | SX1 - LSB |
| | SX2 |
| | SX4 |
| | SX8 |
| | SX16 |
| | SX32 |
| | SX64 - MSB |
| Y - Matrix Size Switches | SY1 - LSB |
| | SY2 |
| | SY4 |
| | SY8 |
| | SY16 |
| | SY32 |
| | SY64 - MSB |
| Input - Present Data Switches | SZ1 - LSB |
| | SZ2 |
| | SZ4 |
| | SZ8 |
| | SZ16 |
| | SZ32 |
| | SZ64 - MSB |
| Core Plane 1 Select Switch | SB1 |
| Core Plane 2 Select Switch | SB2 |
| Core Plane 3 Select Switch | SB3 |
| Core Plane 4 Select Switch | SB4 |
| Core Plane 5 Select Switch | SB5 |
| Core Plane 6 Select Switch | SB6 |
| Core Plane 7 Select Switch | SB7 |
| Core Plane 8 Select Switch | SB8 |

TABLE III (Continued)

| | |
|---|---|
| Core Plane 9 Select Switch | SB9 |
| Core Plane 10 Select Switch | SB10 |
| Combined Core Planes 5, 6, 11 and 12 Select | SB11 |
| Advance One ELEMENT | SA1 |
| Advance One LINE | SA2 |
| Advance one FRAME | SA3 |
| Advance one ITERATION | SA4 |
| Advance CONTINUOUS (until automatic stop) | SA5 |
| Marker Switch | SM |
| Enable Core Plane 11 Loading | SI11 |
| Enable Core Plane 12 Loading | SI12 |
| Inconsistent Data Stop Switch | SIDS |
| Memory Erase | RDR |
| Select Tape Reader Data | MTA |
| Select Input-Preset Data Switch Data | MM |
| PROGRAM ADVANCE Push Button | PBAD |
| Enter 0 Push Button | PBE0 |
| Enter 1 Push Button | PBE1 |
| Preset Column Push Button | PXSZ |
| Preset Row Push Button | PYSZ |
| Preset Program Counter Push Button | PPZ |

TABLE IV sets forth signals occurring in the special purpose computer during operation thereof. The first part of TABLE IV sets forth the control signals for the several counters of the computer. The second part of TABLE IV sets forth outputs of the several counters. The third part of TABLE IV sets forth the memory signals and the fourth part of TABLE IV sets forth certain miscellaneous additional signals encountered hereinafter. One additional signal is $\overline{TA128}$ PBZ which is a signal to enter 1's in all columns or rows in core planes 2 or 4 wherein a full width occupied matrix is indicated by the tape reader most significant bit being true.

TABLE IV

Counter Control Signals

Time Counter M

None (counts at clock rate)

Scan Counter N

| | | |
|---|---|---|
| IN | - | input enable |
| RN | - | reset to count zero |
| IN' | - | IN ANDed with $\overline{RN}$ |

X Fast Counter XF

| | | |
|---|---|---|
| IXFF | - | forward count enable |
| IXFB | - | backward count enable |
| RXFO | - | reset to count zero |
| RXFM | - | reset to maximum count |
| IXFF' | - | IXFF ANDed with $\overline{RXFO}$ and $\overline{RXFM}$ |
| IXFB' | - | IXFB ANDed with $\overline{RXFO}$ and $\overline{RXFM}$ |

X Slow counter XS

| | | |
|---|---|---|
| IXSF | - | forward count enable |
| IXSB | - | backward count enable |
| RXSO | - | reset to count zero |
| RXSM | - | reset to maximum count |
| IXSF' | - | IXSF ANDed with $\overline{RXSO}$ and $\overline{RXSM}$ |
| IXSB' | - | IXSB ANDed with $\overline{RXSO}$ and $\overline{RXSB}$ |
| PXSZ | - | preset to input - preset data switch setting |

Y Fast Counter YF

| | | |
|---|---|---|
| IYFF | - | forward count enable |
| IYFB | - | backward count enable |
| RYFO | - | reset to count zero |

TABLE IV (Continued

| | | |
|---|---|---|
| RYFM | - | reset to maximum count |
| IYFF' | - | IYFF ANDed with $\overline{\mathrm{RYFO}}$ and $\overline{\mathrm{RYFM}}$ |
| IYFM' | - | IYFB ANDed with $\overline{\mathrm{RYFO}}$ and $\overline{\mathrm{RYFM}}$ |

Y Slow Counter YS

| | | |
|---|---|---|
| IYSF | - | forward count enable |
| IYSB | - | backward count enable |
| RYSO | - | reset to count zero |
| RYSM | - | reset to maximum count |
| IYSF' | - | IYSF ANDed with $\overline{\mathrm{RYSO}}$ and $\overline{\mathrm{RYSM}}$ |
| IYSB' | - | IYSB ANDed with $\overline{\mathrm{RYSO}}$ and $\overline{\mathrm{RYSM}}$ |

Program Counter P

| | | |
|---|---|---|
| IP | - | input enable |
| RP3 | - | reset to count 3 |
| PPZ | - | preset to input - preset data switch setting |
| IP' | - | IP ANDed with $\overline{\mathrm{RP3}}$ and $\overline{\mathrm{PPZ}}$ |

Forward Counter F

| | | |
|---|---|---|
| IF | - | input enable |
| RFO | - | reset to count zero |
| PFZ | - | preset to input - preset data switch setting |
| IF' | - | IF ANDed with RFO and PFZ |

Backward Counter B

| | | |
|---|---|---|
| IB | - | input enable |
| PBX | - | preset to X - matrix-size switches |
| PBY | - | preset to Y - matrix-size switches |
| PBZ | - | preset to input - preset data switch setting |
| IB' | - | IB ANDed with PBX, PBY, and PBZ |

Counter Outputs

Time Counter M

MO through M3

Scan Counter N

NO through N3

X Fast Counter XF

| | | |
|---|---|---|
| XFO | - | zero count |
| XFM | - | maximum count |

X Slow Counter

| | | |
|---|---|---|
| XSO | - | zero count |
| XSM | - | maximum count |
| XCO | - | coincidence of XF and XS counter counts |

Y Fast Counter YF

| | | |
|---|---|---|
| YFO | - | zero count |
| YFM | - | maximum count |

Y Slow Counter YS

| | | |
|---|---|---|
| YSO | - | zero count |
| YSM | - | maximum count |
| YCO | - | coincidence of YF and YS counter counts |

Program Counter P

PO through P14

Forward Counter F

| | | |
|---|---|---|
| FO | - | zero count |
| FBXCO | - | coincidence of F counter count and X-matrix-size switch setting |
| FSTCO | - | coincidence of F counter count and Y-matrix-size switch setting |
| FM | - | maximum count |

Backward Counter B

| | | |
|---|---|---|
| BO | - | zero count |
| BSXCO | - | coincidence of B counter count and X-matrix-size switch setting |
| BSYCO | - | coincidence of B counter count and Y-matrix-size switch setting |

Memory Signals

I1 through I12 - memory inputs 01 through 012 - memory outputs

Q5 through Q11 and Q19 through Q25 - memory address

UV2 - memory start

SE - strobe enable

F/H - full/half cycle control

W - write control

CDR - clear data register

TABLE IV (Continued)

SDR - set data register

EC - external clamp voltage

Miscellaneous Signals

| | | |
|---|---|---|
| TA1 | -LSB | Tape Reader Data |
| TA2 | | |
| TA4 | | |
| TA8 | | |
| TA16 | | |
| TA32 | | |
| TA64 | | |
| TA128 | -MSB | |

| | | |
|---|---|---|
| F | - | tape feed signal to tape reader |
| FT | - | feed track signal from tape reader |
| DX | - | X deflection |
| DY | - | Y deflection |
| Z | - | intensity |
| CP | - | Clock Pulse |
| AD | - | Advance |

CIRCUIT DESIGN AND COMPONENTS

FIG. 6 presents in block diagram form the principal circuits of the computer illustrating the principal functional blocks employed in the logical relationships and the principal interconnections therebetween. Because of the size of FIG. 6 it is illustrated on two sheets of the drawings with interconnection lines extending from one sheet to the next labeled with the signals thereon or other consistent designation for correlating the two sheets. Certain minor but important elements are not illustrated in FIG. 6 such as, for example, memory erase and these are introduced as needed in the logical relationships of the computer set forth hereinafter. The entire data processor is a synchronous system operating in response to a clock 34 at a rate of approximately 1 megaHertz. Frequency stability or accuracy is not critical to operation of the computer, therefore, a single free running multivibrator with suitable pulse shaping is conveniently employed for the clock 34. The clock pulse Cp from the clock 34 is applied to a time or read-write counter M which, accordingly accounts continuously and repetitively at the clock rate.

The flip-flops forming the time counter M and other circuit elements introduced hereinafter are set forth in TABLE III in the section entitled "Nomenclature;" likewise, signals occurring in the computer are set forth in TABLE IV in the section entitled "Nomenclature." Full details of the counters and the like are set forth in the table of Logical Equations and the descriptions herein summarize these details to convey the operation in the computer. The precise interconnections may not be set forth in full in this section, but are fully itemized in the Logical Equations section.

The time counter M is a 2-bit, binary, forward only counter which defines memory read and write time. States M0, and M1, which correspond to the time when flip-flop Q2 is false, define a memory read half cycle and states M2 and M3 which correspond to the time when Q2 is true define a memory write half cycle. The M counter advances one count continually at the clock rate starting a new counting cycle at each fourth clock pulse and therefore the counter has no input, reset, or preset control. A modulo 4 rather than a modulo 2 counter was used in the special purpose computer so that state M0 could be used as the memory start pulse time. It was later decided to employ a preferred arrangement wherein a one shot multivibrator (or univibrator) is employed to generate the memory start pulse so that the clock frequency can be changed without changing the memory start pulse width. Therefore a modulo 2 counter could have been used. The logic of the computer employs state M1 for reading and state M3 for writing in the embodiment described herein with a 2-bit time counter.

The core memory is operated in the conventional half cycle mode since only read/modify/write operation is required. Each read half cycle (M1) is always followed by a write half cycle (M3) for each full cycle of the time counter M. This is achieved by using the most significant flip-flop (Q2) of the M counter as the memory read/write control signal. The memory start pulse is generated by a conventional univibrator UV2 with a pulse width of approximately one-half microsecond. Univibrator UV2 is triggered by the negative going edge of a conventional delay univibrator UV1 waveform with a pulse width of approximately one-fourth microsecond. Univibrator UV1 is triggered by the negative going edge of a flip-flop Q1 waveform. At the memory start pulse while Q2 is false the bits in each core plane at a given memory address (*x*,*y* coordinate) are read and at the second memory start pulse of each cycle, while Q2 is true, a signal is written in the memory address for each bit; that is, in each core plane; most of the bits merely being restored. (It is conventional in a core memory to erase the content of a core upon reading and restore the read value in the next half cycle). The bit in the core plane or planes operated upon during a particular counter state may be restored, or modified and written as new data according to the logic of the computer operation.

The memory address terminals are connected with the respective X-fast and Y-fast counters, namely, flip-flops Q5 through Q11 and Q19 through Q25, the detailed logic for which is set forth in the Logical Equations section. Accordingly, the memory address is controlled by the XF and YF counters which also control the display sweep. The XF counter controls the first half of the memory address lines and the YF counter controls the last half of the memory address lines. As pointed out hereinabove a given memory address corresponds exactly to a particular dot location on the display cathode ray tube. The XF and YF counters are, at times, controlled by X-slow and Y-slow counters for generating television like raster scans with the fast scan either horizontal or vertical and the slow scan vertical or horizontal, respectively.

As mentioned, the X-fast counter XF, and Y-fast counter YF, control the cathode ray tube sweep and memory address so that memory information is sampled in synchronization with the display sweep. These counters, XF and YF are 7-bit, forward and backward, binary counters which count either in coincidence with the X slow and Y slow counters during program advance time AD; that is IXFF = AD IXSF; IXFB = AD IXSB; IYFF = AD IYSF; and IYFB = AD IYSB; or count forward-only at one-fourth of the clock rate during display-only time to generate the cathode ray tube display raster or matrix and control memory sampling as determined by logic of XF control 41 and YF control 42, respectively. During display-only time, that is, when the program is not advancing and the memory content is continuously displayed on the cathode ray tube; the Y-fast counter advances one count at each time counter state M3, and the X-fast counter advances one count each time the Y-fast counter reaches the maximum count (IYFF = AD M3; and IXFF = AD YFM M3). This creates a raster type of scan upward in each column and proceeding from left to right across the matrix to display the content of the memory core selected by the selector switches.

The inverse of the X-fast counter zero and maximum reset commands are ANDed with the input advance commands to inhibit a count command when a reset command occurs (IXFF' = IXFF $\overline{\text{RXF0}}$ $\overline{\text{RXFM}}$; and IXFB' = IXFB $\overline{\text{RXF0}}$ $\overline{\text{RXFM}}$).

The inverse of the Y-fast counter reset commands are ANDed with the input advance commands to inhibit a count command when a reset command occurs (IYFF' = IYFF $\overline{\text{RYF0}}$ $\overline{\text{RYFM}}$; and IYFB' = IYFB $\overline{\text{RYF0}}$ $\overline{\text{RYFM}}$).

The aforementioned X-slow and Y-slow counters XS and YS, respectively, keep track of the column and row of the display element or dot in the matrix to be processed next in the program steps. The X-slow and Y-slow counters operate only during program advance time for producing a raster scan of the matrix. The X-slow and Y-slow counter are each seven-bit, forward and backward, binary counters. The X-slow counter and Y-slow counter are controlled by XS control logic 38 and YS control logic 39, respectively (FIG. 6). The XS counter and YS counter count forward or backward in a coordinated pattern as selected by a program counter (P) state and a scan counter (N) state. By proper combinations of forward and backward counts on the X-slow and Y-slow counters it is apparent that raster type scans of the matrix are achieved in any selected direction.

Thus, for example, in program counter state P0 the columns are scanned from bottom to top with each column successively scanned beginning at the left and proceeding towards the right. This is accomplished by having the Y-slow counter count during program advance at the clock rate (actually one full count for each four count cycle of the time counter M); that is, IYSF= AD P0. At the same time the X-slow counter counts forward one count each time the Y-slow counter reaches its maximum count; that is, IXSF = AD YSM P0. It will be apparent that with proper combinations of forward and backward counting of the X-slow and Y-slow counters that the fast scan can proceed from left to right, right to left, top to bottom or bottom to top and similarly, a slow scan can proceed in directions of up, down, right or left. The complete logical equations for the inputs to, and outputs from the X-slow and Y-slow counters for forward and backward counting are set forth hereinafter in the table of Logical Equations at the end of the the description.

In the operation of the computer the individual rows or columns (lines) of the memory are scanned in a selected direction. As seen in TABLE II, during program counter states P0, P1, and P2 there is a single scan of each line in the matrix wherein data is recorded in core planes 1 through 5. In program counter states P3 through P10, however, multiple scans of each column are provided for first reading information in one or more core planes and subsequently writing results of computation in other core planes. In this mode of operation in program counter state P3, for example, each column is scanned down and then up before proceeding to the next column. During program counter state P0, P1, P2 and P11 the scanning merely proceeds once through the full raster as provided by the x and y counters hereinabove described. In the other counter states, however, means must be provided for obtaining multiple scans of each line before proceeding to the next. In order to provide control of the scan, a scan counter N is provided which is a 2-bit, binary, forward only counter that defines a scan number used for each column or row. The first scan of a line is defined by state N0. The second scan is defined by state N1, and the third scan is defined by counter state N2. The program steps employed in the computer do not require a fourth scan. Control of the scan counter N is provided by N counter control logic 36 with inputs and outputs set forth fully in the table of Logical Equations.

Input advance (IN) and reset (RN) commands for the scan counter N occur during program advance time (AD) as controlled by the state of the scan counter, the state of the program counter P, and the maximum and minimum states of the X-slow counter and Y-slow counter. Thus, for example, in program counter state P7 which involves a complex scanning situation wherein each column is first scanned up in state N0, secondly scanned up again in state N1, and thirdly scanned down in state N2, the N counter is initially in state N0 and counts in response to inputs as defined by the logical equation:

IN = AD YSM P7 N0 + AD YSM P7 N1

Thus at the end of the first upward scan when the Y-slow counter is at a maximum, that is, at the top of the column the N counter advances from counter state N0 to counter state N1. Similarly, at the end of the second upward scan of the column when the Y-slow counter again reaches a maximum the N counter cycles from counter state N1 to counter state N2. At the end of the third scan, which is downward, the scan counter N is reset to state NO (skipping counter state N3) according to the logical equation RN = AD YS0 N2 P7. The inverse of the reset command is ANDed with the input advance command to inhibit a count command when the reset command occurs (IN' = IN $\overline{\text{RN}}$). Analogous logical equations for similar scanning patterns in the other program counter states are set forth in the tabulation of Logical Equations at the end of the description.

The scan counter may also be preset manually to a scan state by the two most significant bits of the bank of binary coded input-preset data switches (SZ32 and SZ64) when the program preset push button (PPZ) is depressed. Thus the flip-flop Q3 in the scan counter N is set to a true state when the input preset data switch SZ32 is true (J3 = PPZ SZ32) and is reset to the false state when the input preset data switch is false ($K3 = PPZ\ \overline{SZ32}$). The flip-flop Q4 in the scan counter is similarly responsive to input-preset data switch SZ64. The program counter P is provided for defining the data processing steps set forth hereinabove and identified as program counter states P0 through P11. The program counter P is a 5-bit, forward only, binary counter, however, only the first four bits of the counter are actually employed in the 12-program counter states identified in the simple problem set forth. The fifth bit in the program counter may be useful for providing additional counter states for multiple region or multiple view problems. A P counter control 37 which comprises logical input gates is provided for controlling the program counter P. Input advance command to the program counter is provided by the P counter control 37 during program advance time (AD) according to logical relations for each state of the program counter. Advance to the next program counter state occurs when the scan counter N reaches the maximum for the final scan of the last line of the previous state. Thus, for example, in program counter state P7 the final scan is downward in the last column and is the third scan of that column. Thus the program counter is ready to advance to program counter state P8 when the X-slow counter has reached the maximum count and the Y-slow counter has reached the 0 count on the third or N2 scan (IP = AD XSM YS0 N2 P7). In program counter state P2, for example, only one scan is used for each line and the counter advances when the X-slow and Y-slow counters both reach their maximums (IP = AD XSM YSM P2).

The program counter P is reset to counter state P3 rather than to program counter state P0 at the end of an iteration because state P0, P1 and P2 are employed only for initial entry and processing of data as pointed out briefly hereinabove and in greater detail hereinafter. During automatic operation the iteration process for solution of the closed curve cycles from states P3 through P11, repeatedly until no change occurs in the 1's and 0's proved in the matrix indicating a complete solution or a situation calling for application of a Northwest Corner Rule. The program counter is thus reset to program counter state P3 at the end of the final scan in program counter state P11 (RP3 = AD XSM YSM P11). Thus the flip-flops QP1 and QP2 in the program counter are set true by the signal RP3 and the balance of the flip-flops QP3, QP4 and QP5 in the program counter are set false by the same signal. The inverse of the reset command is ANDed with the input advance command to inhibit forward count when a reset command occurs.

The program counter P may also be manually preset to a value selected by the five least significant bits of the input-preset data switches (SZ1, SZ2, SZ4, SZ8, and SZ16) by depressing the program preset push button PPZ. The inverse of the preset command $\overline{PPZ}$ is also ANDed with the input advance command to inhibit a forward count of the program counter when a preset command occurs ($IP' = IP\ \overline{PPZ}\ \overline{RP3}$).

Two other counters are employed in the data processor, namely, a forward counter F and a backward counter B for counting the 1's to be put into, or already found in, the memory depending on the program counter state. The forward counter F is a 7-bit, forward only, binary counter. The forward counter controls entry of input data into core planes 2 and 4 of the memory 28 during program counter states P0 and P1, respectively; controls entry of proven 0's (logical 1's) in core plane 6 of the memory during program counter states P4 and P6; and controls entry of logical 1's in core planes 7, 8, 9 and 10 of the memory during program counter states P7, P8, P9 and P10, respectively; all as set forth in greater detail hereinafter.

The maximum count of the forward counter (FM) is determined by the program counter state (i.e., the counting direction, *x* or *y*) and the size of the matrix. Thus during program counter states P0, P4, P7, and P8, the size *m* of the matrix in the *y* direction determines the maximum count of the forward counter and similarly in program counter states P1, P6, P9 and P10 the matrix size *n* in the *x* direction determines the maximum count of the forward counter. In the computer the size of the matrix is determined by the matrix size switches for the *x* and *y* directions, SX1, SX2, SX4, etc., and SY1, SY2, SY4, etc. Thus for program counter states P0, P4, P7 and P8, for example, FM = FSYC0 (P0 + P4 + P7 + P8) where FSYC0 indicates coincidence between the forward counter and the *y* matrix size switches or $FSYC0 = (Q37\ SY1 + \overline{Q37}\ \overline{SY1})\ (Q38\ SY2 + \overline{Q38}\ \overline{SY2})\ (Q39\ SY4 + \overline{Q39}\ \overline{SY4})\ (Q40\ SY8 + \overline{Q40}\ \overline{SY8})\ (Q41\ SY16 + \overline{Q41}\ \overline{SY16})\ (Q42\ SY32 + \overline{Q42}\ \overline{SY32})\ (Q43\ SY64 + \overline{Q43}\ \overline{SY64})$.

Input advance commands for the forward counter are provided by the logical network of an F counter control 43 and occur during program advance time as controlled by the state of the forward counter, the state of the program counter P, the state of the scan counter N (for all but the program counter states P0 and P1), information from the memory 28, and the state of the detector flip-flop QD. Thus, to state a relatively complex example, in program counter state P7 on the first scan N0 the forward counter counts logical 1's stored in memory core plane 6 only so long as the detector flip-flop QD is false, the count being stopped (but not reset) when QD becomes true as mentioned hereinafter; thus $IF = AD\ 06\ \overline{QD}\ N0\ P7$. Likewise on the second scan N1 in program counter state P7 the forward counter counts the logical 1's in core plane I, that is, the input Ax data; IF = AD 01 N1 P7. On the third or final scan N2 in program counter state P7 the forward counter continues to count so long as the count is not at FO, that is, the forward counter will continue to count from the highest count remaining in it from the previous scans N0 and N1 until it passes the maximum count FM and resets to F0 and then stop when it reaches F0 (the forward counter is reset to F0 whenever it reaches the maximum count and there is an input counting command, that is, RF0 = FM IF). Thus in the third scan the forward counter continues to count according to the logical equation $IF = AD\ N2\ \overline{F0}\ P7$.

In addition to being reset to 0 whenever there is an input count command and it reaches maximum (RF0 = FM IF), the forward counter is reset to 0 whenever it reaches the maximum count in program counter states P4 and P6 and whenever it reaches the maximum count in the final scan in program counter state P7, P8, P9 and P10. In addition the forward counter counts past the maximum and resets to 0 in earlier scans in program states P7, P8, P9 and P10 when there is still an input from the memory core plane being scanned at that time; namely, in core planes 1 through 4, respectively. In logical terminology combining all of these reset commands in a single equation, RF0 = AD FM (P4 + P6) + AD FM N2 (P7 + P8 + P9 + P10) + AD FM (P7 01 + P8 02 + P9 03 + P10 04).

In program counter states P0 and P1, during data entry from the tape reader, the forward counter (and the backward counter) is initially set to a value corresponding to the Ax or Ay data and counts to enter these data in the columns or rows, respectively, of the core plane as explained hereinafter. On occasion it is desired to enter data manually and this is accomplished by way of the input-preset data switches SZ1, SZ2, SZ4, etc., upon pressing the appropriate panel push button PXSZ or PYSZ. The data on these switches is set into the forward and backward counters for entry in the memory in the same manner as tape data. The inverse of the reset command and the preset command PFZ are ANDed with the input advance command to inhibit a forward count when a reset or preset command occurs, that is, $IF' = IF\ \overline{RFO}\ \overline{PFZ}$.

The backward counter B is a 7-bit, backward only counter which controls entry of input data into core planes 1 and 3 of the memory during program counter states P0 and P1, respectively, and controls entry of proven 0's (logical 1's) in core plane 6 during program counter states P3 and P5. The maximum count of the backward counter BM is determined by the program counter state and the size of the matrix in the direction being scanned in that program counter state in the same manner as the maximum count of the forward counter. Input advance commands for the backward counter are provided by the logic of a B counter control 44 and occur during program advance time as controlled by the state of the backward counter, the state of the program counter P, the state of the scan counter N, information from the memory 28 and the state of the detector flip-flop QD. The logical relations for this are set out hereinafter in the description of program counter state P3 and the equations at the end of the description.

Preset of the B counter to the X matrix size switch value (SX1, SX2, SX4 etc.) in preparation for program counter state P5 occurs during program counter state P4 when a count command comes to the program counter P to advance it to program counter state P5, that is, PBX = P4 IP. The backward counter is also set to the X matrix size switch value during program advance time in program counter state P5 when the backward counter reaches count 0, that is, PBX = AD BO P5. Similar setting occurs for the backward counter to the Y matrix size switch values in program counter state P3. Preset of the backward counter to the input-preset date switches occurs at program advanced time in a manner similar to the setting of the forward counter F. The inverse of the preset commands are ANDed with the input advance command to inhibit a forward count when a preset command occurs. That is, IB' = IB $\overline{PBX}$ $\overline{PBY}$ $\overline{PBZ}$.

In addition to the flip-flops forming the above described counters other control flip-flops are employed in the computer as identified in TABLE III hereinabove.

In order to cause the computer to advance in computation a double throw program advance pushbutton PBAD is manually depressed and an advance flip-flop QAD follows the advance pushbutton signal PBAD as illustrated in the timing diagram of FIG. 20. The advance flip-flop QAD is set to the true state by the first clock pulse after the pushbutton DOWN signal (PBAD goes true) despite momentary breaking of the PBAD signal thereafter as illustrated in lines PBAD and QAD of FIG. 20. The flip-flop QAD is reset to the false state only by the first clock pulse after the pushbutton UP signal ($\overline{PBAD}$ goes true) and not merely by failure of the PBAD signal. When the pushbutton contact is between the normally open and normally closed contacts neither PBAD nor $\overline{PBAD}$ is true and therefore no set or reset command is given to the flip-flop QAD. This technique prevents the normally occurring switch bounce in the pushbutton as seen in lines PBAD and $\overline{PBAD}$ of FIG. 20 from causing multiple triggering of the advance flip-flop QAD. In logical terminology JAD = PBAD XC0 YC0 M2 where XC0 and YC0 indicate coincidence between the X-fast and X-slow counters and Y-fast and Y-slow counters, respectively. (The clock pulse illustrated in FIG. 20 is actually the M2 state of the time counter as mentioned hereinabove). Also, KAD = $\overline{PBAD}$.

A follower flip-flop QADF follows the advance flip-flop QAD and flip-flop QADF is set to the true state by the first clock pulse after flip-flop QAD goes true as seen in line QADF of FIG. 20. Similarly, flip-flop QADF is reset to the false state only by the first clock pulse after flip-flop QAD goes false. Thus JADF = QAD and KADF = $\overline{QAD}$. Since flip-flop QADF follows by one clock pulse, flip-flop QAD which does not respond to switch bounce, a single clock time signal (QAD $\overline{QADF}$) is obtained each time the pushbutton PBAD is depressed. The pulse is present when flip-flop QAD has gone true, but flip-flop QADF has not yet gone true, which does not occur until the next clock pulse. Thus the clock time signal QAD $\overline{QADF}$ is the interval between two clock pulses immediately following the first clock pulse when the pushbutton PBAD is first depressed as seen in line QAD $\overline{QADF}$ of FIG. 20.

In order for the program to advance a program advance flip-flop QA must be true. The program advance flip-flop QA is set to the true state only by the single clock time signal QAD $\overline{QADF}$ (that is, JA = QAD $\overline{QADF}$) and remains true as the program proceeds as seen in line QA of FIG. 20.

In the special purpose computer constructed it is sometimes convenient to operate the computer for a time interval less than a full problem solution, therefore, mode selection switches have been provided for giving less than a full problem solution. When mode selection switch SA1 is on or true the computer proceeds to advance only one element, that is, in the matrix it will advance along a row or column one dot or space each time QA is set. The program advance flip-flop QA is reset after one element is processed (KA = SA1 M3) in this mode of operation. When switch SA2 is true the program proceeds for one full line to complete processing of the column or row being processed when the advance pushbutton PBAD was depressed, and QA is reset at the end of the column or row to stop data processing. The logical equation for this resetting is set forth in the consolidated equation at the end of the next paragraph. When switch SA3 is on or true, the program proceeds for one full frame, that is, all of the columns or rows are processed in the program counter state that was true when the advance pushbutton was depressed. When Switch SA4 is on or true the program advances until the end of program counter state P6, which has been selected as the end of an iteration; that is, all of the program counter states P3 through P11 have been performed once. When mode selection switch SA5 is true or on the computer is in a continuous mode and operation continues until flip-flop QNC, which indicates no change in the proven 1's or 0's is true in which case program operation ceases at the end of program counter state P6. Thus program advance flip-flop QA is true throughout computer operation and provides a program advance signal AD for a period of program operation determined by the panel switches SA1, SA2, SA3, SA4 and SA5. Reset of the program advance flip-flop QA to the false state causes the ending of program advance and this reset occurs at the end of the cycle determined by the aforementioned mode selection switches. The reset of the program advance flip-flop QA to the false state for the above stated modes can be stated in logical terminology as follows:

KA = SA1 M3 + SA2 AD XS0 (P6) + SA2 AD XSM (P1 + P5) + SA2 AD YS0 (P4)
+ SA2 AD YSM (P0 + P2 + P3 + P11 + P31) + SA2 AD XS0 N2 (P9)
+ SA2 AD XSM N2 (P10) + SA2 AD YS0 N2 (P7) + SA2 AD YSM N2 (P8)
+ SA3 AD XS0 YSM (P6 + P9) + SA3 AD XSM YS0 (P4 + P7)
+ SA3 AD XSM YSM (P0 + P1 + P2 + P3 + P5+ P8 + P10 + P11)
+ SA4 AD XS0 YSM N1 (P6) + SA5 AD XS0 YSM N1 P6 QNC + AD 05 06 SIDS

The program advance flip-flop QA is also reset false when an inconsistency is the solution is detected and the inconsistent data stop switch SIDS is on. This is expressed by the last term in the equation at the end of the previous paragraph. Thus QA is reset whenever a proven 1 and a proven 0 exist simultaneously at one matrix location as indicated by logical 1's stored in identical locations in memory core planes 5 and 6, respectively. In addition to stopping the operation of the computer at this point by resetting flip-flop QA this location is automatically intensified in the display of the matrix as hereinafter described to indicate the location of the inconsistency.

A detector flip-flop QD is employed in several aspects of the computer operation as pointed out in greater detail hereinafter. The detector flip-flop QD detects when the forward counter F reaches a maximum count in program counter states P0 and P1 when input data Ax and Ay are being recorded and remains true for the balance of program counter states P0 and P1. In these counter states data is entered in core planes 2 and 4, respectively, as logical 1's when detector flip-flop QD is true. Thus, JD = AD FM $\overline{KD}$ (P0 + P1); also, 12 = P0 QA QD and 14 = P1 QA QD. These latter equations indicate inputs to the memory core in core planes 2 and 4, respectively.

The detector flip-flop QD also detects the first proven 1 in a column or row as it is scanned the first time in program counter states P3, P4, P5 and P6, and remains true to the end of the respective line. These proven 1's, it will be recalled, are stored in memory core plane 5 so that JD = AD 05 N0 $\overline{KD}$ (P3 + P4 + P5 + P6). When Qd is not set in counter states P4 and P6 the forward counter counts, and in counter states P3 and P6 the backward counter counts (for example: IF = AD 05 $\overline{QD}$ N0 P4). Upon setting of QD the respective count is stopped so that the counters have effectively counted the spaces before the first 1 and thereby found the minimum or maximum *x* or *y* value in the respective line. In a similar manner the detector flip-flop QD detects the first location that is not a proven 0 (logical 1 in core plane 6) in program counter states P7, P8, P9 and P10, that is, JD = AD $\overline{06}$ N0 $\overline{KD}$ (P7 + P8 + P9 + P10 ). Setting of QD stops the forward counter which is enabled when QD is false in these counter states (for example: IF = AD 06 $\overline{QD}$ N0 P7). The detector flip-flop QD further detects when there are not sufficient spaces for proven 1's between a proven 0 and the end of a column or row by noting in program counter states P7 through P10 (the only states in which an N2 scan occurs) when the forward counter reaches a 0 count, the backward counter is not at its maximum and a proven 0 is present; thus, JD = AD F0 $\overline{BM}$ 06 N2 $\overline{KD}$. This causes entry of proven 0's in the spaces as the scan continues according to the equation I6 = N2 QA QD (P7 + P8 + P9 + P10). Setting of QD is prevented in some conditions by presence of a reset signal which would predominate as indicated by the term $\overline{KD}$ in some of the equations.

Proven 1 detector flip-flop QE is employed to detect the presence of a proven 1 in a line so that in subsequent operations proven 0's can be entered between a proven 0 and the end of the column or row if a proven 1 is present before the proven 0 as pointed out in greater detail hereinafter. The flip-flop QE is set when a logical 1 (proven 1) is detected in core plane 5; that is, JE = AD 05. This flip-flop also serves to fill in 1's between proven 1's in a line as pointed out in discussing the program counter states hereinafter. For this, a logical 1 is entered in core planes 7 through 10 in program counter states P7 through P10, respectively, whenever QE is true; that is, for example, I7 = P7 N2 QA QE.

A proven 0 detector flip-flop QF is employed to detect a proven 0 after a proven 1 in a line so that proven 0's can be written from the proven 0 to the end of the column or row. Thus the flip-flop QF is set when a logical 1 (proven 0) is detected in memory core plane 6 after a logical 1 is detected in memory core plane 5 (during processing of any given line). As mentioned above the proven 1 detector flip-flop QE is set when a proven 1 is detected therefore this signal is employed for setting the proven 0 flip-flop; or JF = AD 06 QE. The proven 0's are entered in memory core plane 6 when QF is true during program counter states P7 through P10 according to the equation I6 = N2 QA QF (P7 + P8 + P9 + P10). The proven 1 detector QE and proven 0 detector QF are reset to the false state at the end of program counter states P7 through P10; that is, KF = KE = AD YSM P7 + AD YS0 P8 + AD XSM P9 + AD XS0 P10.

A forward counter maximum detector flip-flop QH for detecting the maximum count of the forward counter is set when the forward counter F counts past maximum in program counter states P7 through P10 so that logical 1's are entered in core planes 7 through 10 of the memory, respectively. Thus, for example, 17 = P7 N2 QA QH and the flip-flop is set according to the equation JH = RF0 $\overline{N0}$. The 0 count state of the forward counter (F0) is not suitable for entry of logical 1's in this circumstance because it would cause erroneous entry of logical 1's in core planes 7 through 10 in lines where the value of input data, $A_x$ and $A_y$, might happen to be zero.

A no data detector flip-flop QI is employed to detect the presence of zero values of input data (Ax or Ay) so that proven 0's can be entered in an entire column or row when the input data value for that column or row is zero, (for example: JI = AD IN P3 $\overline{01}$; that is, when there is no 1 adjacent the margin at the end of the first scan in P3 the flip-flop is set. When set, 1's are recorded in core plane 6 according to I6 = P3 QA QI).

A new proven 1 detector flip-flop QM is employed to detect proven 1's during each read cycle of the computer for comparison with proven 1's in the following write cycle to detect new proven 1's. Similarly, a new proven 0 detector flip-flop QN is used to detect proven 0's during each read cycle (time M1) for comparison with proven 0's in the following write cycle. The flip-flops QM and QN are set true when a logical 1 is found in core planes 5 or 6, respectively, that is, JM = 05 M1 and JN = 06 M1, and they are reset false by the absence of a logical 1, KM = $\overline{05}$ and M1 and KN = $\overline{06}$ M1. They thus serve as a short term memory for each point in the matrix during each read-write cycle. New proven 1's and proven 0's are detected at the end of the write cycle (time M3) when flip-flop QM or QN, respectively, is false and the output of the corresponding memory core plane is true. If either of these conditions occurs there has been a change in the data in that location in the matrix and a no-change detector flip-flop QNC is reset to the false condition, that is, KNC = M3 $\overline{QM}$ 05 + M3 $\overline{QN}$ 06. A new proven 1 or proven 0 in any location will thus reset the flip-flop QNC false. The no-change detector flip-flop QNC is set to the true state only at the end of program counter state P6 (JNC = P6 AD XS0 YSM N1) and, as mentioned, any new proven 1 or 0 during an iteration will reset the no-change detector flip-flop to the false state. If no new proven 1's or 0's are detected in an iteration the flip-flop QNC is still true at the end of program counter state P6 indicating no change in the proven 1's or 0's and this condition causes the aforementioned program advance flip-flop QA to be reset false, thereby ending computation; that is, KA = SA5 AD XS0 YSM N1 P6 QNC.

The tape reader feed flip-flop QTF is an unclocked flip-flop used for tape reader tape feed control, solely for data input, and operates in a conventional manner for switching the tape feed.

PROGRAM COUNTER STATES

In order to describe the data processing steps occurring in the computer a sample problem will be assumed as illustrated in FIG. 7. As illustrated therein there is provided a 5×5 matrix having rows, 0, 1, 2, 3, and 4 and columns 0, 1, 2, 3, and 4. A diamond shaped closed curve is assumed as defined by the large dots which are within the curve while the small dots are without the curve. These dots may be thought of as bright and dim dots, respectively, on the face of the cathode ray tube representing 1's and 0's in a matrix as hereinabove described. The horizontal thickness or width curve $A_y$ is defined by numerical values along the left margin of the matrix and the vertical thickness or height curve $A_x$ is defined by numerical values along the bottom margin of the matrix. These values, of course, are the number of large dots in the respective lines. When the computer is started, data processing proceeds from element to element or (dot-to-dot) in the columns and rows as controlled by the program counter P and processing continues as determined by the mode selector switches SA1, etc., hereinabove described. Thus, for example, in the continuous mode (SA5) processing continues until automatically stopped by completion of the solution or detection of an inconsistency or ambiguity (such as both a proven 1 and a proven 0 at the same location in the matrix.)

The computation proceeds in two stages as outlined briefly and summarized in TABLE II hereinabove. In the first stage, comprising program counter states P0, P1, and P2, the input data for curves $A_x$ and $A_y$ are stored adjacent the margins in core planes 1 to 4 of the computer memory, and the first region of proven 1's found by superposition of input data is stored in core plane 5. This stage of computation is not repeated for a given problem.

In the second stage, comprising program counter states P3 through P11, the first outer (proven 0) zone and the next inner (proven 1) zone are determined and stored in memory core planes 6 and 5, respectively. In program counter states P3 through P6 the input data in core planes 1 through 4 are subtracted from the extreme values of proven 1's stored in memory core plane 5 to find the first sub-region of proven 0's adjacent the margin. These proven 0's are stored as logical 1's in memory core plane 6. In program counter states P7 through P10 the extreme values of proven 0's (logical 1's) in core plane 6 are added to the input data stored in core planes 1 through 4 and the results temporarily stored in memory core planes 7 through 10, respectively. In program counter state P11 the overlap of stored logical 1's found in program counter states P7 through P10 is determined and the results are stored in memory core plane 5. Program counter state P11 corresponds closely in operation to that of program counter state P2. After the completion of program counter state P11 the computation resets to program counter state P3 and iteration of states P3 through P11 continues until a solution is achieved or an inconsistency is detected or no change in data occurs, thereby calling for application of the above described Northwest Corner Rule.

The general mode of operation of the computer is one of scanning along the individual magnetic elements of a memory in successive columns and rows of the memory in a systematic manner and reading information in corresponding memory bits or recording information in memory bits while simultaneously displaying information from a selected core plane on the display cathode ray tube. As pointed out hereinabove the memory comprises a three dimensional array of magnetic cores arranged in planes with a location in the top plane, for example, being determined by $x$ and $y$ coordinates of the matrix. The corresponding location in each of the successive core planes below the top one, for example, are determined by the same $x$ and $y$ coordinates so that there are a plurality of matrixes, each with the same $x$ and $y$ coordinates. It is a characteristic of operation of such memory banks that when a given address or $x,y$ coordinate is stated all of the memory bits corresponding to that $x,y$ coordinate are processed (read or write) simultaneously; that is, one memory bit in each core plane at a particular $x,y$ location is processed and the memory bits at that location are handled in parallel. This enables the computer, for example, to simultaneously count elements in two core planes and ignore elements in other core planes based only on the logical gating of the memory control. This enables simultaneous display of proven 1's in memory core plane 5 and proven 0's in memory core plane 6 on the cathode ray tube. As pointed out hereinafter the proven 1's in memory core plane 5 may be displayed as medium intensity dots and the proven 0's in core plane 6 displayed as dim intensity dots so that they are readily distinguishable.

During a scan of a line (column or row) of a core plane the computer may read or write, depending on the particular scan number (N) and program counter state (P) being performed at that time. FIG. 19 comprises a timing diagram for operation of the computer in program counter state P7 hereinafter explained in greater detail. The timing diagram for program counter state P7 is selected for exposition since it is the first of the program counter states to involve two read cycles followed by a write cycle. The purpose of the reading and the writing occurring need not be understood at this point and will be pointed out in greater detail hereinafter.

As mentioned hereinabove the scanning of the matrix of $x$ and $y$ coordinates for both memory scanning and display is conducted in a raster pattern wherein each column or row is scanned one or more times and the scan then progresses to the next column or row in a manner substantially analogous to the raster scan of a field of a conventional television image. In program counter state P7 as illustrated in the timing diagram of FIG. 19 the columns are individually scanned 3 times before proceeding to the next column. Thus, the X-fast counter (which is coincident with the count of the X-slow counter during data processing) stays at count 0 indicating the first column for three full scans. During this period the scan counter N is first in state N0 for the first period while the Y-fast counter (which is keyed to the Y-slow counter during data processing to operate at the same rate) scans up the column for five counts (to count 4); that is, the full height of the column in the sample problem. (IYFF = AD IYSF = AD N0 P7).

It should be noted that each count of the fast scan (Y-fast counter in this example) corresponds to four pulses from the computer clock or one full cycle of the time counter M; thus, for each interval noted in the timing diagram of FIG. 19 the time counter has proceeded through states M0, M1, M2, and M3. The M counter determines whether the computer reads or writes in the memory, reading occurring during counter states M0 and M1 and writing occurring during counter states M2 and M3. The logic of the computer elements (not illustrated in FIG. 19) determine whether reading or writing is conducted in a particular scan of a column during each program counter state. The computer memory is conventional in that all bits are read during counter state M1, for example, and restored in counter M3, for example, unless a signal from the memory control logic directs that the bit be modified before being recorded in the memory. Thus the bits of the computer memory may be sampled and employed in computation without specifically reciting a read-write counter state M1. In many instances the writing is also inherent and the read-write counter state M3 need not be explicit in the logical equations.

Referring again to FIG. 19, after the fast scan YF has reached the maximum count, the scan counter proceeds to count N1 (IN = AD YSM P7 N0) and the second scan of the first column occurs with the fast scan counter YF reset to 0 (RYF0 = AD RYS0 = AD YSM N0 P7) so that the second scan proceeds up the same column again, that is the slow scan XF remains at 0. When the fast scan counter reaches the maximum in state N1, indicating the completion of the second scan of the first column, the scan counter counts to state N2 (IN = AD YSM P7 N1); however, the fast scan counter YF is left at the maximum (not reset) so that it counts downwardly to scan the column down in the third scan (IYFB = AD IYSB = AD N2 P7). When the Y-fast counter reaches 0 the third scan of the first column is completed and the slow scan counter XF advances to state XF1 so that the second column is scanned (IXFF = AD IXSF = AD YS0 N2 P7 $\overline{QD}$; $\overline{QD}$ being present to provide one pulse time for reset of QD before the next scan). At the same time the scan counter N is reset to state N0 and the fast scan counter YF is set to 0 count ($\overline{RN}$ = AD YS0 N2 P7 and RYF0 = AD RYS0 = AD YS0 N2 $\overline{XSM}$ P7). As outlined in FIG. 19 the scan of the second column (XF1) proceeds in exactly the same manner as the scan of the first column. During these scans the forward counter F is counting logical 1's in core planes 6 and 1 and recording the results in memory core plane 7 as hereinafter described in greater detail.

In operation of the computer the input Ax and Ay is first written into the appropriate core planes of the memory. The apparatus then scans the rows and columns, reading some of the core plane bits, performing a counting or gating operation for each and recording the result in an appropriate core plane in order to perform some of the algorithm steps, as pointed out hereinafter. The computer begins counting at some value determined by stored information and counts forward or backward during the scan to a maximum or minimum thereafter recording the result of the counting in a selected core plane. Thus, rather than performing complex arithmetic functions, the computer principally counts and records the results of the counting as determined by the logical gating. The particular scanning and counting sequences are determined by the program counter states hereinafter described.

PROGRAM COUNTER STATES P0 AND P1

In program counter state P0, Ax data is entered along the upper and lower margins of memory core planes 1 and 2, respectively. Thus the values for $A_x$ are stored directly in core plane 1 along the lower margin and input data $A_x$ is stored in memory core plane 2 along the upper margin. The input $A_x$ data for an individual column may be provided to the computer by the punch tape reader providing signals TA1, TA2, TA4, etc., or from the panel switches for input-preset data SZ1, SZ2, SZ4, etc. The input data $A_x$ for a given column is entered into the forward and backward counters simultaneously as the first step, with each flip-flop of the two counters being set to the state corresponding to the binary number of the input data on the tape or switches. After the forward and backward counters are set to the value of the input data the column is scanned once upwardly for data entry in the memory. The state of the backward counter during this single scan in program counter state P0 determines the data entry in core plane 1 and the state of the forward counter determines the data entry in core plane 2. Each column in the memory is scanned once in a writing mode from bottom to top and the columns are successively processed from left to right to the edge of the matrix, as set forth in TABLE II hereinabove.

As the scan of an individual column progresses the backward counter B counts from the input data value of $A_x$ down to 0 and remains at 0 during the balance of the scan of that column (IB = AD $\overline{B0}$ P0). A logical 1 is entered in core plane 1 at each location where the backward counter is not at 0; that is, I1 = P0 QA $\overline{B0}$. It will be apparent that the number of counts of the backward counter required to reach 0 will exactly equal the $A_x$ value preset into the counter and a logical 1 will be entered in core plane 1 in each column position commencing at the bottom where the backward counter is not at 0.

Figure 8A:
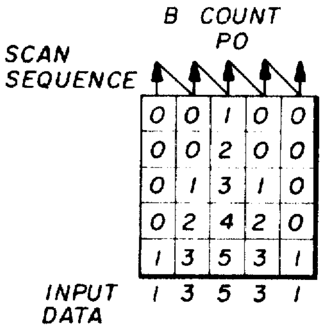
Figure 8B:
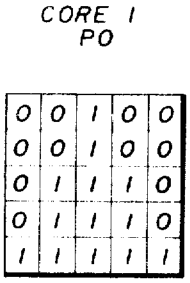

Thus using the exemplary problem of FIG. 7, in column 0 the backward count is the $A_x$ value of 1 in the first square, 0 in the second square and remains at 0 for the balance of the column as indicated in FIG. 8A. As illustrated in FIG. 8B a logical 1 is entered in core plane 1 in the first square of column 0 where the backward counter is not at 0 and logical 0's are entered in the balance of the spaces in column 0 where the backward counter is at 0. Likewise in column 1 of FIG. 8A the count of the backward counter in the first square is 3, the count in the second square is 2, the count in the third square is 1, and the count in the fourth square is 0 and the count remains at 0 for the balance of the column. Therefore logical 1's are entered in the first three spaces of column 1 where the backward counter is not at 0 and logical 0's are entered in the balance of the spaces of column 1. It will be apparent that the effect of this is to array the $A_x$ height values along the bottom margin of the matrix in core plane 1 as seen in FIG. 8B.

Concurrently $A_x$ data is entered along the top margin of core plane 2 by way of the forward counter F. As mentioned, the forward counter is preset to the $A_x$ input data from the tape reader as the first step. As the scan commences the forward counter counts up and returns to 0 after reaching the maximum count which is equal to the size of the matrix being used in the given problem (IF = AD $\overline{FM}$ P0 and RF0 = FM IF). The forward counter remains at 0 for the balance of the scan of the column after counting past the maximum. A logical 1 is entered in core plane 2 at each location where the forward counter is at 0 as detected by the detector flip-flop QD (JD = AD FM $\overline{KD}$ P0 and I2 = P0 QA QD). A logical 0 is entered in memory core plane 2 at each location where the forward counter is not at count 0 (due to the nature of the memory core and logic a logical 0 is entered automatically whenever no logical 1 is entered). It will be apparent that the number of counts required to reach the maximum count $m$ for a given matrix is that maximum $m$ less the input data $A_x$. Thus, since logical 1's are entered at each location where the forward counter is at 0, that is, it has counted past the maximum, the logical 1's entered in core plane 2 correspond exactly to an array of the $A_x$ values along the upper margin of the matrix. This could also be considered as storing the value $m-A_x$ as logical 0's along the bottom margin of the matrix and storing the $A_x$ value as 1's above the $m-A_x$. This occurs since data entry in core plane 2 commences after the forward counter has counted $m-A_x$ units above the preset $A_x$ value.

It can be seen that counter state P0 is in partial implementation of Rule (1) of the algorithm in the spatial matrix of the computer memory. Rule (1) employs a set of 1's along each of a pair of opposite margins of the matrix. Program counter state P0 has arrayed the $A_x$ data as sets of contiguous 1's along opposite margins.

Figure 8C:
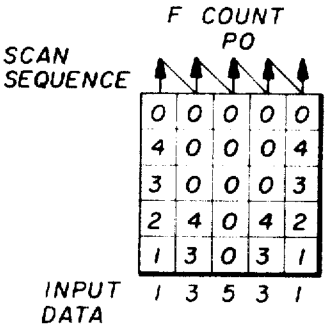
Figure 8D:
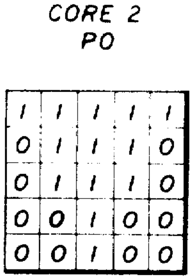
Figure 9A:
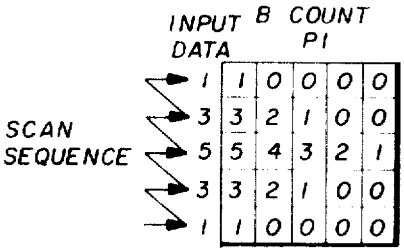
Figure 9B:
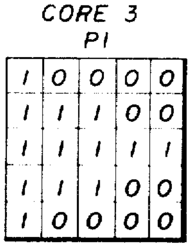
Figure 9C:
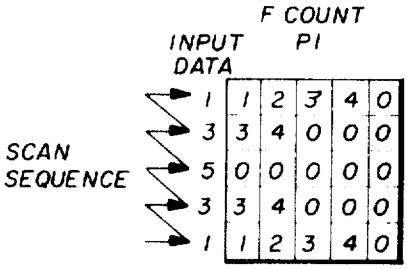
Figure 9D:
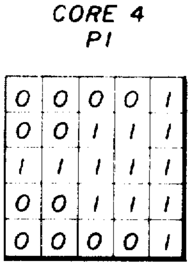

With input data of the exemplary problem set forth in FIG. 7, the forward counter commences its count from the $A_x$ value for the first column, namely 1, illustrated in FIG. 8C. As the scan proceeds up the column the count in the forward counter then proceeds 2, 3,4 and returns to 0 after reaching the maximum count of 4. Upon reaching the maximum count the flip-flop QD is set and thereafter logical 1's are entered in core plane 2. Thus, as illustrated in FIG. 8D logical 0's are entered in the first four spaces of column 0 where the forward counter is not at 0 and a logical 1 is entered in the last space of column 0 where the forward counter is at 0. If the input data value equals the column height (in this example, 5) the forward counter is automatically reset to 0 thereby recording logical 1's in the entire column in the manner illustrated in the third column in FIG. 8D RF0 = FM IF, that is, the forward counter is reset to 0 whenever the forward counter is at a maximum and there is an input to the forward counter).

In this manner during program counter state P0 the input $A_x$ curve is entered in the successive columns and is stored in memory core plane 1 along the lower margin as set forth in outline form in TABLE II hereinabove and illustrated in FIG. 8B. Likewise the input $A_x$ data is stored in memory core plane 2 along top margin as illustrated in FIG. 8D. Although separately explained herein and separately set forth in TABLE II the backward and forward counters operating on core planes 1 and 2, respectively, both operate concurrently during program counter state P0. After the entire matrix of input data for all of the columns is scanned in program counter state P0 the computer shifts to program counter state P1.

During program counter state P1 a process exactly analogous to the process of state P0 occurs with entry of $A_y$ data into memory core planes 3 and 4. The $A_y$ data is first entered into the forward and backward counters for each individual row in succession and these rows are scanned from left to right beginning at the bottom and proceeding to the top as set forth in TABLE II. The counting in the backward and forward counters, respectively, proceeds as set forth in FIGS. 9A to 9C wherein the states of these counters are set forth. Logical 1's and logical 0's are stored in memory core planes 3 and 4, respectively, as set forth in FIGS. 9B and 9D when the backward counter is not at zero and the forward counter is at zero, just as in state P0. At the end of program counter state P1 after all of the rows of the matrix have been scanned and the $A_y$ values entered at opposite margins of the matrix the computer shifts to program counter state P2. It will be apparent that in program counter state P1 the $A_y$ data is entered along the left side of the matrix and along the right margin of the matrix in a manner exactly analogous to entry of $A_x$ data in program counter state P0.

PROGRAM COUNTER STATE P2

In program counter state P2 Rule (1) of the algorithm hereinabove described is further implemented and the first zone of proven 1's is entered in core plane 5 as indicated in summary form in TABLE II hereinabove. It will be recalled that according to the rule a proven 1 is present in the region where the input data adjacent opposite margins overlaps in the center of the matrix. Thus a proven 1 is present when a logical 1 is found at identical locations (same $x,y$ coordinates) in memory core plane 1 and in memory core plane 2 since the logical 1's in these two core planes represent the $A_x$ data arrayed along the top and bottom of the matrix, respectively. If at a given $x,y$ location a logical 1 is found in both core planes 1 and 2, an overlap of data from the two sides is indicated and a logical 1 or proven 1 can be entered at that $x,y$ location in memory core plane 5. In an exactly analogous manner the simultaneous occurrence of a logical 1 in core plane 3 and in core plane 4 of the memory indicates overlap of the $A_y$ data arrayed along the two sides of the matrix and in that circumstance a proven 1 can be entered in memory core plane 5. Thus in program counter state P2 a proven 1 (logical 1) is entered in core plane 5 when the output of core planes 1 and 2 are positive or when the outputs of memory core planes 3 and 4 are positive; that is, I5 = P2 QA (01 + 03 04).

In the processing in program counter state P2 each column of core planes 1,2,3 and 4 is scanned once from bottom to top and the columns are processed sequentially from left to right as indicated in FIG. 10. The individual memory bits in core planes 1, 2, 3 and 4 are simultaneously scanned and gating according to the above logical equation is employed to enter a logical 1 in core plane 5 when coincidence of logical 1's occurs in core planes 1 and 2 or 3 and 4.

Figure 10A:
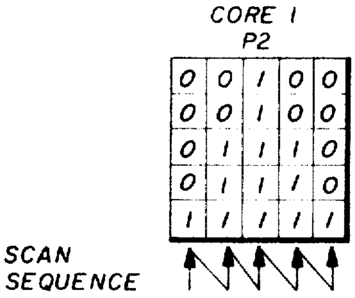
Figure 10B:
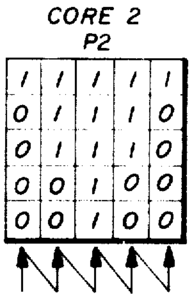
Figure 10C:
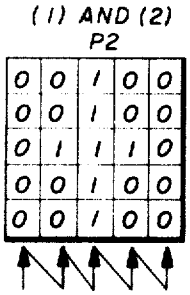

FIGS. 10A, 10B, 10D and 10E illustrate the input data recorded in core planes 1, 2, 3 and 4, respectively, for the exemplary problem set forth hereinabove. It is apparent from examination of FIGS. 10A and 10B that there is no coincidence of logical 1's in any space in column 0 of core planes 1 and 2. There is, therefore, no basis for entering a proven 1 in column 0 of FIG. 10C which represents the proven 1's found by coincidence of logical 1's in core planes 1 and 2. There is, however, coincidence of logical 1's in the third square of column 0 in both core plane 3 and core plane 4 as illustrated in FIGS. 10D and 10E. Therefore, a proven 1 can be entered in the third square of column 0 as indicated in FIG. 10F which represents the proven 1's found by coincidence of logical 1's in core planes 3 and 4. Similarly, for example, coincidence of logical 1's is found in the third square of column 1 of core planes 1 and 2 as indicated in FIGS. 10A and 10B, respectively. Therefore, a proven 1 can also be entered in the third square of column 1 as indicated in FIG. 10C. All of the proven 1's from FIGS. 10C and 10F are found in this same manner and are entered as proven 1's in core plane 5 in a pattern as shown in FIG. 10G for the selected example. FIG. 10G represents the content of memory core plane 5 at the end of program counter state P2 showing the proven 1's that have been found at this point in the computation. This pattern is clearly generated by entering a 1 for each 1 in either FIG. 10C or FIG. 10F. It will be recognized that the patterns of FIGS. 10C and 10F are not actually implemented in the computer but are set forth only to illustrate the operation of the computer. In actuality each space in the matrix is separately and sequentially processed and a pattern such as in FIG. 10G found directly.

After all of the columns have been scanned in program counter state P2 the program counter P advances to counter state P3 to complete stage 1 of the computation (IP = AD XSM YSM P2). Program counter states P0, P1, and P2 are not repeated in the solution of a particular problem.

PROGRAM COUNTER STATES P3 THROUGH P6

In program counter states P3 through P6 respectively, proven 0's are entered as logical 1's at the bottom, top, and sides of the matrix in implementation of Rule (2) of the above stated algorithm. Program counter state P3 is typical of these four operations and involves the insertion of proven 0's (logical 1's) at the bottom of the matrix in core plane 6. In this program counter state each column is scanned twice before proceeding to the next column. The first scan is down and the second scan is up. The first scan for each column reads the data in core planes 5 and 1 and second scan records the results of the counter in memory core plane 6 as explained in greater detail hereinafter. The columns are processed successively from left to right with the aforementioned two scans being made of each column before proceeding to the next.

At the beginning of program counter state P3 the backward counter B is set to the maximum count which corresponds to the matrix size in the Y direction that is, BM = BSYC0 P3 where BSYC0 indicates coincidence between the flip-flops Q44, Q45, etc., forming the backward counter and the Y matrix size switches S1, S2, S4, etc.

As the column scan commences in program counter state P3 is scan counter state N0, scanning is down the first column (1YSB = AD N0 P3) and the backward counter commences counting downwardly beginning from the maximum count and continues to count down until a proven 1 is encountered in memory core plane 5. The backward counter thus counts the number of logical 0's located before the first logical 1 (proven 1) in memory core plane 5. The location of this first proven 1 (from the top of the matrix) is indicated herein as $y$ max. When a proven 1 is encountered in memory core plane 5 the detector flip-flop QD is set, thereby stopping the count of the backward counter (unless an alternative signal causes counting). In logical terminology JD = AD 05 N0 $\overline{KD}$ P3 and IB = AD $\overline{05}$ $\overline{QD}$ N0 P3.

During the first downward scan, that is, scan state N0 in program counter state P3 memory core plane 1 is also being scanned and the backward counter counts each of the logical 1's in memory core plane 1 (IB = AD 01 N0 P3). This count is ORed with the count from memory core plane 5 and it can occur that the count of logical 1's in core plane 1 will commence before the end of counting of logical 0's in core plane 5. If this is the case, there will be no hiatus in the counting on the backward counter. On the other hand, it may occur that a proven 1 is detected in core plane 5 before the scan has reached the first logical 1 in core plane 1 in which case the backward counter stops counting at the first proven 1 and recommences only when the first logical 1 in core plane 1 is encountered. It will be recalled that the logical 1's in core plane 1 are arrayed along the bottom of the matrix and in a downward scan the first 1 in core plane 1 may very well occur either before or after the detection of a proven 1 in core plane 5.

FIG. 11 illustrates the data processing for program counter state P3 for the exemplary problem set forth hereinabove. FIG. 11A shows the content of memory core plane 5 showing the proven 1's and logical 0's therein (in core plane 5 a logical 1 is a proven 1, but a logical 0 bears no relation to proven 0's). FIG. 11B shows the input Ax data arrayed along the bottom margin of the matrix in memory core plane 1. FIG. 11C shows the scan pattern occurring in program counter state P3 and the actual count of the backward counter during the scanning.

It should be noted that the number appearing in a particular location in FIG. 11C, as in other counting sequences, is the count of the backward counter resulting from processing of the next previous element. Thus the count after processing of the first element will appear in the next step or next element and when counting commences the lowered count will appear in the next square rather than the square in which counting commences. Thus, for example, the count commences in the upper left portion of FIG. 11C at count 4 and counting proceeds for the first two squares proceeding downwardly since logical 0's are in memory core plane 5 (FIG. 11A). The counts 3 and 2 on the backward counter therefore appear in the next two spaces proceeding downwardly in the first column of FIG. 11C. In the third square of the first column of core plane 5 a 1 is encountered and the backward counter is stopped at that point. Therefore the count in the fourth square from the top is a 2 in the first column exactly the same as the count in the third square.

As pointed out in the previous paragraph the backward counter starts counting the number of logical 0's preceding the first proven 1 in core plane 5 and proceeds downwardly from count 4 to count 2 as illustrated in FIG. 11C. The count is stopped at that point and remains at 2 until a logical 1 is encountered in memory core plane 1 at which time the backward counter again commences counting. This is seen by reference to FIG. 11B wherein a logical 1 is found in the lowermost square of the first column and in FIG. 11C wherein the backward counter again commences counting in the lowermost square with the count diminishing by one in the following space, that is, the first space of the upward scan of the first column in FIG. 11C.

This operation can also be seen in the second column of FIG. 11C wherein the backward counter again commences counting at count 4 and proceeds to count downwardly in the first two squares where logical 0's are present in memory core plane 5 (FIG. 11A). In the third square a proven 1 is encountered in memory core plane 5 and the flip-flop QD is set as pointed out hereinabove. This would cease the counting of backward counter B except that this signal is ORed with the data in core plane 1 (FIG. 11B) and it is seen that a logical 1 is present in the third square of core plane 1. Therefore the backward counter continues to count downwardly as the scan continues down in the second column of FIG. 11C (IB = AD N0 P3 ($\overline{05}\,\overline{QD}$ + 01)).

After the scan reaches the bottom of the first column (the end of scan counter state N0) during program counter state P3, the scan counter advances to state N1 (IN = YS0 P3) and the scan then proceeds upwardly in the same column (IYSF = AD N1 P3) with the backward counter starting at the count remaining after the downward scan and continuing to count down. That is, the B counter is not reset at the beginning of scan N1 but proceeds to count downwardly during the second scan past zero and to the maximum count and the backward counter remains at the maximum count during the balance of the N1 scan; that is, to the top of the column (IB = AD N1 $\overline{BM}$ P3). A logical 1 (proven 0) is entered in core plane 6 in all spaces where the backward counter is not at a maximum (I6 = P3 N1 QA $\overline{BM}$). On the first or downward scan N0 the computer only reads information from memory core planes 5 and 1 and writing into core plane 6 occurs only on the upward scan N1.

In the sample problem as illustrated in FIG. 11C, the backward counter is not at the maximum (4) in the first and second squares of the upward scan of column 0 and therefore logical 1's are entered in the first two squares in core plane 6 as illustrated in FIG. 11D. In the second column in FIG. 11C the backward counter counts to 0 in the downward scan and past 0 to the maximum count for the entire upward scan. There is, therefore, no space in the upward scan where the backward counter is not at maximum and therefore no logical 1's (proven 0's) are entered in core plane 6 as shown in FIG. 11D.

The data processing occurring in program counter state P3 in effect subtracts the input $A_x$ data in memory core plane 1 from the $y$ value of the space above the first proven $y$ max in memory core plane 5 (this count proceeding no lower than 0 if the input data exceeds the number of available spaces). The operation can also be stated as $y$ max + 1−$A_x$ where $y$ max is the value of the uppermost proven 1 in core plane 5. This can also be considered as moving the $A_x$ value as a contiguous set of 1'up so that the highest 1 in that set coincides with the highest proven 1 in core plane 5. The analogy to the operation of Rule (2) is then apparent.

Proven 0's must be present below the lowest 1 in the $A_x$ set when so positioned and logical 1's are therefore entered in core plane 6 to represent these proven 0's. Although this is true in program counter state P3 wherein the backward counter is employed it may be more readily apparent in program counter state P4 wherein the forward counter is employed in an exactly analogous manner.

After the entire matrix has been scanned in program counter state P3 column by column with two scans of each column, down and then up, the program counter P advances to program counter state P4 (IP = AD XSM YSM N1 P3).

Data processing in program counter state P4 is substantially identical to the processing in program counter state P3 except that the scan in each column is first up and then down and the forward counter F is used in lieu of the backward counter as summarized in TABLE II hereinabove. This step is in further implementation of Rule (2) of the above stated algorithm and establishes proven 0's at the upper side of the matrix in the same manner that proven 0's were found at the lower side of the matrix in program counter state P3.

Figure 12C:
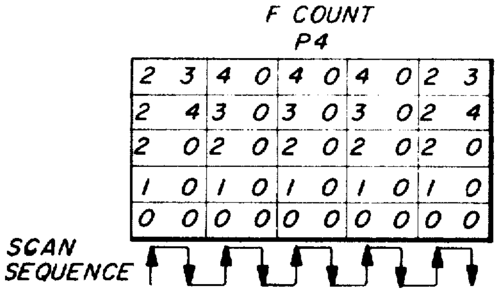

The forward counter is reset to 0 at the end of program counter state P3 RF0 = IP P3) and in program counter state P4 the forward counter proceeds to count up from zero toward a maximum. The forward counter first counts the logical 0's located before the first proven 1 (Y min) in core plane 5 as illustrated in FIG. 12. FIG. 12A represents the content of memory core plane 5 wherein the 1's are proven 1's and the 0's are logical 0's. FIG. 12B represents the content of memory core plane 2 wherein the $A_x$ data are arrayed against the upper margin of the matrix. FIG. 12C illustrates the scanning sequence for the columns during program counter state P4 and includes the count on the forward counter during these scans. In the first column the count on the forward counter commences at 0 at the bottom of the column and proceeds to counts 1 and 2 until a proven 1 is encountered in the third square of memory core plane 5 (FIG. 12A). At this point the flip-flop QD is set by the 1 in core plane 5, stopping the forward counter unless some other command causes it to proceed JD = AD 05 N0 $\overline{KD}$ P4 and IF = AD $\overline{05}\,\overline{QD}$ N0 P4). The count in the forward counter remains at count 2 in the first column of FIG. 12C as the scan proceeds upwardly since there are no logical 1's in core plane 2 until the final or uppermost square, at which time the forward counter again commences counting and proceeds to count 3 in this example (IF = AD 02 N0 P4).

Figure 12D:
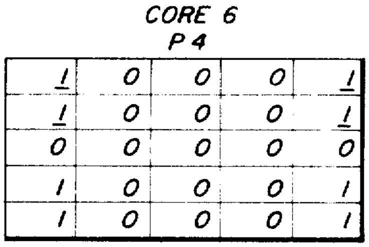

It will be seen from an examination of FIG. 12C that the forward counter has counted the number of logical 0's preceding the first proven 1 in memory core plane 5 as indicated by the count 2 in the third square from the bottom. This count is also equal to the $y$ coordinate of the space below lowest proven 1 in core plane 5, that is $y$ min−1 where $y$ min is the $y$ value of the lowest 1. Stopping the count at the first proven 1 in core plane 5 locates this proven 1. This count also is a measure of the number of spaces remaining at the top of the column since the forward counter can proceed only to the maximum number of spaces in the column. Counting the input data in core plane 2 then amounts to a reduction in the number of available spaces at the top of the column in which proven 0's may occur. Thus at the commencement of the downward scan only two spaces may be occupies by proven 0's as indicated by the counts 3 and 4 of the forward counter. After reaching the maximum count (4) the forward counter counts past the maximum to 0 count and remains there for the balance of the downward write scan (IF = AD N1 $\overline{F0}$ P4 and RF0 = AD FM P4). A logical 1 (proven 0) is entered in memory core plane 6 on the downward scan N1 whenever the forward counter is not at 0. (I6 = P6 N1 QA $\overline{F0}$). Thus logical 1's (proven 0's) are entered in the upper two squares of the first column in core plane 6 as indicated in FIG. 12D. In FIG. 12D the two logcial 1's added in program counter state P4 are underlined, the balance of the 1's having been entered in program counter state P3. After all the columns have been scanned, the program counter advances to counter state P5 (IP = AD XSM YS0 N1 P4).

Figure 13A:
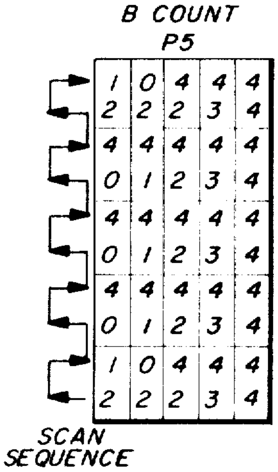
Figure 13B:
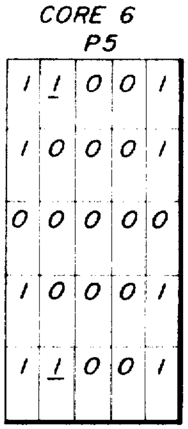
Figure 13C:
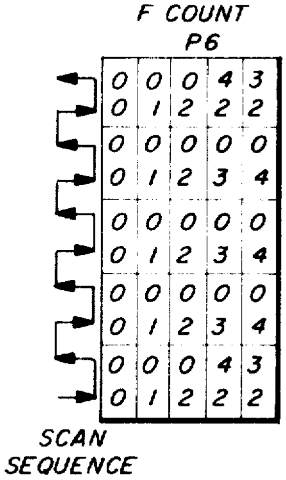
Figure 13D:
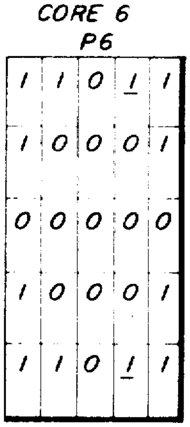

Program counter state P5 and P6 are substantially the same as program counter states P3 and P4, respectively, except that the rows are scanned rather than the columns. The scan sequences and data processing occurring in program counter states P5 and P6 are identified in TABLE II hereinabove. The content of memory core plane 6 at the end of program counters state P5 is illustrated in FIG. 13B. In this program counter state the backward counter B is employed as in program counter state P3 as illustrated in FIG. 13A, and new logical 1's (proven 0's) are entered on the left side of the matrix as indicated by the underlining of 1's in FIG. 13B. The content of memory core plane 6 at the end of the program counter P6 is illustrated in FIG. 13D. This program counter state employs the forward counter in substantially the same manner as program counter state P4 as illustrated in FIG. 13C and locates proven 0's (logical 1's) at the right side of the matrix as indicated by the underlining of new logical 1's. After all of the rows have been scanned proceeding from bottom to top with two scans of each row in program counter state P6 the program counter advances to program counter P7.

PROGRAM COUNTER STATES P7 THROUGH P10

In program counter states P7 through P10 proven 0's adjacent the edges of the matrix are added to the input data values and entries of logical 1's made in core planes 7 to 10 in partial implementation of Rule (5) of the above stated algorithm. Fill-in Rules (3) and (4) are also implemented in these program counter states as will appear hereinafter. Rule (8) can be considered a special case of Rule (5) and is inherently executed in the described implementation. In these program counter states a new array of data is prepared along the margins of the matrix in a form analogous to that in core planes 1 through 4 except that the array adjacent each margin of the matrix now is a sum of the input data plus proven 0's for each line. These arrays are temporarily stored for finding a new region of overlap in program counter state P11 in a manner analogous to the overlap found in program counter state P2.

Program counter state P7 is typical of program counter states P7 through P10 and in this state proven 0's adjacent the bottom of the matrix are added to the $A_x$ values in core plane 1 and the total entered in core plane 7 as illustrated in FIG. 14. A partial representation of this operation is also contained in the timing diagram of FIG. 19. In program counter state P7 each column of the matrix is scanned three times before proceeding to the next column and the columns are processes successively from left to right. As pointed out hereinabove in relation to FIG. 19 in the first two scans of each column in scan counter states N0 and N1 the scanning direction is up and in the third scan in scan counter state N2 the scan direction is down. The logical gating during these scans provides a reading in memory core plane 6 in the first upward scan to count the logical 1's before the first logical 0, and reading in memory core plane 1 on the second upward scan to count the logical 1's of Ax. By successively counting in these core planes, the contents are effectively added. On the third or downward scan a result of the previous two operations is recorded or written in memory core plane 7.

At the end of program counter state P6 the forward counter is reset to 0 so that it is at 0 at the beginning of program counter state P7 RF0 = IP P6). On the first upward scan of the first column as defined by scan counter state N0 the forward counter F starts at count 0 and counts the logical 1's located before the first logical 0 in memory core plane 6. Upon coming to the first logical 0 in core plane 6 the detector flip-flop QD is set thereby stopping the count of the forward counter (JD = AD 06 N0 $\overline{KD}$ P7 and IF = AD 06 QD N0 P7). Since the detector flip-flop QD remains set for the balance of the first upward scan the forward counter remains at the count where it was stopped for the balance of the upward scan despite the presence of any additional logical 1's at the upper portion of core plane 6. Thus it is seen that in the first scan the forward counter counts the proven 0's (logical 1's) adjacent the bottom margin of the matrix.

On the second upward scan defined by scan counter state N1 the forward counter counts the logical 1's in core plane 1 commencing with the count remaining from the first upward scan (IF = AD 01 N1 P7). It will be recalled that the logical 1's in core plane 1 represent the input Ax data arrayed along the bottom margin of the matrix. After all of the logical 1's in core plane 1 have been counted in the second upward scan the forward counter ceases counting at that count and remains at that count for the balance of the upward scan.

This is illustrated in FIG. 14 and FIG. 19. FIG. 14A and the sixth line of FIG. 19 represent the contents of memory core plane 6 at the end of program counter state P6 with logical 1's representing proven 0's. FIG. 14B and the seventh line of FIG. 19 are representations of the input Ax data stored in memory core plane 1. FIG. 14C illustrates the scan sequence occurring in program counter state P7 and also shows the count of the forward counter during data processing. These are also shown in the fourth and fifth lines, respectively, of FIG. 19.

In the first upward scan in the example of FIG. 14 the forward counter commences at count 0 and proceeds to count in the first two spaces since logical 1's are present in this column in memory core plane 6 as shown in FIG. 14A. A logical 0 is encountered in the third square of this column and advancement of the forward counter ceases at this point as seen in FIG. 14C. At the commencement of the second upward scan represented by scan counter state N1 the forward counter is advanced one count by the single logical 1 occurring in the first space in memory core plane 1 as illustrated in FIG. 14B. Thus the forward counter advances from count 2 to count 3 and remains at count 3 for the balance of the second upward scan. The count 3 clearly represents the sum of the proven 0's adjacent the bottom margin in memory core plane 6 (two) and the input data Ax adjacent the bottom margin in core plane 1 (one).

In order to store the sum in memory core plane 7 the third scan represented by scan counter state N2 proceeds downwardly in the column and the forward counter commences counting again with the first square on the downward scan and proceeds to count to the maximum count (4) and past the maximum to 0, at which time the forward counter is stopped and remains at count 0 for the balance of the downward scan (IF = AD N2 $\overline{F0}$ P7 and RF0 = AD FM N2 P7).

In order to record logical 1's in core plane 7 an input is provided thereto whenever the forward counter is at 0. This is actually implemented by setting flip-flop QH when the forward counter counts past maximum (JH = RF0 $\overline{N0}$ and I7 = P7 N2 QC QH). The forward counter maximum detector flip-flop QH is employed for entering the logical 1's in core plane 7 since forward counter state F0 is not suitable for this purpose because it would cause erroneous entry of logical 1's in core plane 7 where the value of the input data Ax is zero.

Referring again to FIG. 14 or FIG. 19 the forward counter is not at 0 in the first two spaces of the downward scan and therefore logical 0's are entered in these spaces of core plane 7. In the final three spaces of the first column the forward counter is at 0 as seen in FIG. 14C and logical 1's are entered in memory core plane 7 as seen in FIG. 14D. In FIG. 19 this same operation is indicated by showing the memory write signal I7 as true for entry of a logical 1 and false for entry of a logical 0.

During program counter state P7 some of the fill-in rules of the algorithm are also implemented, specifically Rule (3) and Rule (4). It will be recalled that Rule (3) calls for filling in proven 1's in any blanks occurring in the same line between two proven 1's. Rule (4) calls for inserting proven 0's in all blanks that occur between the margin and a 0, or between two 0's in the same line, if the number of blanks is insufficient to accommodate the required number of 1's. In addition to implementing these rules during program counter state P7 proven 0's are also entered in the balance of a line where a proven 0 is detected after a proven 1. Although this is not one of the specific rules of the algorithm it normally accomplishes the same effect as Rule (6). This latter operation is a consequence of the previously stated constraint on the problems being solved that there is no $x$ or $y$ concavity in the closed curve and therefore a 0 cannot intervene between two 1's. If there cannot be two 1's separated by a 0 it is therefore proper to enter 0's for the balance of a line when a 0 is detected after a proven 1.

Rule (3) for filling in proven 1's is partly implemented in program counter state P7 with additional implementation coming in program counter state P8 and completion in program counter state P11 as hereinafter described in greater detail. In program counter state P7 during scan counter state N2 on the third downward scan of the matrix, core plane 5 is also being read (scanned in the read mode) while writing is occurring in core plane 7. If a proven 1 is detected in core plane 5 a proven 1 detector flip-flop QE is set to the true condition causing logical 1's to be filled in at all remaining spaces in the column in core plane 7. The flip-flop QE is actually set anytime a proven 1 is found in core plane 5 (JE = AD 05). However, it is reset at the end of the first and second scans (KE =

AD YSM P7) and writing occurs in core plane 7 only during the third (N2) downward scan (I7 = P7 N2 QA QE. Thus if a proven 1 is detected in core plane 5 all of the remaining spaces between that proven 1 and the bottom margin are filled with logical 1's in memory core plane 7. The output of the flip-flop QE is ORed with the forward counter outputs (actually through the forward counter maximum detector flip-flop QH as pointed out hereinabove) so that logical 1's are entered in core plane 7 in either condition (I7 = P7 N2QA (QH + QE)).

Skipping ahead momentarily to program counter states P8 and P11 which are explained in greater detail hereinafter, the balance of the implementation of Rule (3) is described. Program counter state P8 is similar to counter state P7 except that (for this exposition) the final write scan in the column is upward instead of downward. During counter state P8 if a proven 1 is detected in core plane 5 the same proven 1 detector flip-flop QE is set to a true condition causing logical 1's to be entered in the remaining locations in the column in core plane 8. That is, logical 1's are entered in core plane 8 at the upper edge in all spaces beyond the first proven 1.

In program counter state P11 memory core planes 7 and 8 are ANDed to identify coincidence of logical 1's in substantially the same manner as in program counter state P2. When logical 1's are identified in both core planes 7 and 8 a proven 1 is entered in that location in core plane 5. (I5 = P11 QA 07 08). Since in core plane 7 logical 1's were entered in every space below that corresponding to the highest proven 1 in core plane 5, and in core plane 8 logical 1's were entered in every space above the lowest proven 1 in core plane 5, there is an overlap of logical 1's in core planes 7 and 8 in all spaces between the highest and lowest proven 1's. Since there is coincidence of logical 1's in core planes 7 and 8, proven 1's are filled-in in core plane 5 in counter state P11 between the highest and lowest proven 1's thereby implementing Rule (3).

Returning now to program counter state P7 an operation is also provided for inserting proven 0's (logical 1's) in memory core plane 6 in accord with the constraint of no *y* concavity. As mentioned hereinabove during the scanning of a matrix all core planes are simultaneously scanned and it is quite feasible to simultaneously read in some core planes and write in others as selected by the logical gating. Thus during the third or N2 scan in program counter state P7 memory core plane 6 is scanned in a read mode (M1) during the same time cycle that writing (M3) may be occurring in memory core plane 7. This read mode for memory core plane 6 may change to a writing mode in response to the logical gating herein described.

If in scanning a column from top to bottom during the third or N2 scan a proven 1 is detected in core plane 5 and thereafter a proven 0 is detected in core plane 6 proven 0's may be filled in in the balance of the column. This is true since all of the proven 1's must be contiguous and therefore no 0 can intervene between proven 1's. If a proven 1 is found followed by a proven 0 no additional 1's can be found in that column after the 0.

In order to implement this operation, during program counter state P7 core planes 5 and 6 are read simultaneously with the above described reading and writing operations occurring in the third downward scan. As was mentioned above in describing the implementation of Rule (3) the proven 1 detector flip-flop QE is set when a proven 1 is detected in core plane 5. If thereafter (while QE is set) a proven 0 is detected in core plane 6 a proven 0 detector flip-flop QF is set (JF = AD 06 QE) causing proven 0's (logical 1's) to be inserted at the remaining locations in the column in core plane 6 of the memory. Thus an entry is made in core plane 6 during the third downward scan whenever the flip-flop QF is set (I6 = P7 N2 QA QF). The flip-flop QF is, of course, set only after the flip-flop QE is set; that is, when a proven 0 is found in core plane 6 after a proven 1 is found in core plane 5.

Rule (4), calling for insertion of proven 0's in all blanks that occur between the matrix margin and a 0 if the number of blanks is insufficient to accommodate the required number of 1's, is also implemented in program counter state P7. As mentioned hereinabove memory core plane 6 is being scanned in a reading mode during the third downward scan N2 at the same time that writing is occurring in memory core plane 7 (the time is actually delayed by the difference in time between states M1 and M3 of the read-write counter M. If a proven 0 (logical 1) is detected in core plane 6 at a location where the forward counter F is already at 0 the detector flip-flop QD is set (JD = AD F0 $\overline{BM}$ 06 N2 $\overline{KD}$). The setting of the detector flip-flop QD in this scan and program state causes proven 0's (logical 1's) to be filled in at the remaining locations in that column in core plane 6 (I6 = P7 N2 QA AD).

The rationale and operation of this procedure became clearer upon an examination of TABLE V wherein corresponding single columns of various core planes in a memory are illustrated in an interim portion of a problem solution for a different problem than the 5×5 matrix used to illustrate other aspects of the solution. First is set forth an exemplary ten unit column from core plane 6 wherein a single proven 0 (logical 1) occurs in the third space from the bottom of the matrix. Next is illustrated the corresponding column from core plane 1 wherein the input Ax value is stored as logical 1's in the first four spaces at the bottom of the column. The normal scanning sequence of program counter state P7 is set forth in the next three columns with the numbers in the columns being the count in the forward counter F during the scan states N0, N1 and N2.

TABLE V

| Core 6 | Core 1 | F Counter $N_0$ | $N_1$ | $N_2$ | Core 7 | Core 6 | |
|---|---|---|---|---|---|---|---|
| 0 | 0 | 0 | 4 | 4 | 0 | 0 | |
| 0 | 0 | 0 | 4 | 5 | 0 | 0 | |
| 0 | 0 | 0 | 4 | 6 | 0 | 0 | |
| 0 | 0 | 0 | 4 | 7 | 0 | 0 | |
| 0 | 0 | 0 | 4 | 8 | 0 | 0 | |
| 0 | 0 | 0 | 4 | 9 | 0 | 0 | |
| 0 | 1 | 0 | 3 | 0 | 1 | 0 | |
| 1 | 1 | 0 | 2 | 0 | 1 | 1 | Proven 0's |
| 0 | 1 | 0 | 1 | 0 | 1 | 1 | |
| 0 | 1 | 0 | 0 | 0 | 1 | 1 | |

On the first upward scan N0, the forward counter does not advance since there are no 1's adjacent the lower margin in memory core plane 6. (IF = AD 06 $\overline{QD}$ N0 P7, however, JD = AD $\overline{06}$ N0 KD P7). On the second upward scan N1, counting commences of the input data Ax in core plane 1 and proceeds up to count 4 (which is not the maximum of the F counter in this example) and remains at count 4 for the balance of the upward scan of the column. On the third or downward scan N2 the counting in the forward counter proceeds past the maximum (9, in the example) to 0 and remains at 0 for the balance of the column as hereinabove described. During the downward scan N2, logical 1's are recorded in core plane 7 as indicated in the next to last column of TABLE V.

It is apparent that the logical 1's in core plane 7 are merely the same as those of the input data in core plane 1 and no benefit has been obtained of the information that a proven 0 (logical 1) is present in the third square up in core plane 6. Therefore, when the logical 1 is detected in core plane 6 while the forward counter is at 0 in the last scan (that is, the remaining number of squares in the column is down to or below the maximum Ax) it is known that the total Ax value cannot fit in the remaining spaces, and therefore logical 1's (proven 0's) can be entered in the bottom two spaces in the column in core plane 6 as shown in the last column of TABLE V. This makes no change in the data in core plane 7 for this operation in program counter state P7; however, at the next iteration (of P3 through P11) the first proven 0 in core plane 6 is adjacent the margin and the number of proven 0's (3) at the bottom of the column in core plane 6 is added to the Ax value (4) in core plane 1 and seven logical 1's are entered in the bottom portion of core plane 7.

It will be seen by cursory examination that if the single logical 1 in core plane 6 had been in the third space from the top of the column rather than the position shown, the forward counter would not be at 0 when the 1 is encountered and the flip-flop QD would not be set, therefore no new proven 0's would be added to core plane 6. This latter situation would, however, be picked up in program counter state P8 which scans upwardly in the final N2 scan.

When all of the columns have been scanned in counter state P7 with each column scanned 3 times the program counter advances from counter state P7 to P8.

Computer data processing during program counter states P8, P9 and P10 are substantially similar to data processing during program counter state P7 with three exceptions: (1) the scanning order is changed as indicated in TABLE II; (2) when proven 0's are found adjacent the respective margin in core plane 6, they are added to the input data stored in core planes 2, 3 and 4, respectively, rather than core plane 1 as in counter state P7; and (3) the results are stored in core plane 8, 9, and 10, respectively. In effect, in program counter states P8, P9 and P10 the proven 0's at the top, left, and right sides, respectively, of the matrix are algebraically added to the stored input data in core planes 2, 3, and 4 and the results are entered in core planes 8, 9, and 10, respectively. The various counters, detector flip-flops and the like operate in the same manner in these program counter states as in program counter state P7 and the same rules of the algorithm are implemented.

The scan sequence and count of the forward counter in the three scans of each column in program counter state P8 are illustrated in FIG. 15A, returning again to the exemplary problem set forth in FIG. 7. In the first downward scan N0 the data in memory core plane 6 is scanned and this data is that hereinabove illustrated in FIG. 13B. On the second downward scan N1 the forward counter counts the $m$—Ax data stored in memory core plane 2 as illustrated in FIG. 10B. As pointed out hereinabove in relation to program counter state P7 logical 1's are entered in core plane 8 at all locations where the forward counter is at 0. Thus, for example, in the first column logical 1's are entered in the upper three squares as indicated in FIG. 15B which represents the content of memory core plane 8 after data processing in program counter state P8.

In a similar manner FIG. 16A illustrates the scan sequence and count on the forward counter during program counter state P9. In the first scan from left to right in the bottom row, the content of memory core plane 6 as illustrated in FIG. 13B, is scanned. In the second scan from left to right the same row is scanned in memory core plane 3 as illustrated in FIG. 10D. On the third scan from right to left the forward counter continues counting past the maximum to 0 as hereinabove described and logical 1's are entered in memory core plane 9 wherever the forward counter is at 0. The content of memory core plane 9 after data processing in program counter state P9 is illustrated in FIG. 16B.

In a similar manner FIG. 17A illustrates the scan sequence and count of the forward counter during program counter state P10. In the first scan of the bottom row from right to left the proven 0's adjacent the right margin in memory core plane 6 are counted as hereinabove described and illustrated in FIG. 13B. In the second scan from right to left the input data stored in memory core plane 4 is scanned and counted by the forward counter. In the third scan from left to right the forward counter continues counting past maximum to 0 and logical 1's are entered in memory core plane 10 as illustrated in FIG. 17B wherever the forward counter is at 0. After the rows have all been scanned in program counter state P10 the program advances to program counter state P11.

PROGRAM COUNTER STATE P11

In program counter state P11 implementation of Rule (5) of the above stated algorithm is completed. This operation is substantially the same as hereinabove described in relation to program counter state P2 except that overlap is found for modified data as stored in core planes 7 through 10 rather than the original input data as stored in memory core planes 1 through 4. The results of the comparison are stored in memory core plane 5 as proven 1's.

FIG. 18 illustrates the data processing in program counter state P11. In this program counter state each column is scanned once from bottom to top with the columns being successively scanned from left to right. During this single scan memory core planes 7, 8, 9 and 10 are read and the results of the logical gating are recorded in memory core plane 5 I5 = QA P11 (07 08 + 09 010). FIG. 18A illustrates the content of memory core plane 7 after data processing in program counter state P7. FIG. 18B illustrates the content of memory core plane 8 after data processing in program counter state P8. FIGS. 18D and 18E represent the content of memory core planes 9 and 10 after data processing in program counter states P9 and P10, respectively. As pointed out hereinabove in relation to program counter state P2 coincidence of logical 1's in both core plane 7 and core plane 8 in a given $x,y$ location, indicates that this $x,y$ location is within the closed curve being found and therefore a proven 1 is established. This proven 1 is recorded in the appropriate $x,y$ location of memory core plane 5. Scanning of the memory core plane 7 and 8 as illustrated in FIGS 18A and 18B yields proven 1's as illustrated in FIG. 18C. In FIG. 18C new proven 1's not previously in memory core plane 5 (from earlier data processing) are indicated by underlining. In the same manner and at the same time, memory core planes 9 and 10, as illustrated in FIGS. 18D and 18E are scanned and proven 1's which are indicated by coincidence of logical 1's in these two core planes are found as illustrated in FIG. 18F. New, proven 1's found in the scans of core planes 9 and 10 and not previously in core plane 5 from the processing of program counter state P2 are indicated by underlining (it just so happens, in the example selected that the new proven 1's found in a scan of core planes 7 and 8 are the same new proven 1's as found in the scan of core planes 9 and 10). The coincidence of logical 1's in core planes 7 and 8 is ORed with the coincidence of logical 1's in core planes 9 and 10 so that these scans are combined for recording in memory core plane 5 as illustrated in FIG. 18G. (FIGS. 18C and 18F are thus employed for purposes of illustration and do not appear per se in any memory of the computer). It will be seen from examination of FIG. 18G that the proven 1's correspond exactly to the heavy dots within the curve in FIG. 7 and examination of FIG. 13B which represents the content of memory core plane 6 shows that the logical 1's (proven 0's) exactly coincide with the smaller dots outside of the curve as illustrated in FIG. 7. (I5 = P11 QA (07 08 + 09 010)).

After program counter state P11 has been completed by scanning all the columns, the program counter resets to program counter state P3 and the cycle through counter states P3 through P11 is repeated as needed until no further change occurs in the data recorded in core planes 5 and 6 upon a complete iteration as detected by flip-flop QNC hereinabove described. At this point either a complete solution has been obtained or no solution can be obtained without application of the aforementioned Northwest Corner Rule.

As a matter of fact, with a 64×64 or 128×128 matrix employed, complete solutions for most data inputs have been found and only rarely has the Northwest Corner Rule been needed. Experience shows that a small matrix may call for the Northwest Corner Rule fairly often, however, the large matrix usually proceeds to a solution without it. Because of this and the rapidity with which a solution is obtained, it has been found convenient to implement the Northwest Corner Rule merely by manually inserting a 1 or 0 in the Northwest-most location as herein described. Manual switches on the computer control panel select a matrix position and switches E1 or E0 cause entry of a 1 or 0 respectively, to obtain a solution as hereinabove described. If desired, the Northwest-most unproven location in the matrix can be located automatically by the computer when no change occurs in the stored data in core planes 5 and 6 upon iteration of program counter states P3 through P11, and when there remain empty spaces with neither a proven 0 or a proven 1, and the Northwest Corner Rule automatically implemented to provide multiple solutions stored in additional available memory core planes.

DISPLAY INTENSITY CONTROL

In order to illustrate the actual mechanization of the logical equations such as herein set out for a special purpose computer, the schematic diagram of the display intensity control 46 (FIG. 6) is illustrated in FIG. 21. The intensity control 46 controls the Z axis for the display device 29 such as a cathode ray tube, that is, it controls the intensity of the electron beam and image dots on the face of the tube. To provide such control, different voltage levels are applied to the cathode ray tube and the intensity control 46 provides a plurality of such voltage levels in response to the state of various elements of the computer.

In order to describe the mechanization of a computer such as herein described either of two nomenclatures may be employed. In the first of these, logical equations such as hereinabove set forth can be used, or in the alternative, logic diagrams such as illustrated in FIG. 21 can be used. The logical equations and the logic diagrams are equivalent and the use of one or the other of the types of representation excludes any necessity for the other. Given either nomenclature, the other is readily prepared if desired. In the computer herein described the intensity control 46 is selected to demonstrate the equivalency of the two types of nomenclature since the intensity control also includes certain voltage control circuits in addition to the logical elements which may be described by logical equations. The schematic diagrams for some such circuits are not readily amenable to representation as equations.

The logical equations for the intensity control 46 are:

ZDIM = SB11 06 M3
ZMED = M3(SB1 01 + SB2 02 + SB3 03 + SB4 04 + SB5 05 + SB6 06 + SB7 07 + SB8 08 + SB9 09 + SB10 010 + SB11 05 + SB11 011 012)
ZBRIGHT = XCO YCO SM M3 + 05 06 M3 where ZDIM, ZMED, and ZBRIGHT are three distinct voltage level signals applicable to the display CRT.

As mentioned hereinabove it is convenient in implementing the algorithm in a special purpose computer to employ so-called diode transistor logic elements. These elements are commercially available as integrated circuit packages and are commonly known as NAND gates. The NAND gate is commonly represented by the logical symbol 51 appearing in FIG. 15. The NAND gate can also be considered as an AND gate plus an inverter. Thus, for example, the NAND gate 51 gives a false output when both SB1 and 01 are true. Similarly, when either the selector switch SB1 or the memory output 01 from core plane 1 is false, a true output is obtained from NAND gate 51. Similarly, if, for example, all of the selector switches SB1 through SB11 are off or false, all of the outputs from the NAND gates, 51, 52 et seq. are true, hence all of the inputs to the NAND gate 53 are true and the output thereof is false.

By properly combining NAND gates and selecting inputs thereto, the AND and OR functions of the logical equations are implemented. In the special purpose computer it often occurs that series of gates are involved and by using NAND gates the number of component interconnections is minimized and a uniform type of gate is employed for simplicity. If one desires an OR gate, the inputs to the NAND gate are the inverse signals, thus inputs of $\overline{A}$ and $\overline{B}$ to a NAND gate give an output of A + B (i.e., A or B). An AND gate is obtained when the inputs are not inverted and the output of the NAND gate is then connected to an inverter. This may seem like an extra element in the system, but as a matter of practice a NAND gate includes an inverter and the series of such gates in the computer provides the desired functions with a minimum of components.

This can be seen in FIG. 21 by reference to the NAND gates 51, 52, and 53. The inputs to gates 51 and 52 are not inverted, therefore the outputs are inverted, viz $\overline{\text{SB1 01}}$ and $\overline{\text{SB 2 02}}$. When these two inverted signals are applied as inputs to the NAND gate 53, it acts as an OR gate to give an output (partial) of SB1 01 + SB2 02. The gates 51 and 52, since followed by an inverter, act as AND gates.

It will, of course, be apparent that if desired the mechanization can be accomplished with AND and OR gates according to the logical equation rather than the NAND gates herein described as a typical mechanization.

In another example of use of a NAND gate the inverse of the fourth state of the time counter M3 is applied to a NAND gate 54 which in this instance merely acts as an inverter to provide an output signal M3. It is apparent, of course, that M3 is true only when $\overline{\text{M3}}$ is false.

According to the Z control logical equations set out hereinabove the intensity of the spots on the display tube is set for each spot in each time counter state M3. All of the terms in the logical equations for Z control include the term M3 and the output of the NAND gate 54 is therefore applied as an input to each of the NAND gates 56 in the ZDIM control, 57 in the ZMED control, and 58 and 59 in the ZBRIGHT control. In the mechanization illustrated a +V voltage is also applied to the M3 signal through a resistor 61 to maintain processing speed by providing a fast rise time at the leading edge of the M3 waveform. In this mechanization a false signal is indicated by a 0 voltage (or short to ground) and a true signal is indicated by a plus voltage such as, for example, +5V. It will be apparent to one skilled in the art that application of such voltages to all inputs can be provided if desired with a consequent increase in power dissipation in the computer, however, as is conventionally done, such voltages are applied in only selected inputs as required for adequate rise time and current capacity.

In the special purpose computer intensity control Z is provided by discrete voltage levels. In the absence of any voltage signal from the intensity control only a minimal voltage is employed to provide a very dim matrix display in the normal operation of the display device 29 (not shown in FIG. 21).

If, according to the logical equations, selector switch SB11, which selects a certain core plane or core planes for display is on or true, and a memory bit in core plane 6 is true at time counter state M3 then a ZDIM signal is provided. As will be seen from the upper portion of FIG. 21 signals M3, SB11 and 06 are applied as inputs to NAND gate 56. When all of these are true, the output of the NAND gate 56 is false. Inverting of this signal makes the gate 56 in combination with the inverter, act like an AND GATE. The output of the NAND gate 56 is, therefore, applied to the ZDIM inverter. In this arrangement the output of the NAND gate 56 is applied to the base of a PNP transistor 62 by way of a resistor 63 which serves to limit current, and a capacitor 64 which serves to maintain signal sharpness and provide a fast response time in a conventional manner. The inverter transistor 62 is biased by a +V voltage applied to the emitter of the transistor, which has its collector connected to a −V voltage via a resistor 67. In the state when there is no ZDIM signal, a +V voltage is applied to the base of the transistor 62 by way of a resistor 66 so that no transistor conduction occurs.

When all of the inputs to the NAND gate 56 are true, the output is false, that is, there is a 0 voltage pulse at the NAND gate output. This consequent dropping of voltage on the base of the transistor 62 (by way of resistor 63 and capacitor 64) rapidly causes conduction thereof and raises the voltage across a resistor 67 in a conventional ladder network with resistors 68 and 69. This, of course, raises the voltage a small amount on the base of a transistor 71 which serves as an amplifier and inverter. The magnitude of the voltage rise on the base of the transistor 71 is dependent on the values of the resistor forming the ladder network.

Application of a positive voltage to the base of the appropriately biased amplifier and inverter transistor 71 causes a drop in voltage on the collector thereof. This drop in voltage is coupled to the bases of emmitter connected NPN and PNP transistors 72 and 73 which collectively serve to lower the impedance of the output signal on the collector of the transistor 71 for application as Z axis control or intensity control on a display device 29. The impedance lowering transistors 72 and 73 serve to overcome the inherent capacitance of the coaxial connection to the cathode ray tube employed as a display device and enhance the speed of operation of the display.

According to the logical equations set forth hereinabove the ZMED control is activated in time counter state M3 when any of the manual selector switches SB 1, SB2, et seq. is on or true and a bit in the corresponding memory core plane is also true. If all of the selector switches SB2, SB3, et seq. are off and the selector switch SB1 is on, for example, the display device shows the contents of the first core plane in the memory. If a logical 1 is stored in a given $x,y$ location in this memory, the memory output 01 is true and a medium intensity dot is displayed on the cathode ray tube at that corresponding location on the matrix. If, on the other hand, a logical 0 is present in a given $x,y$ location in memory core plane 1 the output signal 01 is false and there is no intensification of the display signal and a dot with only background intensity will appear at that $x,y$ location.

The mechanization of this can be seen in FIG 21 by assuming that the memory output signal 01 is false, in which case the output of the NAND gate 51 is true. It will be recalled that the other selector switches SB2 et seq. are all off or false, therefore, all of the inputs to the NAND gate 53 are true. When all of the inputs are true the output of the NAND gate 53 is false, and, at time counter state M3, the output of the NAND gate 57 is true. This output, applied to the ZMED inverter causes no change and there is no intensification of the dot on the display device.

If, on the other hand, the bit in the memory core plane 1 is true, the output 01 is true along with select or switch SB1 and the output of NAND gate 51 is therefore false. Since the inputs to the NAND gate 53 are no longer all true the output of the NAND gate 53 is no longer false but becomes true. This output applied to the inverting NAND gate 57 result in a false signal at the output thereof. This false signal operates in exactly the same way in the ZMED inverter as the false signal in the ZAIM inverter hereinabove described except that the voltage is raised between resistors 68 and 69 instead of between resistors 67 and 68. Since this voltage increase is at a point in the ladder network nearer the base of the transistor 71 a higher voltage is applied thereto thereby yielding a stronger negative signal at the collector and hence a stronger intensification signal Z applied to the display device 29. The ZMED signal is more negative than the ZDIM signal and a more intense spot appears on the face of the cathode ray tube.

In the same manner the ZBRIGHT signal is applied to the display device in response to conditions set forth in the logical equation therefore. As seen in this equation either of two situations may provide a ZBRIGHT signal in time counter state M3. The matrix on the display device is scanned continually at the rate of the fast counter in order to maintain the intensity of the spots on the face of the cathode ray tube and minimize flicker. A coincidence gate XCO identifies the time when the X- slow counter XS and the X-fast counter XF are at the same X value (FIG. 6). The XCO signal is applied to the NAND gate 58 in FIG. 21. Similarly, a coincidence gate YCO detects the situation when the count on the Y-fast counter YF is the same as the count on the Y-slow counter YS and the signal YCO is also applied to the NAND gate 58. A manual marker switch SM is also connected to the NAND gate 58. When the manual marker switch SM is ON, the position illustrated in FIG. 21 (the switch SM is OFF when shorted to ground), this input to the NAND gate 58 is true and at the time when X coincidence and Y coincidence both occur all of the inputs to the NAND gate are true and a ZBRIGHT signal is obtained.

The ZBRIGHT inverter operates in the same manner as hereinabove pointed out for the ZDIM inverter except that the voltage rise across the resistors 67, 68 and 69 is applied directly to the base of the transistor 71 and is therefore higher than the voltages applied by the ZDIM and ZMED signals which are reduced by the ladder network. This, of course, yields a more negative Z signal to the display and hence a more intense spot. When the marker switch is on and X and Y coincidence occur, a bright spot therefore appears at the selected $x,y$ location on the face of the cathode ray tube. The location of the bright marker spot on the matrix indicates the location of data processing at any instant, scanning continuously in the continuous mode or stopping at a selected location for other operating modes as determined by the mode selector switches SA1, SA2, etc., hereinabove described. This is particularly convenient when it is desired to manually insert data during operation of the program, in which case the marker is stopped at a particular $x$ and $y$ location and an appropriate entry made into a selected core plane of the memory. The bright marker spot serves to verify the $x$ and $y$ location in the matrix.

In addition to the marking function for manual observation and data input the ZBRIGHT signal is provided in the alternative situation where a true signal is present in both memory core plane 5 and memory core plane 6. It will be recalled that memory core plane 5 has a logical 1 or true signal for each $x,y$ point in which a 1 has been proven and that memory core plane 6 has a logical 1 or true signal for each $x,y$ location where a proven 0 is present. If both a proven 1 and a proven 0 are indicated to be present in a given location, both core planes 5 and 6 will be true and the result is considered to be inconsistent. If both of the memory core output signals 05 and 06 are true at a given $x,y$ location the output of the NAND gate 55 will be false and a ZBRIGHT signal will be applied at the corresponding $x,y$ location on the matrix to identify for the operator the exact location of any inconsistencies.

Operation of the computer is stopped when inconsistent data is found and the inconsistent data stop switch SIDS is ON. It will be recalled that the data processing continues so long as the program advance flip-flop QA is set. When inconsistent data is detected the program advance flip-flop is reset according to the equation KA = 05 06 AD SIDS, thus the computer stops at the point where inconsistent data is read (counter state M1) and the point is marked by the ZBRIGHT signal at that spot when both memory core planes 5 and 6 are true.

The operator, upon noting the position of an inconsistency in the matrix, makes a judgment as to whether a 1 or a 0 seems more reasonable in the particular location and manually enters 1's or 0's as appropriate to adjust the original input data in core planes 1, 2, 3 or 4 to provide such a result. It will be apparent that, if desired, weighted guidelines can be provided so that a limited number of inconsistencies can be handled by the computer automatically without introducing substantial error in the final result. For example, a simple inconsistency of one unit at the margin of a closed curve arising from a measurement error or rounding off of analog data to digital form, gives, in a matrix of 128 units × 128 units, a row or column error of about 1 percent and an area error of about 0.01 percent.

The above description of the mechanization logical equations is illustrative of the mechanization of the other logical equations in this description. It will be appreciated by one skilled in the art that exactly analogous logic diagrams can be prepared, if desired, from the logical equations set forth herein; however, for convenience, the shorthand representation of the logical equation is preferred.

The intensity control hereinabove described and illustrated in FIG. 21 provides a means for displaying the problem solution during and after processing. When selector switch SB11 is ON dim dots are provided at all points on the matrix where memory core plane 6 is true; that is, where proven 0's are present. Likewise, medium intensity dots are provided at all points in the matrix where memory core plane 5 is true; that is, where proven 1's are present. Thus at the completion of problem solution the points within the closed curve are represented by medium intensity dots and the points outside the curve are represented by dim intensity dots.

LOGICAL EQUATIONS

The components for the special purpose computer have been described hereinabove in the section entitled "Circuit Design and Components" with reference also to the section entitled, "Nomenclature." The interconnections between the various components of the computer have been indicated in describing the components and also in the description of the program counter states. The interconnections are generally stated as logical equations representing counters, AND, and OR gates, and the like, as hereinabove pointed out. The interconnection between the various components of the computer are summarized in the following logical equations:

LOGICAL EQUATIONS

Backward Counter B $$\mathrm{IB} = \mathrm{AD}\ \overline{\mathrm{BO}}\ (\mathrm{P0} + \mathrm{P1}) + \mathrm{AD}\ \mathrm{FO}\ \overline{\mathrm{BM}}\ \mathrm{N2}$$
$$+ \mathrm{AD}\ \overline{\mathrm{05}}\ \overline{\mathrm{QD}}\ \mathrm{NO}\ \mathrm{P3} + \mathrm{AD}\ \mathrm{01}\ \mathrm{NO}\ \mathrm{P3} + \mathrm{AD}\ \mathrm{N1}\ \overline{\mathrm{BM}}\ \mathrm{P3}$$
$$+ \mathrm{AD}\ \overline{\mathrm{05}}\ \overline{\mathrm{QD}}\ \mathrm{NO}\ \mathrm{P5} + \mathrm{AD}\ \mathrm{03}\ \mathrm{NO}\ \mathrm{P5} + \mathrm{AD}\ \mathrm{N1}\ \overline{\mathrm{BM}}\ \mathrm{P5}$$
$$+ \mathrm{AD}\ \overline{\mathrm{01}}\ \mathrm{N1}\ \mathrm{P7} + \mathrm{AD}\ \overline{\mathrm{02}}\ \mathrm{N1}\ \mathrm{P8} + \mathrm{AD}\ \overline{\mathrm{03}}\ \mathrm{N1}\ \mathrm{P9} + \mathrm{AD}\ \overline{\mathrm{04}}\ \mathrm{N1}\ \mathrm{P10}$$

$$\mathrm{PBX} = \mathrm{IP}\ \mathrm{P4} + \mathrm{AD}\ \mathrm{BO}\ \mathrm{P5}$$

$$\mathrm{PBY} = \mathrm{IP}\ \mathrm{P2} + \mathrm{AD}\ \mathrm{BO}\ \mathrm{P3} + \mathrm{RP3}$$

$$\mathrm{BM} = \mathrm{BSYCO}\ \mathrm{P3} + \mathrm{BSXCO}\ \mathrm{P5}$$

$$\mathrm{J44} = \mathrm{IB'} + \mathrm{PBX}\ \mathrm{SX1} + \mathrm{PBY}\ \mathrm{SY1} + \mathrm{PBZ}\ \mathrm{D1}$$
$$\mathrm{K44} = \mathrm{IB'} + \mathrm{PBX}\ \overline{\mathrm{SX1}} + \mathrm{PBY}\ \overline{\mathrm{SY1}} + \mathrm{PBZ}\ \overline{\mathrm{D1}}$$
$$\mathrm{J45} = \mathrm{IB'}\ \overline{\mathrm{Q44}} + \mathrm{PBX}\ \mathrm{SX2} + \mathrm{PBY}\ \mathrm{SY2} + \mathrm{PBZ}\ \mathrm{D2}$$
$$\mathrm{K45} = \mathrm{IB'}\ \overline{\mathrm{Q44}} + \mathrm{PBX}\ \overline{\mathrm{SX2}} + \mathrm{PBY}\ \overline{\mathrm{SY2}} + \mathrm{PBZ}\ \overline{\mathrm{D2}}$$
$$\mathrm{J46} = \mathrm{IB'}\ \overline{\mathrm{Q44}}\ \overline{\mathrm{Q45}} + \mathrm{PBX}\ \mathrm{SX4} + \mathrm{PBY}\ \mathrm{SY4} + \mathrm{PBZ}\ \mathrm{D4}$$
$$\mathrm{K46} = \mathrm{IB'}\ \overline{\mathrm{Q44}}\ \overline{\mathrm{Q45}} + \mathrm{PBX}\ \overline{\mathrm{SX4}} + \mathrm{PBY}\ \overline{\mathrm{SY4}} + \mathrm{PBZ}\ \overline{\mathrm{D4}}$$
$$\mathrm{J47} = \mathrm{IB'}\ \overline{\mathrm{Q44}}\ \overline{\mathrm{Q45}}\ \overline{\mathrm{Q46}} + \mathrm{PBX}\ \mathrm{SX8} + \mathrm{PBY}\ \mathrm{SY8} + \mathrm{PBZ}\ \mathrm{D8}$$
$$\mathrm{K47} = \mathrm{IB'}\ \overline{\mathrm{Q44}}\ \overline{\mathrm{Q45}}\ \overline{\mathrm{Q46}} + \mathrm{PBX}\ \overline{\mathrm{SX8}} + \mathrm{PBY}\ \overline{\mathrm{SY8}} + \mathrm{PBZ}\ \overline{\mathrm{D8}}$$
$$\mathrm{J48} = \mathrm{IB'}\ \overline{\mathrm{Q44}}\ \overline{\mathrm{Q45}}\ \overline{\mathrm{Q46}}\ \overline{\mathrm{Q47}} + \mathrm{PBX}\ \mathrm{SX16} + \mathrm{PBY}\ \mathrm{SY16} + \mathrm{PBZ}\ \mathrm{D16}$$
$$\mathrm{K48} = \mathrm{IB'}\ \overline{\mathrm{Q44}}\ \overline{\mathrm{Q45}}\ \overline{\mathrm{Q46}}\ \overline{\mathrm{Q47}} + \mathrm{PBX}\ \overline{\mathrm{SX16}} + \mathrm{PBY}\ \overline{\mathrm{SY16}} + \mathrm{PBZ}\ \overline{\mathrm{D16}}$$
$$\mathrm{J49} = \mathrm{IB'}\ \overline{\mathrm{Q44}}\ \overline{\mathrm{Q45}}\ \overline{\mathrm{Q46}}\ \overline{\mathrm{Q47}}\ \overline{\mathrm{Q48}} + \mathrm{PBX}\ \mathrm{SX32} + \mathrm{PBY}\ \mathrm{SY32} + \mathrm{PBZ}\ \mathrm{D32}$$
$$\mathrm{K49} = \mathrm{IB'}\ \overline{\mathrm{Q44}}\ \overline{\mathrm{Q45}}\ \overline{\mathrm{Q46}}\ \overline{\mathrm{Q47}}\ \overline{\mathrm{Q48}} + \mathrm{PBX}\ \overline{\mathrm{SX32}} + \mathrm{PBY}\ \overline{\mathrm{SY32}} + \mathrm{PBZ}\ \overline{\mathrm{D32}}$$
$$\mathrm{J50} = \mathrm{IB'}\ \overline{\mathrm{Q44}}\ \overline{\mathrm{Q45}}\ \overline{\mathrm{Q46}}\ \overline{\mathrm{Q47}}\ \overline{\mathrm{Q48}}\ \overline{\mathrm{Q49}} + \mathrm{PBX}\ \mathrm{SX64} + \mathrm{PBY}\ \mathrm{SY64} + \mathrm{PBZ}\ \mathrm{D64}$$
$$\mathrm{K50} = \mathrm{IB'}\ \overline{\mathrm{Q44}}\ \overline{\mathrm{Q45}}\ \overline{\mathrm{Q46}}\ \overline{\mathrm{Q47}}\ \overline{\mathrm{Q48}}\ \overline{\mathrm{Q49}} + \mathrm{PBX}\ \overline{\mathrm{SX64}} + \mathrm{PBY}\ \overline{\mathrm{SY64}} + \mathrm{PBZ}\ \overline{\mathrm{D64}}$$

$$\mathrm{IB'} = \mathrm{IB}\ \overline{\mathrm{PBX}}\ \overline{\mathrm{PBY}}\ \overline{\mathrm{PBZ}}$$

$$\mathrm{BO} = \overline{\mathrm{Q44}}\ \overline{\mathrm{Q45}}\ \overline{\mathrm{Q46}}\ \overline{\mathrm{Q47}}\ \overline{\mathrm{Q48}}\ \overline{\mathrm{Q49}}\ \overline{\mathrm{Q50}}$$

$$\mathrm{BSXCO} = (\mathrm{Q44}\ \mathrm{SX1} + \overline{\mathrm{Q44}}\ \overline{\mathrm{SX1}})\ (\mathrm{Q45}\ \mathrm{SX2} + \overline{\mathrm{Q45}}\ \overline{\mathrm{SX2}})$$
$$(\mathrm{Q46}\ \mathrm{SX4} + \overline{\mathrm{Q46}}\ \overline{\mathrm{SX4}})\ (\mathrm{Q47}\ \mathrm{SX8} + \overline{\mathrm{Q47}}\ \overline{\mathrm{SX8}})$$
$$(\mathrm{Q48}\ \mathrm{SX16} + \overline{\mathrm{Q48}}\ \overline{\mathrm{SX16}})\ (\mathrm{Q49}\ \mathrm{SX32} + \overline{\mathrm{Q49}}\ \overline{\mathrm{SX32}})$$
$$(\mathrm{Q50}\ \mathrm{SX64} + \overline{\mathrm{Q50}}\ \overline{\mathrm{SX64}})$$

$$\mathrm{BSYCO} = (\mathrm{Q44}\ \mathrm{SY1} + \overline{\mathrm{Q44}}\ \overline{\mathrm{SY1}})\ (\mathrm{Q45}\ \mathrm{SY2} + \overline{\mathrm{Q45}}\ \overline{\mathrm{SY2}})$$
$$(\mathrm{Q46}\ \mathrm{SY4} + \overline{\mathrm{Q46}}\ \overline{\mathrm{SY4}})\ (\mathrm{Q47}\ \mathrm{SY8} + \overline{\mathrm{Q47}}\ \overline{\mathrm{SY8}})$$
$$(\mathrm{Q48}\ \mathrm{SY16} + \overline{\mathrm{Q48}}\ \overline{\mathrm{SY16}})\ (\mathrm{Q49}\ \mathrm{SY32} + \overline{\mathrm{Q49}}\ \overline{\mathrm{SY32}})$$
$$(\mathrm{Q50}\ \mathrm{SY64} + \overline{\mathrm{Q50}}\ \overline{\mathrm{SY64}})$$

Forward Counter F $$\mathrm{IF} = \mathrm{AD}\ \overline{\mathrm{FM}}\ (\mathrm{P0} + \mathrm{P1})$$
$$+ \mathrm{AD}\ \overline{\mathrm{05}}\ \overline{\mathrm{QD}}\ \mathrm{NO}\ \mathrm{P4} + \mathrm{AD}\ \mathrm{02}\ \mathrm{NO}\ \mathrm{P4} + \mathrm{AD}\ \mathrm{N1}\ \overline{\mathrm{FO}}\ \mathrm{P4}$$
$$+ \mathrm{AD}\ \overline{\mathrm{05}}\ \overline{\mathrm{QD}}\ \mathrm{NO}\ \mathrm{P6} + \mathrm{AD}\ \mathrm{04}\ \mathrm{NO}\ \mathrm{P6} + \mathrm{AD}\ \mathrm{N1}\ \overline{\mathrm{FO}}\ \mathrm{P6}$$
$$+ \mathrm{AD}\ \mathrm{06}\ \overline{\mathrm{QD}}\ \mathrm{NO}\ \mathrm{P7} + \mathrm{AD}\ \mathrm{01}\ \mathrm{N1}\ \mathrm{P7} + \mathrm{AD}\ \mathrm{N2}\ \overline{\mathrm{FO}}\ \mathrm{P7}$$
$$+ \mathrm{AD}\ \mathrm{06}\ \overline{\mathrm{QD}}\ \mathrm{NO}\ \mathrm{P8} + \mathrm{AD}\ \mathrm{02}\ \mathrm{N1}\ \mathrm{P8} + \mathrm{AD}\ \mathrm{N2}\ \overline{\mathrm{FO}}\ \mathrm{P8}$$
$$+ \mathrm{AD}\ \mathrm{06}\ \overline{\mathrm{QD}}\ \mathrm{NO}\ \mathrm{P9} + \mathrm{AD}\ \mathrm{03}\ \mathrm{N1}\ \mathrm{P9} + \mathrm{AD}\ \mathrm{N2}\ \overline{\mathrm{FO}}\ \mathrm{P9}$$
$$+ \mathrm{AD}\ \mathrm{06}\ \overline{\mathrm{QD}}\ \mathrm{NO}\ \mathrm{P10} + \mathrm{AD}\ \mathrm{04}\ \mathrm{N1}\ \mathrm{P10} + \mathrm{AD}\ \mathrm{N2}\ \overline{\mathrm{FO}}\ \mathrm{P10}$$

Forward Counter F (Continued)

RFO = AD FM (P4 + P6) + IP (P3 + P5 + P6) + FM IF + AD FM N2 (P7 + P8 + P9 + P10) + AD FM (P7 O1 + P8 O2 + P9 O3 + P10 O4)

FM = FSYCO (P0 + P4 + P7 + P8) + FSXCO (P1 + P6 + P9 + P10)

J37 = IF' + PFZ D1
K37 = IF' + PFZ $\overline{D1}$ + RFO
J38 = IF' Q37 + PFZ D2
K38 = IF' Q37 + PFZ $\overline{D2}$ + RFO
J39 = IF' Q37 Q38 + PFZ D4
K39 = IF' Q37 Q38 + PFZ $\overline{D4}$ + RFO
J40 = IF' Q37 Q38 Q39 + PFZ D8
K40 = IF' Q37 Q38 Q39 + PFZ $\overline{D8}$ + RFO
J41 = IF' Q37 Q38 Q39 Q40 + PFZ D16
K41 = IF' Q37 Q38 Q39 Q40 + PFZ $\overline{D16}$ + RFO
J42 = IF' Q37 Q38 Q39 Q40 Q41 + PFZ D32
K42 = IF' Q37 Q38 Q39 Q40 Q41 + PFZ $\overline{D32}$ + RFO
J43 = IF' Q37 Q38 Q39 Q40 Q41 Q42 + PFZ D64
K43 = IF' Q37 Q38 Q39 Q40 Q41 Q42 + PFZ $\overline{D64}$ + RFO IF' = IF $\overline{PFZ}$ $\overline{RFO}$ FO = $\overline{Q37}$ $\overline{Q38}$ $\overline{Q39}$ $\overline{Q40}$ $\overline{Q41}$ $\overline{Q42}$ $\overline{Q43}$ FSXCO = (Q37 SX1 + $\overline{Q37}$ $\overline{SX1}$) (Q38 SX2 + $\overline{Q38}$ $\overline{SX2}$)
(Q39 SX4 + $\overline{Q39}$ $\overline{SX4}$) (Q40 SX8 + $\overline{Q40}$ $\overline{SX8}$)
(Q41 SX16 + $\overline{Q40}$ $\overline{SX16}$) (Q42 SX32 + $\overline{Q42}$ $\overline{SX32}$)
(Q43 SX64 + $\overline{Q43}$ $\overline{SX64}$)

FSYCO = (Q37 SY1 + $\overline{Q37}$ $\overline{SY1}$) (Q38 SY2 + $\overline{Q38}$ $\overline{SY2}$)
(Q39 SY4 + $\overline{Q39}$ $\overline{SY4}$) (Q40 SY8 + $\overline{Q40}$ $\overline{SY8}$)
(Q41 SY16 + $\overline{Q41}$ $\overline{SY16}$)(Q42 SY32 + $\overline{Q42}$ $\overline{SY32}$)
(Q43 SY64 + $\overline{Q43}$ $\overline{SY64}$)

Time Counter M

IM = 1
RM = 0
M0 = $\overline{Q1}$ $\overline{Q2}$
M1 = Q1 $\overline{Q2}$
M2 = $\overline{Q1}$ Q2
M3 = Q1 Q2

Scan Counter N

IN = AD YSO (P3 + P8) N0 + AD YSO P8 N1
+ AD YSM (P4 + P7) N0 + AD YSM P7 N1
+ AD XSO (P5 + P10) N0 + AD XSO P10 N1
+ AD XSM (P6 + P9) N0 + AD XSM P9 N1

RN = AD XSO N1 (P6) + AD XSO N2 (P9)
+ AD XSM N1 (P5) + AD XSM N2 (P10)
+ AD YSO N1 (P4) + AD YSO N2 (P7)
+ AD YSM N1 (P3) + AD YSM N2 (P8)

J3 = IN' + PPZ SZ32
K3 = IN' + PPZ $\overline{SZ32}$ + RN
J4 = IN' Q3 + PPZ SZ64
K4 = IN' $\underline{Q3}$ + PPZ $\overline{SZ64}$ + RN
IN' = IN $\overline{RN}$
N0 = $\overline{Q3}$ $\overline{Q4}$
N1 = Q3 Q4
N2 = $\overline{Q3}$ Q4
N3 = Q3 Q4

Program Counter P

IP = AD XSM YSM (P0 + P1 + P2)
+ AD XSM YSM N1 (P3 + P5)
+ AD XSM YSO N1 (P4)
+ AD XSO YSM N1 (P6)
+ AD XSM YSM N2 (P8 + P10)
+ AD XSO YSM N2 (P9)

RP3 = AD XSM YSM P11

JP1 = IP' + PPZ SZ1 + RP3
KP1 = IP' + PPZ $\overline{SZ1}$
JP2 = IP' QP1 + PPZ SZ2 + RP3
KP2 = IP' QP1 + PPZ $\overline{SZ2}$
JP3 = IP' QP1 QP2 + PPZ SZ4
KP3 = IP' QP1 QP2 + PPZ $\overline{SZ4}$ + RP3
JP4 = IP' QP1 QP2 QP3 + PPZ SZ8
KP4 = IP' QP1 QP2 QP3 + PPZ $\overline{SZ8}$ + RP3
JP5 = IP' QP1 QP2 QP3 QP4 + PPZ SZ16
KP5 = IP' QP1 QP2 QP3 QP4 + PPZ $\overline{SZ16}$ + RP3

IP' = IP $\overline{PPZ}$ $\overline{RP3}$

P0 = $\overline{QP1}$ $\overline{QP2}$ $\overline{QP3}$ $\overline{QP4}$ $\overline{QP5}$
P1 = QP1 $\overline{QP2}$ $\overline{QP3}$ $\overline{QP4}$ $\overline{QP5}$
P2 = $\overline{QP1}$ QP2 $\overline{QP3}$ $\overline{QP4}$ $\overline{QP5}$
P3 = QP1 QP2 $\overline{QP3}$ $\overline{QP4}$ $\overline{QP5}$
P4 = $\overline{QP1}$ $\overline{QP2}$ QP3 $\overline{QP4}$ $\overline{QP5}$
P5 = QP1 $\overline{QP2}$ QP3 $\overline{QP4}$ $\overline{QP5}$
P6 = $\overline{QP1}$ QP2 QP3 $\overline{QP4}$ $\overline{QP5}$
P7 = QP1 QP2 QP3 $\overline{QP4}$ $\overline{QP5}$
P8 = $\overline{QP1}$ $\overline{QP2}$ $\overline{QP3}$ QP4 $\overline{QP5}$
P9 = QP1 $\overline{QP2}$ $\overline{QP3}$ QP4 $\overline{QP5}$
P10 = $\overline{QP1}$ QP2 $\overline{QP3}$ QP4 $\overline{QP5}$
P11 = QP1 QP2 $\overline{QP3}$ QP4 $\overline{QP5}$
P12 = $\overline{QP1}$ $\overline{QP2}$ QP3 QP4 $\overline{QP5}$
P13 = QP1 $\overline{QP2}$ QP3 QP4 $\overline{QP5}$
P14 = $\overline{QP1}$ QP2 QP3 QP4 $\overline{QP5}$

X Fast Counter XF

IXFF = $\overline{AD}$ YFM M3 + AD IXSF
IXFB = AD IXSB
RXFO = $\overline{AD}$ XFM YFM M3 + AD RXSO
RXFM = AD RXSM
J5 = IXFF' + IXFB' + RXFM SX1
K5 = IXFF' + IXFB' + RXFM $\overline{SX1}$ + RXFO
J6 = IXFF' Q5 + IXFB' $\overline{Q5}$ + RXFM SX2
K6 = IXFF' Q5 + IXFB' $\overline{Q5}$ + RXFM $\overline{SX2}$ + RXFO
J7 = IXFF' Q5 Q6 + IXFB' $\overline{Q5}$ $\overline{Q6}$ + RXFM SX4
K7 = IXFF' Q5 Q6 + IXFB' $\overline{Q5}$ $\overline{Q6}$ + RXFM $\overline{SX4}$ + RXFO
J8 = IXFF' Q5 Q6 Q7 + IXFB' $\overline{Q5}$ $\overline{Q6}$ $\overline{Q7}$ + RXFM SX8
K8 = IXFF' Q5 Q6 Q7 + IXFB' $\overline{Q5}$ $\overline{Q6}$ $\overline{Q7}$ + RXFM $\overline{SX8}$ + RXFO
J9 = IXFF' Q5 Q6 Q7 Q8 + IXFB' $\overline{Q5}$ $\overline{Q6}$ $\overline{Q7}$ $\overline{Q8}$ + RXFM SX16
K9 = IXFF' Q5 Q6 Q7 Q8 + IXFB' $\overline{Q5}$ $\overline{Q6}$ $\overline{Q7}$ $\overline{Q8}$ + RXFM $\overline{SX16}$ + RXFO
J10 = IXFF' Q5 Q6 Q7 Q8 Q9 + IXFB' $\overline{Q5}$ $\overline{Q6}$ $\overline{Q7}$ $\overline{Q8}$ $\overline{Q9}$ + RXFM SX32
K10 = IXFF' Q5 Q6 Q7 Q8 Q9 + IXFB' $\overline{Q5}$ $\overline{Q6}$ $\overline{Q7}$ $\overline{Q8}$ $\overline{Q9}$ + RXFM $\overline{SX32}$ + RXFO
J11 = IXFF' Q5 Q6 Q7 Q8 Q9 Q10 + IXFB' $\overline{Q5}$ $\overline{Q6}$ $\overline{Q7}$ $\overline{Q8}$ $\overline{Q9}$ $\overline{Q10}$ + RXFM SX64
K11 = IXFF' Q5 Q6 Q7 Q8 Q9 Q10 + IXFB' $\overline{Q5}$ $\overline{Q6}$ $\overline{Q7}$ $\overline{Q8}$ $\overline{Q9}$ $\overline{Q10}$ + RXFM $\overline{SX64}$ + RXFO IXFF' = IXFF $\overline{RXFO}$ $\overline{RXFM}$
IXFB' = IXFB $\overline{RXFO}$ $\overline{RXFM}$ X Fast Counter XF (Continued)

$$\mathrm{XFO} = \overline{\mathrm{Q5}}\;\overline{\mathrm{Q6}}\;\overline{\mathrm{Q7}}\;\overline{\mathrm{Q8}}\;\overline{\mathrm{Q9}}\;\overline{\mathrm{Q10}}\;\overline{\mathrm{Q11}}$$

$$\begin{aligned}\mathrm{XFM} = {} & (\mathrm{Q5\;SX1} + \overline{\mathrm{Q5}}\;\overline{\mathrm{SX1}})\;(\mathrm{Q6\;SX2} + \overline{\mathrm{Q6}}\;\overline{\mathrm{SX2}}) \\ & (\mathrm{Q7\;SX4} + \overline{\mathrm{Q7}}\;\overline{\mathrm{SX4}})\;(\mathrm{Q8\;SX8} + \overline{\mathrm{Q8}}\;\overline{\mathrm{SX8}}) \\ & (\mathrm{Q9\;SX16} + \overline{\mathrm{Q9}}\;\overline{\mathrm{SX16}})\;(\mathrm{Q10\;SX32} + \overline{\mathrm{Q10}}\;\overline{\mathrm{SX32}}) \\ & (\mathrm{Q11\;SX64} + \overline{\mathrm{Q11}}\;\overline{\mathrm{SX64}})\end{aligned}$$

X Slow Counter XS $$\begin{aligned}\mathrm{IXSF} = {} & \mathrm{AD\;(P1) + AD\;N0\;(P6 + P9) + AD\;N1\;(P5 + P9) + AD\;N2\;(P10)} \\ & \mathrm{+ AD\;YSM\;(P0 + P2 + P11) + AD\;YS0\;N1\;(P4) + AD\;YSM\;N1\;(P3)} \\ & \mathrm{+ AD\;YS0\;N2\;(P7)}\;\overline{\mathrm{QD}}\;\mathrm{+ AD\;YSM\;N2\;(P8)}\;\overline{\mathrm{QD}}\end{aligned}$$

$$\mathrm{IXSB = AD\;N0\;(P5 + P10) + AD\;N1\;(P6 + P10) + AD\;N2\;(P9)}$$

$$\begin{aligned}\mathrm{RXS0} = {} & \mathrm{AD\;XS0\;N0\;(P5) + AD\;XS0\;N1\;(P6 + P10) + AD\;XS0}\;\overline{\mathrm{YSM}}\;\mathrm{N2\;(P9)} \\ & \mathrm{+ AD\;XSM\;N0\;(P1 + P9) + AD\;XSM\;YS0\;N2\;(P7) + AD\;XSM\;YSM} \\ & \mathrm{(P0 + P2 + P11) + AD\;XSM\;YSM\;N1\;(P3 + P5) + AD\;XSM\;YSM\;N2\;(P8 + P10)}\end{aligned}$$

$$\begin{aligned}\mathrm{RXSM} = {} & \mathrm{AD\;XS0\;N0\;(P10) + AD\;XSM\;N0\;(P6) + AD\;XSM}\;\overline{\mathrm{YSM}}\;\mathrm{N1\;(P5)} \\ & \mathrm{+ AD\;XSM}\;\overline{\mathrm{YSM}}\;\mathrm{N2\;(P10) + AD\;XS0\;YSM\;N2\;(P9) + AD\;XSM\;N1\;(P9)} \\ & \mathrm{+ AD\;XSM\;YS0\;N1\;(P4)}\end{aligned}$$

$$\begin{aligned}
\mathrm{J12} &= \mathrm{IXSF'} + \mathrm{IXSB'} + \mathrm{RXSM\;SX1} \\ &\quad + \mathrm{PXSZ\;SZ1} \\
\mathrm{K12} &= \mathrm{IXSF'} + \mathrm{IXSB'} + \mathrm{RXSM}\;\overline{\mathrm{SX1}} \\ &\quad + \mathrm{PXSZ}\;\overline{\mathrm{SZ1}} + \mathrm{RXS0} \\
\mathrm{J13} &= \mathrm{IXSF'\;Q12} + \mathrm{IXSB'}\;\overline{\mathrm{Q12}} + \mathrm{RXSM\;SX2} \\ &\quad + \mathrm{PXSZ\;SZ2} \\
\mathrm{K13} &= \mathrm{IXSF'\;Q12} + \mathrm{IXSB'}\;\overline{\mathrm{Q12}} + \mathrm{RXSM}\;\overline{\mathrm{SX2}} \\ &\quad + \mathrm{PXSZ}\;\overline{\mathrm{SZ2}} + \mathrm{RXS0} \\
\mathrm{J14} &= \mathrm{IXSF'\;Q12\;Q13} + \mathrm{IXSB'}\;\overline{\mathrm{Q12}}\;\overline{\mathrm{Q13}} + \mathrm{RXSM\;SX4} \\ &\quad + \mathrm{RXSZ\;SZ4} \\
\mathrm{K14} &= \mathrm{IXSF'\;Q12\;Q13} + \mathrm{IXSB'}\;\overline{\mathrm{Q12}}\;\overline{\mathrm{Q13}} + \mathrm{RXSM}\;\overline{\mathrm{SX4}} \\ &\quad + \mathrm{PXSZ}\;\overline{\mathrm{SZ4}} + \mathrm{RXS0} \\
\mathrm{J15} &= \mathrm{IXSF'\;Q12\;Q13\;Q14} + \mathrm{IXSB'}\;\overline{\mathrm{Q12}}\;\overline{\mathrm{Q13}}\;\overline{\mathrm{Q14}} + \mathrm{RXSM\;SX8} \\ &\quad + \mathrm{PXSZ\;SZ8} \\
\mathrm{K15} &= \mathrm{IXSF'\;Q12\;Q13\;Q14} + \mathrm{IXSB'}\;\overline{\mathrm{Q12}}\;\overline{\mathrm{Q13}}\;\overline{\mathrm{Q14}} + \mathrm{RXSM}\;\overline{\mathrm{SX8}} \\ &\quad + \mathrm{PXSZ}\;\overline{\mathrm{SZ8}} + \mathrm{RXS0} \\
\mathrm{J16} &= \mathrm{IXSF'\;Q12\;Q13\;Q14\;Q15} + \mathrm{IXSB'}\;\overline{\mathrm{Q12}}\;\overline{\mathrm{Q13}}\;\overline{\mathrm{Q14}}\;\overline{\mathrm{Q15}} + \mathrm{RXSM\;SX16} \\ &\quad + \mathrm{PXSZ\;SZ16} \\
\mathrm{K16} &= \mathrm{IXSF'\;Q12\;Q13\;Q14\;Q15} + \mathrm{IXSB'}\;\overline{\mathrm{Q12}}\;\overline{\mathrm{Q13}}\;\overline{\mathrm{Q14}}\;\overline{\mathrm{Q15}} + \mathrm{RXSM}\;\overline{\mathrm{SX16}} \\ &\quad + \mathrm{PXSZ}\;\overline{\mathrm{SZ16}} + \mathrm{RXS0} \\
\mathrm{J17} &= \mathrm{IXSF'\;Q12\;Q13\;Q14\;Q15\;Q16} + \mathrm{IXSB'}\;\overline{\mathrm{Q12}}\;\overline{\mathrm{Q13}}\;\overline{\mathrm{Q14}}\;\overline{\mathrm{Q15}}\;\overline{\mathrm{Q16}} + \mathrm{RXSM\;SX32} \\ &\quad + \mathrm{PXSZ\;SZ32} \\
\mathrm{K17} &= \mathrm{IXSF'\;Q12\;Q13\;Q14\;Q15\;Q16} + \mathrm{IXSB'}\;\overline{\mathrm{Q12}}\;\overline{\mathrm{Q13}}\;\overline{\mathrm{Q14}}\;\overline{\mathrm{Q15}}\;\overline{\mathrm{Q16}} + \mathrm{RXSM}\;\overline{\mathrm{SX32}} \\ &\quad + \mathrm{PXSZ}\;\overline{\mathrm{SZ32}} + \mathrm{RXS0} \\
\mathrm{J18} &= \mathrm{IXSF'\;Q12\;Q13\;Q14\;Q15\;Q16\;Q17} + \mathrm{IXSB'}\;\overline{\mathrm{Q12}}\;\overline{\mathrm{Q13}}\;\overline{\mathrm{Q14}}\;\overline{\mathrm{Q15}}\;\overline{\mathrm{Q16}}\;\overline{\mathrm{Q17}} + \mathrm{RXSM\;SX64} \\ &\quad + \mathrm{PXSZ\;SZ64} \\
\mathrm{K18} &= \mathrm{IXSF'\;Q12\;Q13\;Q14\;Q15\;Q16\;Q17} + \mathrm{IXSB'}\;\overline{\mathrm{Q12}}\;\overline{\mathrm{Q13}}\;\overline{\mathrm{Q14}}\;\overline{\mathrm{Q15}}\;\overline{\mathrm{Q16}}\;\overline{\mathrm{Q17}} + \mathrm{RXSM}\;\overline{\mathrm{SX64}} \\ &\quad + \mathrm{PXSZ}\;\overline{\mathrm{SZ64}} + \mathrm{RXS0}
\end{aligned}$$

$$\begin{aligned}\mathrm{IXSF'} &= \mathrm{IXSF}\;\overline{\mathrm{RXS0}}\;\overline{\mathrm{RXSM}} \\ \mathrm{IXSB'} &= \mathrm{IXSB}\;\overline{\mathrm{RXS0}}\;\overline{\mathrm{RXSM}}\end{aligned}$$

$$\mathrm{XS0} = \overline{\mathrm{Q12}}\;\overline{\mathrm{Q13}}\;\overline{\mathrm{Q14}}\;\overline{\mathrm{Q15}}\;\overline{\mathrm{Q16}}\;\overline{\mathrm{Q17}}\;\overline{\mathrm{Q18}}$$

$$\begin{aligned}\mathrm{XSM} = {} & (\mathrm{Q12\;SX1} + \overline{\mathrm{Q12}}\;\overline{\mathrm{XS1}})\;(\mathrm{Q13\;SX2} + \overline{\mathrm{Q13}}\;\overline{\mathrm{SX2}}) \\ & (\mathrm{Q14\;SX4} + \overline{\mathrm{Q14}}\;\overline{\mathrm{SX4}})\;(\mathrm{Q15\;SX8} + \overline{\mathrm{Q15}}\;\overline{\mathrm{SX8}}) \\ & (\mathrm{Q16\;SX16} + \overline{\mathrm{Q16}}\;\overline{\mathrm{SX16}})(\mathrm{Q17\;SX32} + \overline{\mathrm{Q17}}\;\overline{\mathrm{SX32}}) \\ & (\mathrm{Q18\;SX64} + \overline{\mathrm{Q18}}\;\overline{\mathrm{SX64}})\end{aligned}$$

X Slow Counter XS (Continued)

$\mathrm{XCO} = (\mathrm{Q5\ Q12} + \overline{\mathrm{Q5}}\ \overline{\mathrm{Q12}})\ (\mathrm{Q6\ Q13} + \overline{\mathrm{Q6}}\ \overline{\mathrm{Q13}})$
$(\mathrm{Q7\ Q14} + \overline{\mathrm{Q7}}\ \overline{\mathrm{Q14}})\ (\mathrm{Q8\ Q15} + \overline{\mathrm{Q8}}\ \overline{\mathrm{Q15}})$
$(\mathrm{Q9\ Q16} + \overline{\mathrm{Q9}}\ \overline{\mathrm{Q16}})\ (\mathrm{Q10\ Q17} + \overline{\mathrm{Q10}}\ \overline{\mathrm{Q17}})$
$(\mathrm{Q11\ Q18} + \overline{\mathrm{Q11}}\ \overline{\mathrm{Q18}})$ Y Fast Counter YF $\mathrm{IYFF} = \overline{\mathrm{AD}}\ \mathrm{M3} + \mathrm{AD\ IYSF}$
$\mathrm{IYFB} = \mathrm{AD\ IYSB}$
$\mathrm{RYFO} = \overline{\mathrm{AD}}\ \mathrm{YFM\ M3} + \mathrm{AD\ RYSO}$
$\mathrm{RYFM} = \mathrm{AD\ RYSM}$ $\mathrm{J19} = \mathrm{IYFF'} + \mathrm{IYFB'} + \mathrm{RYFM\ SY1}$
$\mathrm{K19} = \mathrm{IYFF'} + \mathrm{IYFB'} + \mathrm{RYFM}\ \overline{\mathrm{SY1}} + \mathrm{RYFO}$
$\mathrm{J20} = \mathrm{IYFF'\ Q19} + \mathrm{IYFB'}\ \overline{\mathrm{Q19}} + \mathrm{RYFM\ SY2}$
$\mathrm{K20} = \mathrm{IYFF'\ Q19} + \mathrm{IYFB'}\ \overline{\mathrm{Q19}} + \mathrm{RYFM}\ \overline{\mathrm{SY2}} + \mathrm{RYFO}$
$\mathrm{J21} = \mathrm{IYFF'\ Q19\ Q20} + \mathrm{IYFB'}\ \overline{\mathrm{Q19}}\ \overline{\mathrm{Q20}} + \mathrm{RYFM\ SY4}$
$\mathrm{K21} = \mathrm{IYFF'\ Q19\ Q20} + \mathrm{IYFB'}\ \overline{\mathrm{Q19}}\ \overline{\mathrm{Q20}} + \mathrm{RYFM}\ \overline{\mathrm{SY4}} + \mathrm{RYFO}$
$\mathrm{J22} = \mathrm{IYFF'\ Q19\ Q20\ Q21} + \mathrm{IYFB'}\ \overline{\mathrm{Q19}}\ \overline{\mathrm{Q20}}\ \overline{\mathrm{Q21}} + \mathrm{RYFM\ SY8}$
$\mathrm{K22} = \mathrm{IYFF'\ Q19\ Q20\ Q21} + \mathrm{IYFB'}\ \overline{\mathrm{Q19}}\ \overline{\mathrm{Q20}}\ \overline{\mathrm{Q21}} + \mathrm{RYFM}\ \overline{\mathrm{SY8}} + \mathrm{RYFO}$
$\mathrm{J23} = \mathrm{IYFF'\ Q19\ Q20\ Q21\ Q22} + \mathrm{IYFB'}\ \overline{\mathrm{Q19}}\ \overline{\mathrm{Q20}}\ \overline{\mathrm{Q21}}\ \overline{\mathrm{Q22}} + \mathrm{RYFM\ SY16}$
$\mathrm{K23} = \mathrm{IYFF'\ Q19\ Q20\ Q21\ Q22} + \mathrm{IYFB'}\ \overline{\mathrm{Q19}}\ \overline{\mathrm{Q20}}\ \overline{\mathrm{Q21}}\ \overline{\mathrm{Q22}} + \mathrm{RYFM}\ \overline{\mathrm{SY16}} + \mathrm{RYFO}$
$\mathrm{J24} = \mathrm{IYFF'\ Q19\ Q20\ Q21\ Q22\ Q23} + \mathrm{IYFB'}\ \overline{\mathrm{Q19}}\ \overline{\mathrm{Q20}}\ \overline{\mathrm{Q21}}\ \overline{\mathrm{Q22}}\ \overline{\mathrm{Q23}} + \mathrm{RYFM\ SY32}$
$\mathrm{K24} = \mathrm{IYFF'\ Q19\ Q20\ Q21\ Q22\ Q23} + \mathrm{IYFB'}\ \overline{\mathrm{Q19}}\ \overline{\mathrm{Q20}}\ \overline{\mathrm{Q21}}\ \overline{\mathrm{Q22}}\ \overline{\mathrm{Q23}} + \mathrm{RYFM}\ \overline{\mathrm{SY32}} + \mathrm{RYFO}$
$\mathrm{J25} = \mathrm{IYFF'\ Q19\ Q20\ Q21\ Q22\ Q23\ Q24} + \mathrm{IYFB'}\ \overline{\mathrm{Q19}}\ \overline{\mathrm{Q20}}\ \overline{\mathrm{Q21}}\ \overline{\mathrm{Q22}}\ \overline{\mathrm{Q23}}\ \overline{\mathrm{Q24}} + \mathrm{RYFM\ SY64}$
$\mathrm{K25} = \mathrm{IYFF'\ Q19\ Q20\ Q21\ Q22\ Q23\ Q24} + \mathrm{IYFB'}\ \overline{\mathrm{Q19}}\ \overline{\mathrm{Q20}}\ \overline{\mathrm{Q21}}\ \overline{\mathrm{Q22}}\ \overline{\mathrm{Q23}}\ \overline{\mathrm{Q24}} + \mathrm{RYFM}\ \overline{\mathrm{SY64}} + \mathrm{RYFO}$ $\mathrm{IYFF'} = \mathrm{IYFF}\ \overline{\mathrm{RYFO}}\ \overline{\mathrm{RYFM}}$
$\mathrm{IYFB'} = \mathrm{IYFB}\ \overline{\mathrm{RYFO}}\ \overline{\mathrm{RYFM}}$
$\mathrm{YFO} = \overline{\mathrm{Q19}}\ \overline{\mathrm{Q20}}\ \overline{\mathrm{Q21}}\ \overline{\mathrm{Q22}}\ \overline{\mathrm{Q23}}\ \overline{\mathrm{Q24}}\ \overline{\mathrm{Q25}}$ $\mathrm{YFM} = (\mathrm{Q19\ SY1} + \overline{\mathrm{Q19}}\ \overline{\mathrm{SY1}})\ (\mathrm{Q20\ SY2} + \overline{\mathrm{Q20}}\ \overline{\mathrm{SY2}})$
$(\mathrm{Q21\ SY4} + \overline{\mathrm{Q21}}\ \overline{\mathrm{SY4}})\ (\mathrm{Q22\ SY8} + \overline{\mathrm{Q22}}\ \overline{\mathrm{SY8}})$
$(\mathrm{Q23\ SY16} + \overline{\mathrm{Q23}}\ \overline{\mathrm{SY16}})(\mathrm{Q24\ SY32} + \overline{\mathrm{Q24}}\ \overline{\mathrm{SY32}})$
$(\mathrm{Q25\ SY64} + \overline{\mathrm{Q25}}\ \overline{\mathrm{SY64}})$ Y Slow Counter YS $\mathrm{IYSF} = \mathrm{AD\ (P0 + P2 + P11) + AD\ N0\ (P4 + P7) + AD\ N1\ (P3 + P7) + AD\ N2\ (P8)}$
$+ \mathrm{AD\ XSM\ (P1) + AD\ XSO\ N1\ (P6) + AD\ XSM\ N1\ (P5) + AD\ XSO\ N2\ (P9)}\ \overline{\mathrm{QD}}$
$+ \mathrm{AD\ XSM\ N2\ (P10)}\ \overline{\mathrm{QD}}$ $\mathrm{IYSB} = \mathrm{AD\ N0\ (P3 + P8) + AD\ N1\ (P4 + P9) + AD\ N2\ (P7)}$ $\mathrm{RYSO} = \mathrm{AD\ YSO\ N0\ (P3) + AD\ YSO\ N1\ (P4 + P8) + AD\ YSO\ N2}\ \overline{\mathrm{XSM}}\ \mathrm{(P7)}$
$+ \mathrm{AD\ YSM\ N0\ (P0 + P7) + AD\ XSM\ YSM\ (P1) + AD\ XSO\ YSM\ N1\ (P6)}$
$+ \mathrm{AD\ XSO\ YSM\ N2\ (P9) + AD\ XSM\ YSM\ N1\ (P3 + P5)}$
$+ \mathrm{AD\ XSM\ YSM\ N2\ (P8 + P10) + AD}\ \overline{\mathrm{XSM}}\ \mathrm{YSM\ N0\ (P2 + P11)}$ $\mathrm{RYSM} = \mathrm{AD\ YSO\ N0\ (P8) + AD\ YSM\ N0\ (P4) + AD}\ \overline{\mathrm{XSM}}\ \mathrm{YSM\ N1\ (P3)}$
$+ \mathrm{AD}\ \overline{\mathrm{XSM}}\ \mathrm{YSM\ N2\ (P8) + AD\ XSM\ YSO\ N2\ (P7) + AD\ XSM\ YSM\ N0\ (P2 + P11)}$
$+ \mathrm{AD\ YSM\ N1\ (P7)}$ Y Slow Counter YS (Continued)

J26 = IYSF' + IYSB' + RYSM SY1
+ PYSZ SZ1
K26 = IYSF' + IYSB' + RYSM $\overline{SY1}$
+ PYSZ SZ1 + RYSO
J27 = IYSF' Q26 + IYSB' $\overline{Q26}$ + RYSM SY2
+ PYSZ SZ2
K27 = IYSF' Q26 + IYSB' $\overline{Q26}$ + RYSM $\overline{SY2}$
+ PYSZ SZ2 + RYSO J28 = IYSF' Q26 Q27 + IYSB' $\overline{Q26}$ $\overline{Q27}$ + RYSM SY4
+ PYSZ SZ4
K28 = IYSF' Q26 Q27 + IYSB' $\overline{Q26}$ $\overline{Q27}$ + RYSM $\overline{SY4}$
+ PYSZ SZ4 + RYSO
J29 = IYSF' Q26 Q27 Q28 + IYSB' $\overline{Q26}$ $\overline{Q27}$ $\overline{Q28}$ + RYSM SY8
+ PYSZ SZ8
K29 = IYSF' Q26 Q27 Q28 + IYSB' $\overline{Q26}$ $\overline{Q27}$ $\overline{Q28}$ + RYSM $\overline{SY8}$
+ PYSZ SZ8 + RYSO
J30 = IYSF' Q26 Q27 Q28 Q29 + IYSB' $\overline{Q26}$ $\overline{Q27}$ $\overline{Q28}$ $\overline{Q29}$ + RYSM SY16
+ PYSZ SZ16
K30 = IYSF' Q26 Q27 Q28 Q29 + IYSB' $\overline{Q26}$ $\overline{Q27}$ $\overline{Q28}$ $\overline{Q29}$ + RYSM $\overline{SY16}$
+ PYSZ SZ16 + RYSO
J31 = IYSF' Q26 Q27 Q28 Q29 Q30 + IYSB' $\overline{Q26}$ $\overline{Q27}$ $\overline{Q28}$ $\overline{Q29}$ $\overline{Q30}$ + RYSM SY32
+ PYSZ SZ32 + RYSO
K31 = IYSF' Q26 Q27 Q28 Q29 Q30 + IYSB' $\overline{Q26}$ $\overline{Q27}$ $\overline{Q28}$ $\overline{Q29}$ $\overline{Q30}$ + RYSM $\overline{SY32}$
+ PYSZ SZ32 + RYSO
J32 = IYSF' Q26 Q27 Q28 Q29 Q30 Q31 + IYSB' $\overline{Q26}$ $\overline{Q27}$ $\overline{Q28}$ $\overline{Q29}$ $\overline{Q30}$ $\overline{Q31}$ + RYSM SY64
+ PYSZ SZ64
K32 = IYSF' Q26 Q27 Q28 Q29 Q30 Q31 + IYSB' $\overline{Q26}$ $\overline{Q27}$ $\overline{Q28}$ $\overline{Q29}$ $\overline{Q30}$ $\overline{Q31}$ + RYSM $\overline{SY64}$
+ PYSZ SZ64 + RYSO IYSF' = IYSF $\overline{RYSO}$ $\overline{RYSM}$
IYSB' = IYSB $\overline{RYSO}$ $\overline{RYSM}$ YSO = $\overline{Q26}$ $\overline{Q27}$ $\overline{Q28}$ $\overline{Q29}$ $\overline{Q30}$ $\overline{Q31}$ $\overline{Q32}$ YSM = (Q26 SY1 + $\overline{Q26}$ $\overline{SY1}$) (Q27 SY2 + $\overline{Q27}$ $\overline{SY2}$)
(Q28 SY4 + $\overline{Q28}$ $\overline{SY4}$) (Q29 SY8 + $\overline{Q29}$ $\overline{SY8}$)
(Q30 SY16 + $\overline{Q30}$ $\overline{SY16}$)(Q31 SY32 + $\overline{Q31}$ $\overline{SY32}$)
(Q32 SY64 + $\overline{Q32}$ $\overline{SY64}$)

YCO = (Q19 Q26 + $\overline{Q19}$ $\overline{Q26}$) (Q20 Q27 + $\overline{Q20}$ $\overline{Q27}$)
(Q21 Q28 + $\overline{Q21}$ $\overline{Q28}$) (Q22 Q29 + $\overline{Q22}$ $\overline{Q29}$)
(Q23 Q30 + $\overline{Q23}$ $\overline{Q30}$) (Q24 Q31 + $\overline{Q24}$ $\overline{Q31}$)
(Q25 Q32 + $\overline{Q25}$ $\overline{Q32}$)

Memory Inputs

I1 = P0 QA $\overline{B0}$ + E1 SB1 + ($\overline{P0\ QA + E0\ SB1}$) O1
I2 = P0 QA QD + E1 SB2 + ($\overline{P0\ QA + E0\ SB2}$) O2
I3 = P1 QA $\overline{B0}$ + E1 SB3 + ($\overline{P1\ QA + E0\ SB3}$) O3
I4 = P1 QA QD + E1 SB4 + ($\overline{P1\ QA + E0\ SB4}$) O4
I5 = P2 QA (O1 O2 + O3 O4) + P11 QA (O7 O8 + O9 O10) + E1 SB5
+ ($\overline{P2\ QA + P11\ QA + E0\ SB5}$) O5
I6 = P3 N1 QA $\overline{BM}$ + P4 N1 QA $\overline{F0}$ + P5 N1 QA $\overline{BM}$ + P6 N1 QA $\overline{F0}$ + P7 N2 QA QD
+ P8 N2 QA QD + P9 N2 QA QD + P10 N2 QA QD + P7 N2 QA QF + P8 N2 QA QF
+ P9 N2 QA QF + P10 N2 QA QF + (P3 + P4 P5 + P6) QA QI + E1 SB6
+ E0 SB11 + ($\overline{P2\ QA + E0\ SB6}$) O6
I7 = P7 N2 QA (QH + QE) + E1 SB7 + ($\overline{P7\ N2\ QA + E0\ SB7}$) O7
I8 = P8 N2 QA (QH + QE) + E1 SB8 + ($\overline{P8\ N2\ QA + E0\ SB8}$) O8
I9 = P9 N2 QA (QH + QE) + E1 SB9 + ($\overline{P9\ N2\ QA + E0\ SB9}$) O9
I10 = P10 N2 QA (QH + QE) + E1 SB10 + ($\overline{P10\ N2\ QA + E0\ SB10}$) O10
I11 = SI11 P11 O5 + ($\overline{SI11\ P11\ \overline{O5}}$) O11
I12 = SI12 P11 O5 + ($\overline{SI12\ P11\ \overline{O5}}$) O12

Control Flip-Flops

JAD = $\overline{PBAD}$ XCO YCO M2
KAD = $\overline{PBAD}$
JADF = QAD
KADF = $\overline{QAD}$
JA = QAD $\overline{QADF}$ KA = SA1 M3 + SA2 AD XSO (P6) + SA2 AD XSM (P1 + P5) + SA2 AD YSO (P4)
+ SA2 AD YSM (P0 + P2 + P3 + P11 + P31) + SA2 AD XSO N2 (P9)
+ SA2 AD XSM N2 (P10) + SA2 AD YSO N2 (P7) + SA2 AD YSM N2 (P8)
+ SA3 AD XSO YSM (P6 + P9) + SA3 AD XSM YSO (P4 + P7)
+ SA3 AD XSM YSM (P0 + P1 + P2 + P3 + P5 + P8 + P10 + P11)
+ SA4 AD XSO YSM N1 (P6) + SA5 AD XSO YSM N1 P6 QNC + AD 05 06 SIDS JD = AD FM $\overline{KD}$ (P0 + P1) + AD 05 NO $\overline{KD}$ (P3 + P4 + P5 + P6)
+ AD $\overline{06}$ NO $\overline{KD}$ (P7 + P8 + P9 + P10) + AD FO $\overline{BM}$ 06 N2 $\overline{KD}$ + TA128 PBZ KD = AD YSM NO(P0 + P4 + P7) + AD YSO NO (P3 + P8) + AD XSO NO (P5 + P10)
+ AD XSM NO (P1 + P6 + P9) + AD YSM N2 (P8) + AD YSO N2 (P7)
+ AD XSO N2 (P9) + AD XSM N2 (P10)

JE = AD 05
KE = AD YSM P7 + AD YSO P8 + AD XSM P9 + AD XSO P10

JF = AD 06 QE
KF = KE

JH = RFO $\overline{NO}$
KH = KD

JI = AD IN (P3 $\overline{01}$ + P4 $\overline{02}$ + P5 $\overline{03}$ + P6 $\overline{04}$)
KI = RN JM = 05 M1
KM = $\overline{05}$ M1

JN = 06 M1
KN = $\overline{06}$ M1

JNC = P6 AD XSO YSM N1
KNC = M3 $\overline{QM}$ 05 + M3 $\overline{QN}$ 06

Display Intensity Controls

ZDIM = SB11 06 M3
ZMED = M3 (SB1 01 + SB2 02 + SB3 03 + SB4 04 + SB5 05 + SB6 06 + SB7 07
+ SB8 08 + SB9 09 + SB10 010 + SB11 05 + SB11 011 $\overline{012}$)
ZBRIGHT = XCO YCO SM M3 + 05 06 M3

Miscellaneous

AD = QA M3 $\overline{SA1}$
D1 = MTA TA1 + MM SZ1
D2 = MTA TA2 + MM SZ2
D4 = MTA TA4 + MM SZ4
D8 = MTA TA8 + MM SZ8
D16 = MTA TA16 + MM SZ16
D32 = MTA TA32 + MM SZ32
D64 = MTA TA64 + MM SZ64

Miscellaneous (Continued)

```
EO  = PBEO XCO YCO
E1  = PBE1 XCO YCO
E   = EO + E1
```

$$PFZ = PBZ = QAD\ \overline{QADF}\ YSO\ PO + QAD\ \overline{QADF}\ XSO\ P1 + MTA\ QAD\ \overline{QTF}\ XCO\ YCO\ YSO\ PO\ M1 + MTA\ QAD\ \overline{QTF}\ XCO\ YCO\ XSO\ P1\ M1$$

MULTIPLE VIEWS

Another capability of the computer is a simultaneous display of several regions representing several closed curves. Such a multiple region situation is encountered, for example, in displaying the cross-section of a finger or other similar body portion having a layer of flesh surrounding a bone and a marrow cavity within the bone. Such a display is illustrated in FIG. 22 which is copied from the face of a computer display cathode ray tube after the computer determined the respective cross-sectional shapes. In this example, four regions are present, namely, the region completely outside the finger 80, the region of flesh 81, the region of bone 82, and the region of marrow 83 within the bone. The input data for the three closed curves representing the marrow, bone, and flesh, respectively, are separately entered in the computer and the shape of the respective closed curve solved, as pointed out hereinabove.

In such a solution the smallest region 83, for example, the marrow within the bone, is stored in memory core plane 5. The second largest region 82, for example, the bone, is stored in memory core plane 12, and the largest region 81 is stored in memory core plane 11.

The usual course would be to solve the input data for the largest region first in exactly the manner pointed out above and then transfer the region of proven 1's from memory core plane 5 to memory core plane 11. This is done by closing the enable core plane 11 loading switch SI11 which effects data transfer in one scan of the matrix according to the equation $I11 = SI11\ P11\ O5 + (\overline{SI11\ P11\ O5})\ O11$. The next smaller region is then solved and transferred to core plane 12 by the means $I12 = SI12\ P11\ O5 + (\overline{SI12\ P11\ O5})\ O12$. Finally the smallest region is solved and the contents of all three core planes are simultaneously displayed. Upon display of these results when selector switch SB11 is ON the center-most region 83 is intensified with medium intensity and a dark region representing the second largest region 82 is provied therearound. The largest region 81 is also displayed with medium intensity and the proven 0's are displayed at the periphery with dim intensity. In order to provide the dark region representing the second largest region 82 (bone) the largest region is displayed with medium intensity except where the second largest region exists. This portion of the display accounts for the term, $ZMED = M3\ SB11\ O11\ \overline{O12}$ in the above stated equations for the intensity control.

To this point the description has considered that the $x$ and $y$ directions of the matrix are orthogonal which is, in fact, the principal mode of operation. For some problems, however, it is desirable to obtain thickness data from views other than 90° apart. Thus, for example, on a weld bead one view may be normal to the surface and another view at 45°. A skewed display is readily obtained by summing the $x$ and $y$ sweep voltages and using the sum for one of the deflection voltages on the cathode ray tube. Thus to skew the display to the right at the top of the matrix the $x$ and $y$ sweep voltages are summed and used as the $x$ deflection voltage. To skew the display upward at the right side the $x$ and $y$ sweep voltages are summed and used as the $y$ deflection voltage. By suitably adjusting the proportion of $x$ and $y$ sweep voltages any desired angle of skewing can be obtained.

As pointed out hereinabove, if desired, three views may be taken of an object with X-ray beams or the like. Thus, for example, two orthogonal views may be taken and a view midway therebetween may be taken. Such a situation is suitable, for example, for examining a hole or other defect in a plate wherein one view is taken normal to the surface and an additional view is taken on each side of the normal at 45°. It will be apparent that a larger number of views can be employed if desired, however, the increased complexity seldom provides significant additional information. The three views taken can be employed in exactly the manner hereinabove described with each of the three possible pairs of views separately analyzed to determine the cross-section. These views can then be combined to minimize inconsistencies therebetween and determine the "best " cross-section by any of several conventional statistical techniques.

If desired, however, all three views can be employed simultaneously to find the cross-section. This not only provides an ability to selectively weigh inconsistent data to obtain a best solution, but also practically eliminates ambiguous solutions, and further, brings the determination of the cross-section to completion in a much shorter time. This can be illustrated by considering the cross-section determined in the 7×9 matrix hereinabove worked out step by step. It should be recognized that the orthogonal matrix with a 45° diagonal is truly the same as a view normal to a surface plus a pair 45° views on the two sides since the matrix has no necessary relation to the exterior of the part obscuring a hidden object for purposes of determination of the cross-section of the hidden object.

The matrix encompassing the cross-section has a height $m$ and a width $n$ and it will be assumed for purposes of exposition that $m$ exceeds $n$ as it does in the exemplary problem set forth in FIG. 3. In such a matrix the number of parallel 45° diagonals equals $m+1$. It can also be considered that the length of each of the diagonals is $p$; that is, the total number of dots, squares, or elements in each diagonal is equal to $p$. It will also be apparent that the length $p$ of the diagonals is not constant in an orthogonal matrix. The diagonals are shorter nearer the corners of the matrix, increasing in length one unit at a time to a maximum which is equal to the lesser of the width and height ($n$ in this example). Each of the diagonals can be given a number and it is most convenient to employ diagonals which run from upper left to lower right and commence the numbering of the diagonals at the lower left corner. This, then provides each diagonal with a number which is equal to $x+y$ where $x$ and $y$ are the coordinates for any square in the diagonal. If the rows and columns are numbered 0, 1, 2, 3, etc. the diagonals are also numbered 0, 1, 2, 3 etc. The length, $p$, of each diagonal can then be related to its number ($x+y$) and the size of the matrix. For each diagonal with a number less than n (the lesser of the width and height) $p=x+y+1$. For each diagonal with a number equal to or between $m$ and $n$, $p=n$. For each diagonal with a number greater than $m$, $p=(m+\alpha\rho)-(x+y+1)$. These can be stated algebraically as:

$$p=x+y+1, \text{ if } x+y<n;$$
$$p=n, \text{ if } n \leq x+y \leq m; \text{ and}$$
$$p=(m+n)-(x+y+1), \text{ if } x+y>m.$$

Figure 23A:
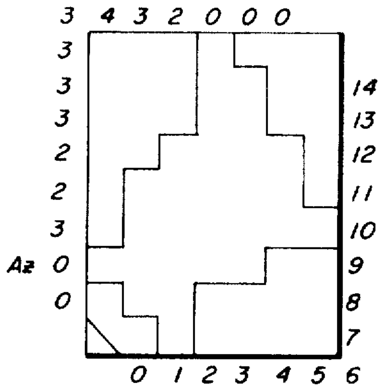
Figure 23B:
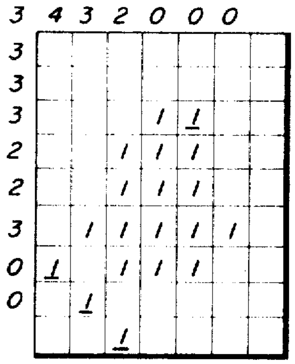

The rapidity with which a solution is obtained can be seen from FIG. 23 wherein the problem hereinabove worked out step by step, is again solved having the additional information of cross-section thickness in the diagonal direction. In FIG. 23A the same cross-section hereinabove set forth is shown with the thickness of the cross-section on the diagonals listed along the left side and top of the matrix at the end of the respective diagonal. These thicknesses are for the diagonals sloping from upper left to lower right as shown in the lower left corner of the matrix. The number of each of the diagonals is arranged along the bottom and right side of the matrix at the end of the respective diagonal. In FIG. 23B proven 1's are entered in those spaces where an overlap occurs in the thickness values for each of the three directions. The proven 1's found by application of Rule (1) to the columns and rows in exactly the same manner as set forth hereinabove are inserted in FIG. 23B without underlining, and the additional proven 1's found in this particular problem due to the application of Rule (1) to the diagonals are underlined. These additional proven 1's are in such a position that application of the fill-in Rule (3) adds two additional proven 1's between existing proven 1's as illustrated by the underlined 1's in FIG 23C.

Figure 23C:
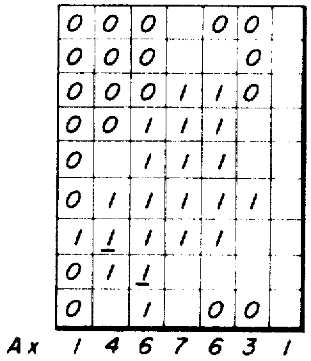
Figure 23D:
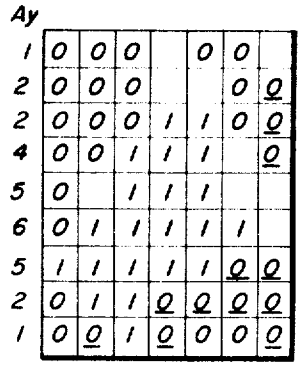
Figure 23E:
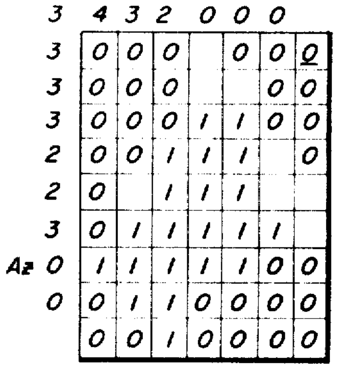
Figure 23F:
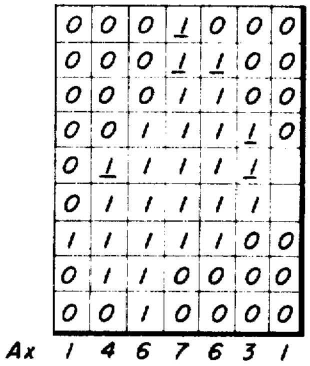

In addition, FIG. 23C illustrates the proven 0's obtained by application of Rule (2) to the columns in the manner set forth hereinabove. In FIG. 23D Rule (2) is applied to the rows to find additional proven 0's as indicated by the underlining. Application of Rule (2) to the diagonals as illustrated in FIG. 23E adds a proven 0 in the upper right corner of the matrix, and it will be apparent that in just one cycle through Rules (1) and (2) that a great proportion of the matrix has been completed. FIG. 23E applies Rule (1) again to the columns thereby establishing additional proven 1's as indicated by the underlining thereby substantially completing the matrix leaving only two undetermined squares in the last column which are clearly determined by considering the content of the applicable rows.

When the diagonal thickness information is employed as illustrated in FIG. 23 about ten steps were required in the exemplary problem to obtain a complete unambiguous solution. Without the diagonal information about thirty steps were required as illustrated in FIG. 4 in order to obtain a pair of ambiguous solutions. Thus the correct solution is found and the number of steps required to reach it are reduced. The 3-to 1 reduction in time to a solution is met or exceeded in larger matrixes than the 7×9 matrix employed in the example. Another advantage to be derived from application of the algorithm to three rather than two views is the elimination of ambiguous solutions. Thus, for example, the solution of the problem in FIG. 4 gave two possible solutions without an easy way to distinguish them. Solution with three views immediately differentiates between the two shapes.

It might be noted that there is still a constraint on the problem in requiring a lack of concavity in the direction of the diagonals as well as in the orthogonal directions. This is, however, a constraint easily overcome when the additional information of a diagonal view is available. In the exemplary problem a concavity exists in the lower right hand region of the closed curve if diagonals are considered running from upper right to lower left. It is found in working out such a solution proceeding in columns, rows and diagonals as hereinabove set forth, that substantially all of the closed curve is determined and the location of the concavity is identified by an inability to satisfactorily complete a column, row and diagonal intersecting at the trouble spot. Thus the multiple view also enhances the ability of the technique to solve for closed curves having a small degree of concavity in one of the directions.

A problem solution having three views instead of two further enhances the ability of the technique to resolve inconsistent data. Generally it is found that the multiple views provide, for example, two proven 1's in a given location and one proven 0, in which case means are readily provided for automatically selecting the proven 1 as the more likely alternative. This is particularly useful for eliminating the effects of errors in rounding off the analog measurements of thickness to digital values.

Implementation of the problem solution when thickness data for rows, columns, and a set of parallel diagonals are employed is substantially identical to the mechanization set forth hereinabove in the special purpose computer. The only real difference is that more of the same steps are required. The logical arrangement within the steps are substantially identical and exemplary mechanization is summarized in TABLE VI showing the program counter states and the steps performed in each of these counter states using a format substantially similar to TABLE II hereinabove.

TABLE VI

| | Program Counter State | Process Performed | Stored in Core Plane |
|---|---|---|---|
| | P0 | Store $Ax$ | 1 |
| | P0 | Store $m - Ax$ | 2 |
| First Stage | P1 | Store $Ay$ | 3 |
| | P1 | Store $n - Ay$ | 4 |
| | P2 | Store $Az$ | 5 |
| | P2 | Store $p - Az$ | 6 |
| | P3 | (1)(2) + (3)(4) + (5)(6) | 7 |
| | P4 | (7) $y$ max −(1) | 8 |
| | P5 | (7) $y$ min −(2) | 8 |
| | P6 | (7) $x$ max −(3) | 8 |
| | P7 | (7) $x$ min −(4) | 8 |
| Second Stage | P8 | (7) $z$ max −(5) | 8 |
| | P9 | (7) $z$ min −(6) | 8 |
| | P10 | (8) $y$ min +(1) | 9 |
| | P11 | (8) $y$ max +(2) | 10 |
| | p12 | (8) $x$ min +(3) | 11 |
| | p13 | (8) $x$ max +(4) | 12 |
| | p14 | (8) $z$ min +(5) | 13 |
| | P15 | (8) $z$ max +(6) | 14 |
| | p16 | (9)(10) + (11)(12) + (13)(14) | 7 |

It can be seen by a quick comparison of the two tables that the technique employed is identical merely adding a new step P2 wherein the thickness Az in the diagonal direction is stored in core planes 5 and 6 and new steps P8 and P9 for finding proven 0's and steps P14 and P15 for finding new proven 1's in the diagonal direction. The overlapping steps P3 and P16 are the same as hereinabove set forth except that the additional core planes containing information concerning the diagonal direction are also compared. Another difference lies in the storage of proven 1's in memory core plane 7 and proven 0's in memory core plane 8. Otherwise, the mechanization is substantially identical to that hereinabove described in substantial detail.

What is claimed is:

1. A computer for determining the shape of a region in a matrix from a first profile and a second profile of dimensions of the region in two different directions comprising:

a memory having a plurality of memory planes each having a corresponding matrix of memory elements in columns and rows;

means for storing said first profile and said second profile as an area array in the matrix of at least some of said memory planes;

means for correlating said stored area arrays for identifying a first group of memory elements in one of said memory planes forming a first area necessarily with said region;

means for correlating said stored area arrays with said first group of memory elements for identifying a second group of memory elements forming a second area necessarily without said region; and means for converging said first area and said second area for determining the boundary of said region.

2. A computer as defined in claim 1 wherein:

said means for storing said profiles includes means for arranging the first profile along each of a pair of opposite margins of a pair of memory planes and for arranging the first profile along each of a pair of opposite margins of a pair of memory planes and for arranging the second profile along each of a pair of different opposite margins of another pair of memory planes; and said means for correlating said stored profiles for identifying a first area comprises means for detecting a region of overlap of the opposed first profiles and a region of overlap of the opposed second profiles, means for combining said regions of overlap, and means for storing said combined regions of overlap in a memory plane.

3. A computer as defined in claim 2 further comprising:
means for adding said profiles to portions of said second area; means for storing the totals along respective opposite margins of separate memory planes; and
means for correlating said stored totals comprising means for detecting a region of overlap of opposed stored totals and means for identifying an enlarged first area; and wherein
said means for converging comprises means for repeating operation of said means for arranging, said means for adding, and said last mentioned means for correlating until no further change occurs in said first area or said second area.

4. A computer as defined in claim 3 further comprising:
manual means for changing the state of selected memory elements of said memory.

5. A computer as defined in claim 1 wherein said memory elements are binary bits having a 1 state and an 0 state and said means for storing comprises:
means for placing a first area array of 1's along a margin of the matrix of a first one of the memory planes, said first array of 1's having a boundary corresponding to the first profile; and
means for placing a second area array of 1's along a margin of the matrix of a second one of the memory planes, said margin being opposite to the margin of the first memory plane, said second array of 1's having a boundary corresponding to the first profile; and wherein
said means for correlating said stored profiles comprises means for scanning said column and rows of said matrix;
means for detecting coincidence of 1's in corresponding memory elements of the first memory plane and the second memory plane during the scanning; and means for storing 1's in a third memory plane in memory elements having a location corresponding to the locations of coincidence.

6. A computer as defined in claim 1 further comprising:
means for simultaneously displaying said first and second areas.

7. A computer as defined in claim 1 wherein said means for storing comprises:
a binary counter;
input means for presetting said counter to a binary number;
means for simultaneously scanning a row of the matrix of memory elements;
means for causing said counter to count; and
means for setting the state of the scanned memory elements in response to the state of said counter.

8. A computer as defined in claim 1 further comprising input apparatus for setting a series of memory elements, the extent of said series being determined by an input number, comprising:
a counter;
means for presetting said counter to the input number;
means for scanning a plurality of memory elements in sequence and synchronously causing said counter to count for each memory element so scanned;
means for setting memory elements in response to a count state of said counter.

9. An apparatus as defined in claim 8 wherein:
said counter counts backward from higher numbers towards zero; and
said means for setting comprises means for setting memory elements to a selected state when the count on said counter is not zero.

10. An apparatus as defined in claim 8 wherein:
said counter counts forward; and
said means for setting comprises means for setting memory elements to a selected state when the count on said counter is after a preselected value.

11. A computer as defined in claim 1 further comprising:
a display device;
means for generating a digital matrix array of descrete display elements on said display device, said display elements being arranged in columns and rows and corresponding to one to one relationship to memory elements;
intensity control means connected to said display device for selectively enhancing intensity of individual ones of the display elements of said matrix;
means for setting said intensity control means for providing a first intensity of display elements within only a first selected region of said matrix; and
means for selecting said first intensity of display elements of the display matrix in response to state of the corresponding memory element to said memory planes.

12. An apparatus as defined in claim 11 further comprising:
means for setting said intensity control means for providing a second intensity of display elements within only a second selected region of said matrix; and
means for selecting said second intensity of elements of the display matrix in response to state of elements of another of said memory planes.

13. An apparatus as defined in claim 12 further comprising:
means for simultaneously selecting said first intensity in the first region and said second intensity in the second region for distinguishing separate regions on said display matrix.

14. An apparatus as defined in claim 13 further comprising means for setting said intensity control means for providing a third intensity of elements of the display matrix where said separate regions overlap.

15. Apparatus for determining the shape of a region bounded by a closed curve in a two dimensional matrix from first and second digital thickness profiles of said region comprising:
a plurality of two dimensional matrixes of memory elements, each of the memory matrixes corresponding to the matrix in which the curve lies;
first means for entering said first thickness profile as area arrays into first and second ones of said memory matrixes along each of two opposite margins thereof; second means for identifying a region of superposition of the two thickness profiles so arranged by said first means;
third means for entering said second thickness profile as area arrays into second and third ones of said memory matrixes along each of another two opposite margins thereof; fourth means for identifying a region of superposition of the two thickness profiles so arranged by said third means and
fifth means for superposing said first and second thickness profiles as area arrays on the combined regions of superposition found in previous operations; sixth means for identifying a second region beyond the extreme superpositions of said thickness profiles on the combined regions of superposition.

16. A computer for determining the shape of a region in a matrix of area units from first and second profiles of extent of the region in two mutually angulated directions comprising:
a plurality of memory planes each having a matrix of memory elements corresponding to the area units;
means for storing said region profiles in some of said memory planes with each area unit of a region profile stored in a corresponding memory element;
means for comparing region profile units stored in memory elements of different memory planes to identify first and second groups of area units necessarily within said region and without said region respectively;
means for reiteratively effecting said comparing to identify groups of area units progressively including more area units necessarily within and without said region; and
means responsive to said means for storing, for indicating the shape of one of said groups of area units as indicated by the stored information in the memory elements.

17. A computer as defined in claim 16 wherein said means for comparing region profile units comprises:

scanning means for sequentially processing each memory element in a memory plane;

counter means responsive to state of memory elements for counting numbers of memory elements in a selected state in a memory plane; and means responsive to said counter means and said scanning means for setting the state of selected memory plane.

* * * * *